US012647722B2

(12) United States Patent
Littrell

(10) Patent No.: US 12,647,722 B2
(45) Date of Patent: Jun. 2, 2026

(54) PIEZOELECTRIC MICROELECTROMECHANICAL SYSTEM (MEMS) SIGNAL PROCESSING FOR CONTACT DETECTION

(71) Applicant: QUALCOMM Incorporated, San Diego, CA (US)

(72) Inventor: Robert John Littrell, Belmont, MA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 18/590,799

(22) Filed: Feb. 28, 2024

(65) Prior Publication Data

US 2024/0298108 A1 Sep. 5, 2024

Related U.S. Application Data

(60) Provisional application No. 63/488,140, filed on Mar. 2, 2023.

(51) Int. Cl.
*H04R 3/00* (2006.01)
*G01P 15/09* (2006.01)
(Continued)

(52) U.S. Cl.
CPC .............. *H04R 1/326* (2013.01); *G01P 15/09* (2013.01); *H04R 17/02* (2013.01); *H04R 2201/003* (2013.01)

(58) Field of Classification Search
CPC .... H04R 1/36; H04R 17/02; H04R 2201/003; G01P 15/09
(Continued)

(56) References Cited

U.S. PATENT DOCUMENTS 4,131,088 A 12/1978 Reddy
4,836,218 A 6/1989 Gay et al.
(Continued)

FOREIGN PATENT DOCUMENTS

CN 101355827 A * 1/2009
CN 114174793 3/2022
(Continued)

OTHER PUBLICATIONS

International Search Report and Written Opinion—PCT/US2024/017904—ISA/EPO—Jun. 6, 2024.

*Primary Examiner* — William J Deane, Jr.
(74) *Attorney, Agent, or Firm* — QUALCOMM Incorporated; Espartaco Diaz Hidalgo

(57) ABSTRACT

Aspects of the disclosure relate to microelectromechanical systems (MEMS) and associated detection and classification of surface impacts using MEMS systems and signals. One aspect is a device including a memory configured to store an audio signal and a motion signal and one or more processors. The processors are configured to obtain the audio signal, wherein the audio signal is generated based on detection of sound by a microphone, obtain the motion signal, wherein the motion signal is generated based on detection of motion by a motion sensor mounted on a surface of an object, perform a similarity measure based on the audio signal and the motion signal, and determine a context of a contact type of the surface of the object based on the similarity measure.

20 Claims, 29 Drawing Sheets

(51) Int. Cl.
*H04R 1/32* (2006.01)
*H04R 17/02* (2006.01)
(58) Field of Classification Search
USPC ...................................... 381/92, 111, 98, 114
See application file for complete search history.

(56) References Cited

U.S. PATENT DOCUMENTS

| | | |
|---|---|---|
| 9,164,118 B2 | 10/2015 | Sato |
| 9,631,996 B2 | 4/2017 | Wiesbauer et al. |
| 9,809,448 B2 | 11/2017 | Lim et al. |
| 9,945,746 B2 | 4/2018 | Wiesbauer et al. |
| 10,014,003 B2 | 7/2018 | Kim et al. |
| 10,393,606 B2 | 8/2019 | Wiesbauer et al. |
| 10,433,087 B2 | 10/2019 | Bernal Castillo et al. |
| 10,771,889 B2 | 9/2020 | Littrell |
| 11,099,078 B1 | 8/2021 | Littrell |
| 11,297,406 B2 | 4/2022 | Chandrasekaran et al. |
| 11,418,882 B2 | 8/2022 | Littrell |
| 11,517,252 B2 | 12/2022 | Ahmed et al. |
| 11,693,021 B2 | 7/2023 | Goswami et al. |
| 11,899,039 B2 | 2/2024 | Littrell |
| 11,946,968 B2 | 4/2024 | Sairiala et al. |
| 11,962,973 B2 | 4/2024 | Bretthauer et al. |
| 12,033,042 B2 | 7/2024 | Everman et al. |
| 12,216,746 B2 | 2/2025 | Littrell et al. |
| 12,240,748 B2 | 3/2025 | Loeppert et al. |
| 12,373,734 B2 | 7/2025 | Everman et al. |
| 2012/0020485 A1 | 1/2012 | Visser et al. |
| 2013/0268240 A1 | 10/2013 | Bengtsson |
| 2014/0093093 A1 | 4/2014 | Dusan et al. |
| 2014/0226838 A1 | 8/2014 | Wingate et al. |
| 2014/0260637 A1 | 9/2014 | Molinari |
| 2015/0276529 A1 | 10/2015 | Wiesbauer et al. |
| 2016/0071526 A1* | 3/2016 | Wingate ................. G01S 3/807 |
| | | 704/233 |
| 2016/0091526 A1 | 3/2016 | Goda et al. |
| 2016/0142828 A1* | 5/2016 | Yang ..................... H04R 17/02 |
| | | 381/173 |
| 2016/0219375 A1 | 7/2016 | Hall et al. |
| 2017/0182405 A1* | 6/2017 | Holmes ................. A63F 13/211 |
| 2018/0306609 A1 | 10/2018 | Agarwal et al. |
| 2018/0317022 A1 | 11/2018 | Evans et al. |
| 2019/0289405 A1 | 9/2019 | Littrell et al. |
| 2021/0360347 A1* | 11/2021 | Aschieri ................. H03F 3/183 |
| 2021/0380059 A1 | 12/2021 | Jones et al. |
| 2021/0382085 A1* | 12/2021 | Bretthauer ............. H10N 30/87 |
| 2022/0108115 A1 | 4/2022 | Iyer et al. |
| 2023/0171549 A1* | 6/2023 | Carfore ................... H04R 3/00 |
| | | 381/190 |
| 2023/0371533 A1* | 11/2023 | Fogarty ............... A22C 29/023 |
| 2024/0295580 A1 | 9/2024 | Littrell |

FOREIGN PATENT DOCUMENTS

| | | |
|---|---|---|
| CN | 115373379 | 11/2022 |
| WO | 2023168361 3 | 9/2023 |

* cited by examiner

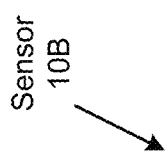
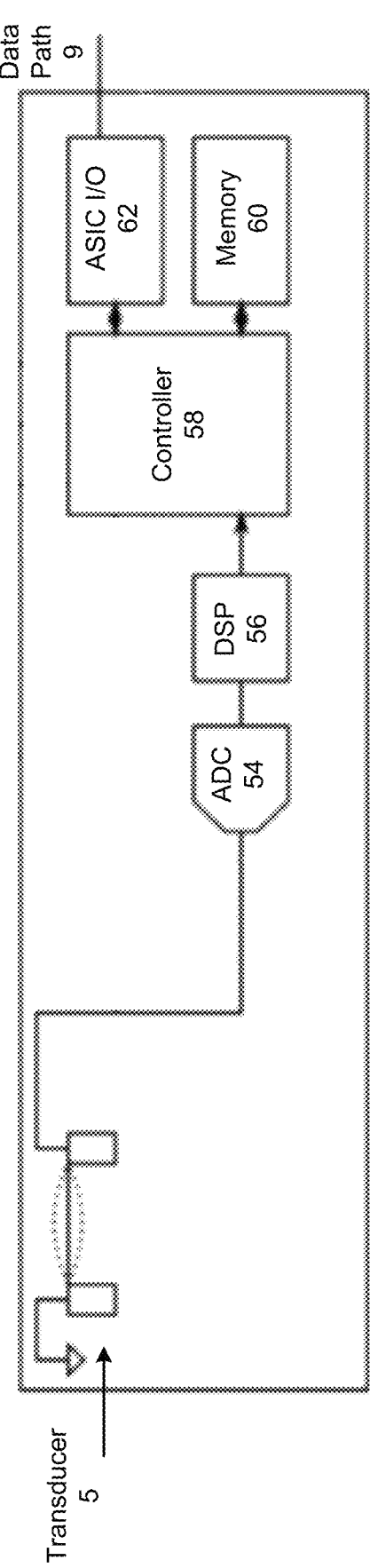
FIG. 1B

700

Store, in a memory of a device, data from a first analog signal generated by a first piezoelectric microelectromechanical systems (MEMS) transducer having a first output, wherein the first piezoelectric MEMS transducer is mechanically coupled to a first surface of an object, and wherein the first piezoelectric MEMS transducer is configured to generate the first analog signal at the first output when the first analog signal is transduced by the first piezoelectric MEMS transducer from vibrations propagating through the object

— 702

Store, in the memory of the device, data from a second piezoelectric MEMS transducer having a second output, wherein the second piezoelectric MEMS transducer is configured to generate the second analog signal at the second output when the second analog signal is transduced by the second piezoelectric MEMS transducer from acoustic vibrations incident on the first surface of the object

— 704

Process, using classification circuitry coupled to the output of first piezoelectric MEMS transducer and the output second piezoelectric MEMS transducer, the data from the first analog signal and the data from the second analog signal to categorize combinations of the first analog signal and the second analog signal received during one or more time frames

Audio Data 1116

Output Data 1308

1400

1700

1800

2000

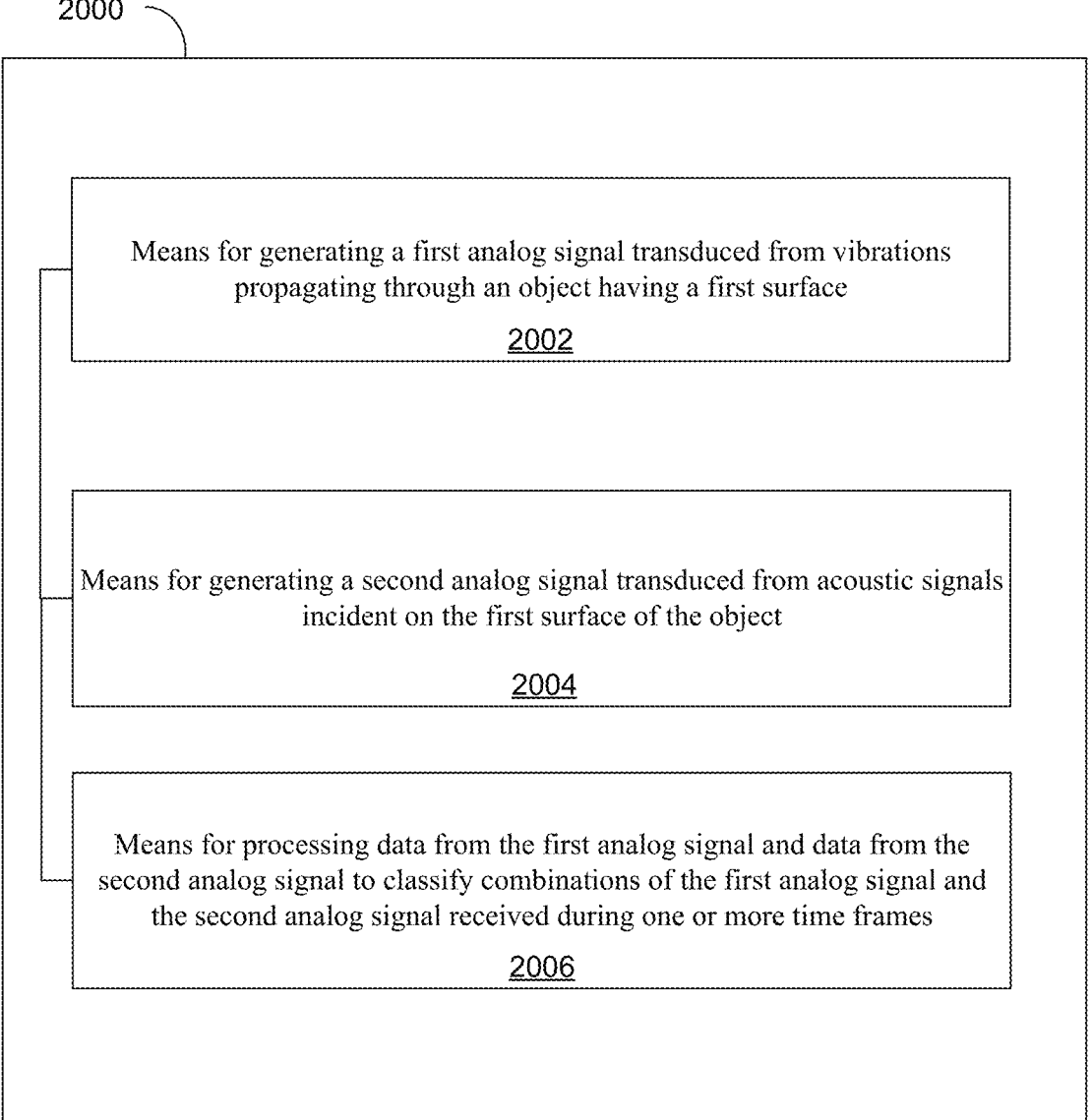

Means for generating a first analog signal transduced from vibrations propagating through an object having a first surface

2002

Means for generating a second analog signal transduced from acoustic signals incident on the first surface of the object

2004

Means for processing data from the first analog signal and data from the second analog signal to classify combinations of the first analog signal and the second analog signal received during one or more time frames

PIEZOELECTRIC MICROELECTROMECHANICAL SYSTEM (MEMS) SIGNAL PROCESSING FOR CONTACT DETECTION

CROSS-REFERENCE TO RELATED APPLICATIONS

The present application claims the priority benefit of U.S. Provisional Patent Application No. 63/488,140 filed on Mar. 2, 2023 and titled "PIEZOELECTRIC MEMS CONTACT DETECTION SYSTEM", the disclosure of which is hereby incorporated by reference in its entirety for all purposes.

TECHNICAL FIELD

This disclosure relates generally to piezoelectric acoustic transducers, and more specifically to piezoelectric micro-electromechanical systems (MEMS) vibration sensing devices that detect vibrations associated with an object surface.

BACKGROUND

MEMS technology has enabled the development of smaller microphones and other acoustic transducers using wafer deposition techniques. In general, MEMS micro-phones can take various forms including, for example, capacitive microphones and piezoelectric microphones. MEMS capacitive microphones and electric condenser microphones (ECMs) currently dominate the consumer electronics microphone market. Piezoelectric MEMS systems such as microphones, however, are a growing market and offer various advantages. For example, piezoelectric MEMS microphones may not require a backplate which eliminates squeeze film damping (an intrinsic noise source for capacitive MEMS microphones). In addition, piezoelectric MEMS microphones are reflow-compatible and can be mounted to a printed circuit board (PCB) using lead-free solder process-ing, which could irreparably damage other types of micro-phones. These advantages, and others, may be more fully realized by improved piezoelectric MEMS microphones.

SUMMARY

Aspects of the present disclosure describe microelectro-mechanical system (MEMS) devices, systems, methods, and other aspects related to detecting and classifying contact with a surface.

In some aspects, the techniques described herein relate to a device including: a memory configured to store an audio signal and a motion signal; and one or more processors configured to: obtain the audio signal based on detection of sound by two or more microphones; obtain the motion signal based on detection of motion by two or more motion sensor mounted on a surface of a first object; perform one or more comparisons of the audio signal and the motion signal to generate comparison data; determine a context of a contact type of the surface of the first object based on the compari-son data; and determine a location of a second object within a threshold distance to the first object based on the context determined by the one or more processors.

In some aspects, the techniques described herein relate to a device, wherein a plurality of cantilevered beams are configured as a membrane enclosing a sensor area.

In some aspects, the techniques described herein relate to a device wherein the first object is a car door.

In some aspects, the techniques described herein relate to a device, wherein the second object is a person, a key, or a balloon.

In some aspects, the techniques described herein relate to a device, wherein the contact type includes an area associ-ated with the first object.

In some aspects, the techniques described herein relate to a device, wherein the first object is a door, and wherein the area associated with the first object is one of: an upper right part of the door, a lower right part of the door, an upper left part of the door, a lower left part of the door, or center of the door.

In some aspects, the techniques described herein relate to a device including: a memory configured to store an audio signal and a motion signal; and one or more processors configured to: obtain the audio signal based on detection of sound by a microphone; obtain the motion signal based on detection of motion by a motion sensor mounted on a surface of an object; normalize the audio signal and the motion signal to generate a normalized audio signal and a normal-ized motion signal; generate correlation data from the nor-malized audio signal and the normalized motion signal; and determine a contact classification using the correlation data.

In some aspects, the techniques described herein relate to a device, wherein the one or more processors are configured as classification circuitry to determine the contact classifi-cation using the correlation data.

In some aspects, the techniques described herein relate to a device, wherein the classification circuitry is further con-figured to receive audio signal and the motion signal as training data in a training mode, and to match the training data to a provided training classification value.

In some aspects, the techniques described herein relate to a device, wherein the object is automobile surface, wherein the surface is an externally facing surface of the automobile surface, and wherein the provided training classification value is a set of collision classification values having known force and damage type characteristics.

In some aspects, the techniques described herein relate to a device including: a memory; a first piezoelectric micro-electromechanical systems (MEMS) transducer having a first output, wherein the first piezoelectric MEMS transducer is mechanically coupled to a surface of an object, and wherein the first piezoelectric MEMS transducer is config-ured to generate a first analog signal at the first output when the first analog signal is transduced by the first piezoelectric MEMS transducer from vibrations propagating through the object; a second piezoelectric MEMS transducer having a second output, wherein the second piezoelectric MEMS transducer is configured to generate a second analog signal at the second output when the second analog signal is transduced by the second piezoelectric MEMS transducer from acoustic vibrations at a location of the object; and classification circuitry coupled to the memory, the output of first piezoelectric MEMS transducer, and the output of the second piezoelectric MEMS transducer, wherein the classi-fication circuitry is configured to process data from the first analog signal and data from the second analog signal, and to categorize combinations of the first analog signal and the second analog signal received during one or more time frames.

In some aspects, the techniques described herein relate to a device, further including storing categorization data from the classification circuitry in the memory.

In some aspects, the techniques described herein relate to a device, wherein the first piezoelectric MEMS transducer has a noise floor defining a noise at a given frequency related to a signal output in gravitational units (g), and wherein the noise floor is between 100 millionths of the gravitation unit (ug) per square root of frequency in Hertz (ug/sqrt (Hz)) and 0.5 ug/sqrt (Hz).

In some aspects, the techniques described herein relate to a device, wherein the first piezoelectric MEMS transducer has a transduction bandwidth to detect the vibrations propagating through the object at frequencies between 0.5 kilohertz (kHz) and 15 kHz.

In some aspects, the techniques described herein relate to a device, wherein the data from the first analog signal includes: frequency data for the vibrations propagating through the object; and magnitude data for the vibrations propagating through the object, where the magnitude data is associated with a severity of a contact with the object.

In some aspects, the techniques described herein relate to a device, wherein the one or more time frames are captured at a rate greater than 60 frames per second.

In some aspects, the techniques described herein relate to a device, further including a first sensor package, wherein the first sensor package includes a substrate base and a lid, wherein the first piezoelectric MEMS transducer, the second piezoelectric MEMS transducer, and an application specific integrated circuit (ASIC) are mounted to the substrate base.

In some aspects, the techniques described herein relate to a device, wherein the ASIC includes an analog-to-digital converter (ADC), a digital signal processor (DSP), and a controller, wherein an output of the ADC is coupled to an input of the controller via the digital signal processor.

In some aspects, the techniques described herein relate to a device further including: a second sensor package including a third MEMS transducer and a fourth MEMS transducer; wherein the first sensor package is positioned at a first position on the surface of the object; and wherein the second sensor package is positioned at a second position on the surface of the object at a predetermined distance from the first position.

In some aspects, the techniques described herein relate to a device, wherein the classification circuitry is further configured to detect a position of an impact on the surface of the object based on a time delay or a magnitude difference between vibrations detected at the first sensor package and vibrations detected at the second sensor package in a same time frame.

The foregoing, together with other features and embodiments, will become more apparent upon referring to the following specification, claims, and accompanying drawings.

BRIEF DESCRIPTION OF DRAWINGS

FIG. 1B illustrates aspects of a piezoelectric microelectromechanical system (MEMS) sensor system in accordance with aspects described herein.

FIG. 7 illustrates a method associated with contact detection and classification using MEMS transducers in accordance with aspects described herein.

FIG. 20 is a functional block diagram of an piezoelectric MEMS contact detection and classification system in accordance with aspects described herein.

Like reference symbols in the various drawings indicate like elements.

DETAILED DESCRIPTION

Figure 1A:
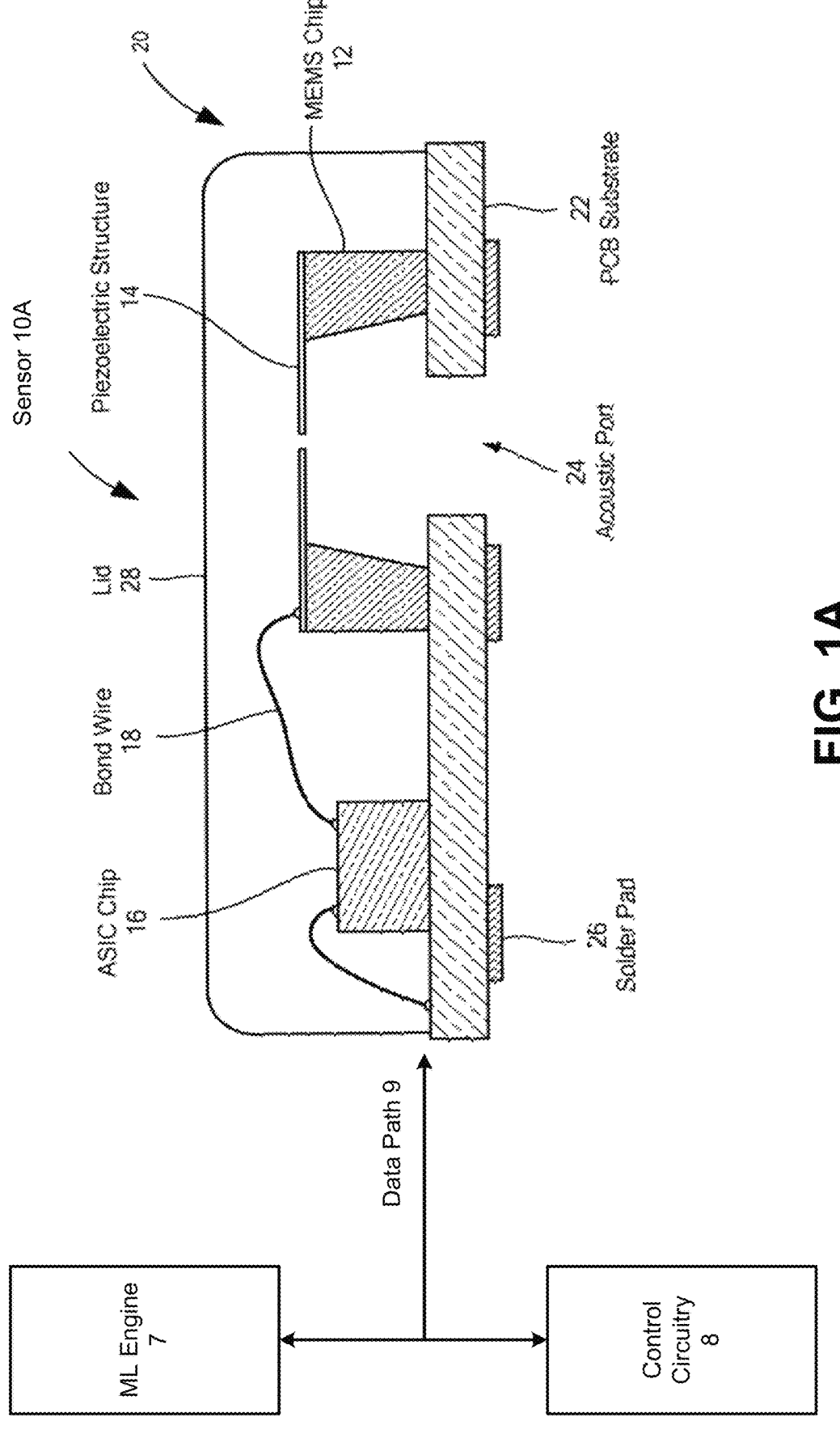
FIG. 1A illustrates an example of an acoustic transducer system for contact detection and classification in accordance with aspects described herein.

The detailed description set forth below in connection with the appended drawings is intended as a description of example aspects and implementations and is not intended to represent the only implementations in which the invention may be practiced. The detailed description includes specific details for the purpose of providing a thorough understanding of the example aspects and implementations. In some instances, some devices are shown in block diagram form. Drawing elements that are common among the following figures may be identified using the same reference numerals.

Aspects described herein include contact detection and classification systems using piezoelectric microelectromechanical systems (MEMS) transducers. Such transducers convert motion energy into electrical signals. An example of a MEMS transducer is a MEMS microphone, which converts sound pressure into an electrical voltage. Another example of a MEMS transducer is a motion detector, which converts movement into an electrical voltage. The size and low-power associated with such MEMS transducers can allow the MEMS transducers to be used in environments where other such sensors are unavailable. Aspects described herein include systems that detect vibrations associated with the surface of an object in order to detect and classify surface contacts associated with the detected vibrations.

Some aspects include a combination of an piezoelectric MEMS acoustic detector and a piezoelectric MEMS motion detector coupled to a surface of an object to detect motion (e.g., mechanical vibrations) and sound (e.g., acoustic vibrations) incident on the surface. The data derived from electrical signals output by the MEMS detectors can, in some aspects, be processed by a classifier or machine learning engine to generate additional system operations associated with a given type of signal. For example, a system can include data patterns that match surface contacts associated with a collision or with a key scratching paint on a surface of the object. In some aspects, such data patterns can be generated by a machine learning system connected to a surface of an object, and recording the data generated by particular actions (e.g., key scratching on a car door, collisions with a car bumper, etc.) The data can be used to train a classifier, neural network, or other such machine learning engine. Devices can then be created with sensors with a same placement in a similar object used for the data generation (e.g., mass manufactured car doors). Electrical connections from the sensors in the object to control and processing circuitry can be used to generate alerts or actions based on classifications of sensed vibrations.

In some aspects, multiple piezoelectric MEMS transducers of the same type (e.g., multiple microphones and multiple motion detectors) can be placed in different positions on a surface. Time differences and other variations in signals detected at each MEMS transducer can be used to determine where on a surface of an object a contact originates (e.g., based on a time delay, amplitude variations, or other differences between electrical signals produced from a same contact).

In some aspects, a contact sensing system is configured to differentiate and/or characterize different types of contact on a surface. To that end, some aspects include a motion detector and microphone that combine with a machine learning engine to produce the desired results. In some aspects, the motion detector has a low noise floor, a high bandwidth (e.g., a wide band of detected vibration frequencies), or both. In some aspects, these elements are formed on a shared die. In other aspects, the elements are formed on separate dies. Details of various illustrative aspects are discussed further below.

FIG. 1A illustrates an example of a system for contact detection and classification using MEMS transducers in accordance with aspects described herein. FIG. 1A schematically shows a cross-sectional view of an acoustic sensor 10A. As shown, the sensor 10A of FIG. 1A includes a MEMS chip 12 which can include a die having piezoelectric structures 14, (e.g. cantilevered beams or diaphragms, to convert vibrational energy into electrical signals), and an application-specific integrated circuit (ASIC) chip 16 to buffer and amplify the electrical signal generated by the MEMS chip 12. The MEMS chip 12 and ASIC chip and 16 are electrically connected by wire bonding 18, and mounted within the interior chamber of a package (although other packaging and connection techniques are possible). The package has a lid 28 and a substrate 22 (e.g., a printed circuit board). The PCB Substrate 22 and the MEMS substrate of the MEMS chip 12 form an acoustic port 24 for enabling sound pressure to access the piezoelectric structure(s) 14 of the MEMS chip 12 Multiple solder pads 26 are disposed on a bottom surface of the PCB substrate 22 for solder connections of the MEMS transducer 10 as an element of additional devices. The MEMS transducer of the MEMS chip 12 can, for example, be used as a microphone or other sensor in cell phones, laptop computers, portable microphones, smart home accessories, or any other such devices. A lid 28 can be used to form the housing of the MEMS chip 12, to provide an air pocket which provides one side of the air pressure differentiation that causes deflection and signal generation in the MEMS chip 12, and to mitigate electromagnetic interference (EMI). As indicated above, in some aspects, the sensor 10 can be implemented without the acoustic port 24 to implement an accelerometer, where the piezoelectric structure 14 will generate an electrical signal based on motion of the MEMS transducer 10, rather than based on an incident acoustic (e.g., ultrasonic) signal from the acoustic port 24.

FIG. 1A illustrates a structure with the MEMS chip 12 having an acoustic port 24 formed in the MEMS substrate. In other implementations, the MEMS substrate can be closed, with a pocket similar to the pocket formed by a cavity below the piezoelectric structures 14 and the acoustic port 24 on the opposite side of the piezoelectric structure(s) 14 from the substrate 22. In other implementations, other such configurations of the acoustic port 24 can be used so long as a path for acoustic pressure to reach the piezoelectric structures 14 is present.

Figure 11:
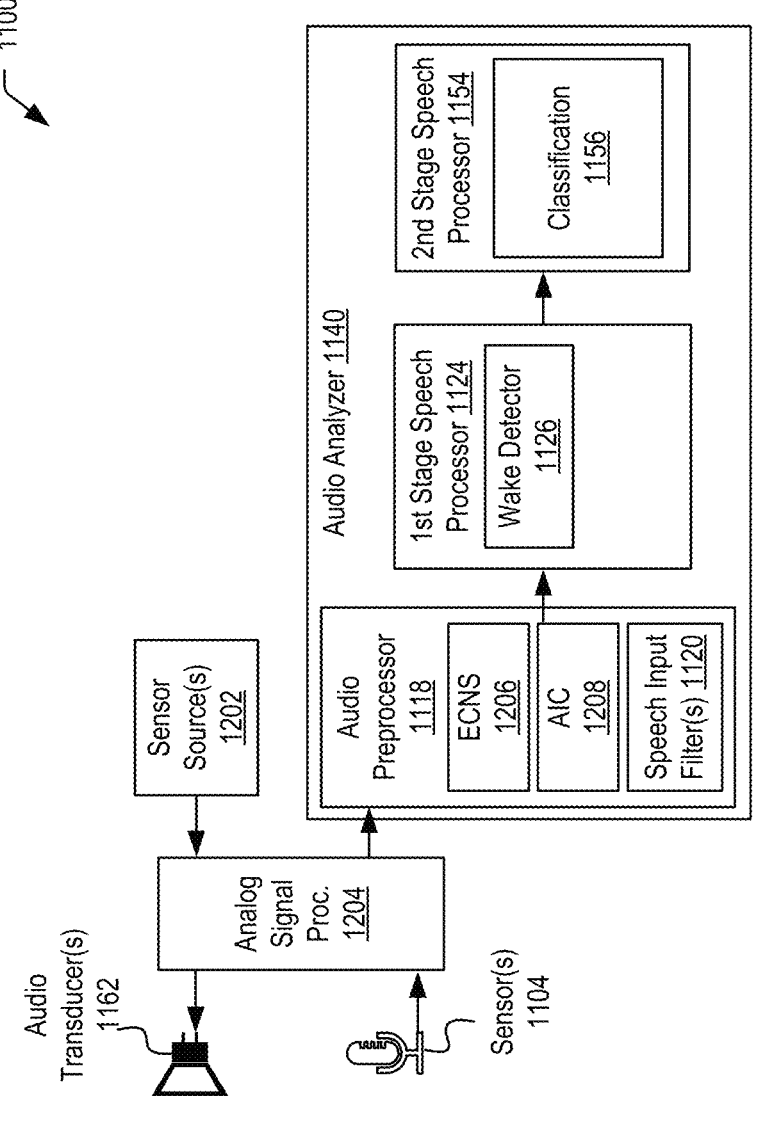
FIG. 11 illustrates aspects of a system supporting contact detection and classification using MEMS transducers in accordance with aspects described herein.

FIG. 1A additionally illustrates a machine learning engine 7 and control circuitry 8 coupled to the ASIC chip 16 via a data path 9. In some aspects, the machine learning engine 7 can be a neural network or classification circuitry separate from additional processing circuitry of a system such as control circuitry 8. In some aspects, the machine learning engine 7 can include decision tree circuitry, support vector machine circuitry, a convolutional neural network circuitry, or other such classification or contact detection and characterization circuitry. In some aspects, the control circuitry 8 and the machine learning engine 7 can be implemented using one or more processors of a device using shared resources in a computing architecture as illustrated by FIG. 11, with the control circuitry and machine learning engine implemented by a processor 1110 and the sensor 10A acting as an input device 945. The machine learning engine 7 can process signals output from the ASIC chip 16 (e.g., generated from analog signals provided by the MEMS chip 12) to determine a type of motion being detected by the MEMS chip 12. The classification or type determination performed by the machine learning engine can generate an output provided to the control circuitry 8. The control circuitry 8 can then perform selected actions based on the classification information provided by the machine learning engine 7.

In some aspects, rather than implement the system with two separate chips, some embodiments may implement both the MEMS chip 12 and ASIC 16 as part of the same die. Accordingly, discussion of separate chips is for illustrative purposes. In addition, in other embodiments the ASIC 16 may be implemented on a die in a separate package with one or more interconnects electrically coupling the MEMS chip 12 to the ASIC 16. Similarly, the amplifier discussed above and used for feedback transduction in a feedback transduction loop can, in some aspects, be implemented on an ASIC 16 separate from the MEMS chip 12. In other aspects, the amplifier can be implemented as part of a combined IC with both MEMS and ASIC components of the MEMS chip 12 and the ASIC 16.

Further, as illustrated below, a sensor can be implemented with multiple piezoelectric MEMS transducers either on a single MEMS chip, or on separate MEMS chips.

FIG. 1B illustrates aspects of a piezoelectric microelectromechanical system (MEMS) sensor 10B in accordance with aspects described herein. As illustrated, the sensor 10B includes a piezoelectric MEMS transducer 5. The piezoelectric MEMS transducer can be implemented on a MEMS chip such as the MEMS chip 12 of FIG. 1A. An output of the transducer 5 is coupled to an analog-to-digital converter (ADC) 54, which accepts an analog signal from the output of the transducer 5 and converts the analog signal (e.g., which is a transduced signal from motion vibrations detected at the piezoelectric MEMS transducer 5) to a digital signal. An output of the ADC 54 is provided to a digital signal processor (DSP) 56, which can perform preprocessing, digital filtering, or other signal conditioning on the information from the transducer 5, and provide an output signal to a controller 58. The controller 58 can further process the information from the transducer 5 to generate a digital data signal corresponding to the analog signal output from the transducer 5. The digital data signal can be stored in a memory 60 on the sensor 10B, or can be output to a the data path 9 via application specific integrated circuit (ASIC) input/output (I/O) circuitry 62.

As illustrated, the transducer 5 does not have an associated acoustic port 24. In some aspects, a similar MEMS chip 12 described in FIG. 1A can be used for the transducer 5 operating as a motion detector, but with the associated sensor not having the acoustic port 24. In such an implementation, the PCB substrate 22 substrate can be closed without the cap of acoustic port.

Figure 1C:
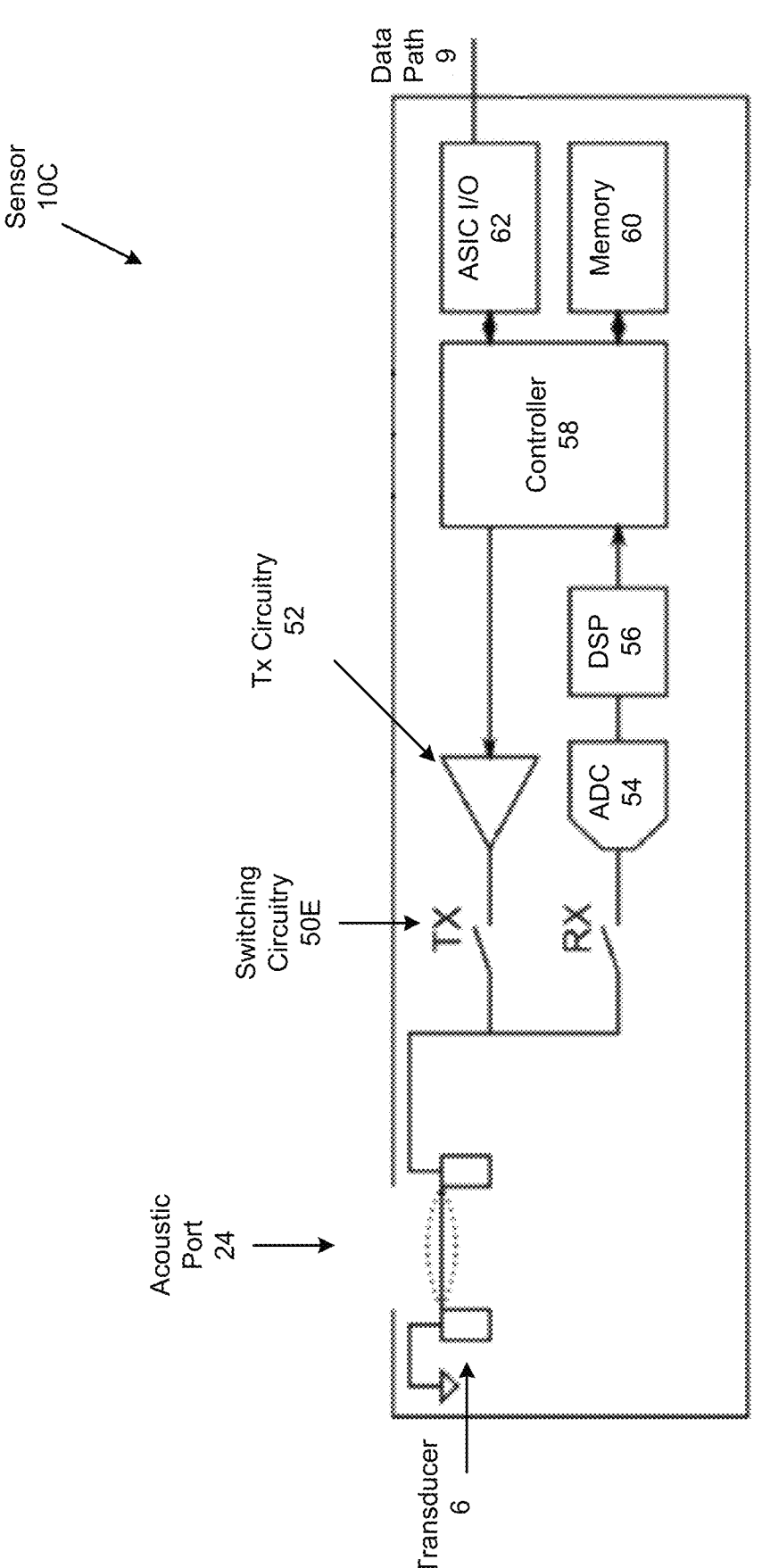
FIG. 1C illustrates aspects of a piezoelectric MEMS sensor device in accordance with aspects described herein.

FIG. 1C illustrates details of a MEMS transducer 10C in accordance with aspects described herein. As illustrated, a transducer can include a transducer 6 having an acoustic port 24. In addition, in contrast to the implementation of FIG. 1B with a motion detector transducer 5 configured only to receive vibrational signals, the transducer 6 in the sensor 10C can transmit signals in addition to receiving signals. The sensor 10C can allow acoustic waves to be transmitted out from the transducer 6 in a transmit mode, or to be sensed in a receive mode. Switching circuitry 50 allows controller 58 to select between receive (Rx) and transmit (Tx) operation. In a Tx mode, an electrical signal associated with an acoustic wave to be generated by the transducer 6 is received as an input at the ASIC input/output (I/O) 62, and passed to controller 58. The signal (e.g., as modified by the controller 58 to shape this signal for the transducer 6) may be stored in memory 60 for later use, or passed to Tx circuitry 52 for transmission. The Tx circuitry 52, as part of transmission operations, can perform additional waveform conditioning and amplification (e.g., via a power amplifier), before being sent to the transducer 6 to be converted to acoustic signals.

In a receive mode, the MEMS chip 12 receives incident acoustic waves via the acoustic port 24, which are converted to electrical signals by the transducer 6. Just as with the motion sensor transducer 5 described above, the ADC 54 and the DSP 56 convert the analog electrical signal from the MEMS chip 12 to a format acceptable to the controller 58, which can either store the signal in memory 60 or transmit the signal to additional processing circuitry of a larger device via the ASIC I/O 62.

As described herein, aspects can include transducer signals for both acoustic (e.g., microphone) and mechanical (e.g., motion sensor) vibrations used to detect and classify contacts with a surface. In some aspects, separate sensors 10 can be used for acoustic and motional detection. Such aspects can include separate packages co-located on a surface of an object to generate analog signals and corresponding data associated with a similar location on a surface of an object. In other aspects, a shared package can be used for multiple transducers (e.g., on a shared PCB substrate such as the PCB substrate 22 with the same lid such as the lid 28).

Figure 1D:
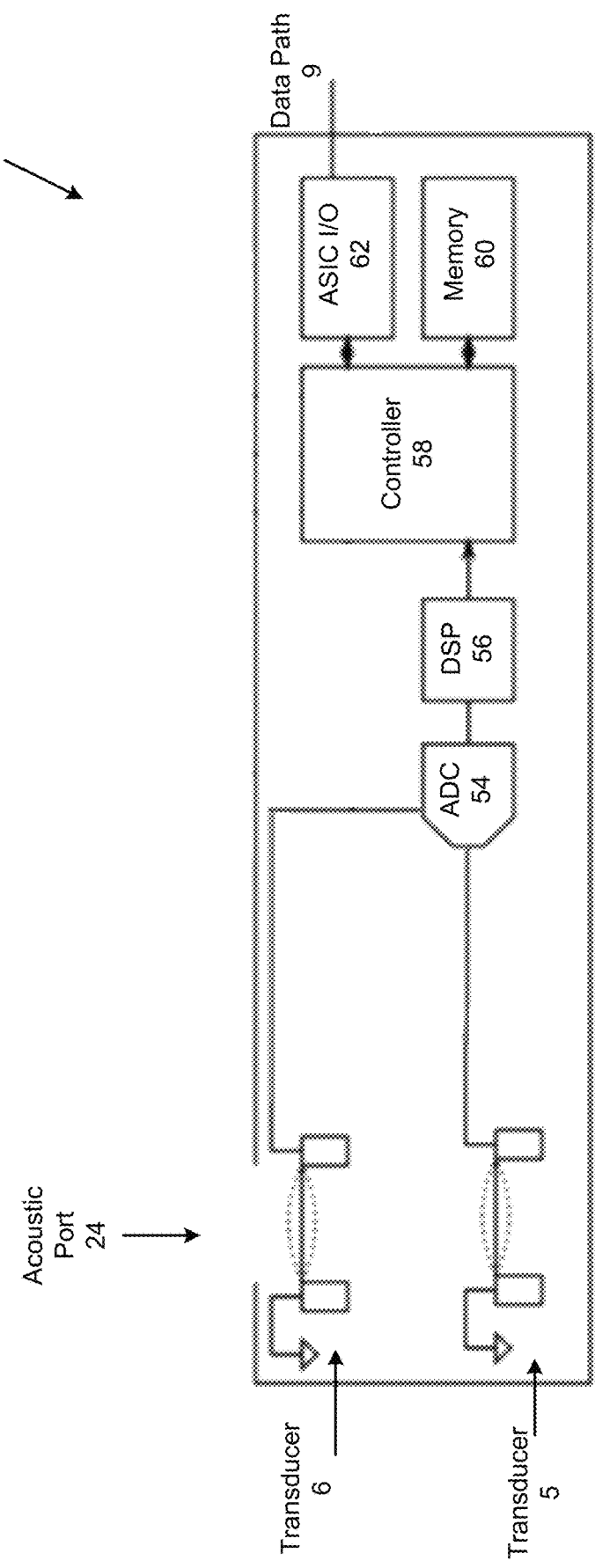
FIG. 1D illustrates aspects of a piezoelectric MEMS sensor device in accordance with aspects described herein.

FIG. 1D illustrates aspects of a piezoelectric MEMS sensor 10D in accordance with aspects described herein. The sensor 10D includes two transducers, shown as the transducer 6 and the transducer 5. The transducer 6 can be a microphone receiving acoustic signals via the acoustic port 24, and the transducer 5 can be a motion detector without exposure to an acoustic port as described above. In some aspects, the transducers 5 and 6 can be implemented on a single MEMS chip such as the MEMS chip 12. In other aspects, multiple different MEMS chips can be used. For example, in one aspect, two MEMS chips can be positioned on a shared substrate under a shared lid, similar to the illustration of FIG. 1A, but with a second MEMS chip in addition to the MEMS chip 1A. Such aspects can also include multiple ASICs, or can use a single ASIC to process analog signals from multiple transducers. FIG. 1D illustrates the sensor 10D with two transducers 6 and 5. Other aspects can include additional transducers, such as transducers for different frequency ranges (e.g., two or more microphones detecting different acoustic frequency ranges or two or more motion sensors detecting different ranges of mechanical vibration frequencies).

Figure 1E:
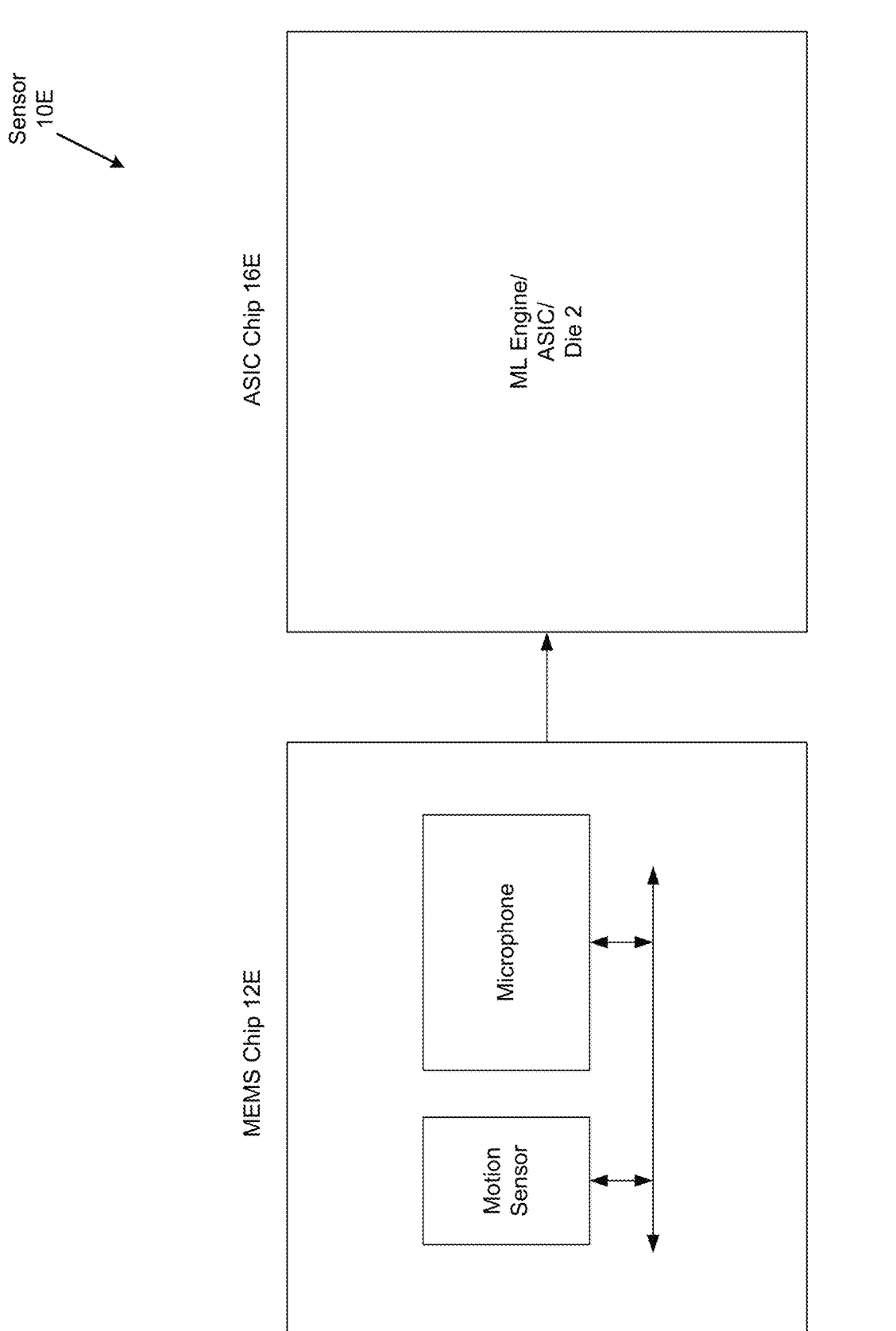
FIG. 1E illustrates aspects of a piezoelectric MEMS sensor device in accordance with aspects described herein.

FIG. 1E illustrates aspects of a piezoelectric MEMS sensor 10E in accordance with aspects described herein. FIG. 1E schematically shows more details of the sensors described above. The sensor 10E illustrates an implementation with a single MEMS chip 12E (e.g., which can be an implementation of the MEMS chip 12 of FIG. 1A) that includes a first die having a motion sensor (e.g., a first piezoelectric mems transducer such as the transducer 5) configured to detect motion, a microphone configured to detect acoustics (e.g., a second piezoelectric mems transducer such as the transducer 6), and a second die implementing a machine learning engine in a separate ASIC chip 16E. The ASIC chip 16E is configured to use the data from the microphone and motion detector to determine information about the contact (e.g., an impact on a surface of an object containing or attached to the sensor 10E). The sensor 10E can be implemented in a package having a base (e.g., the PCB substrate 22) to which all three of these components are mounted. As such, the motion sensor should detect motion of the surface to which it is secured. Alternative embodiments, however, may use two or more packages to form the single sensor (e.g., on a printed circuit board). For example, the motion sensor and microphone may be in a first package while the machine learning engine implemented using the ASIC chip 16E may be in a second package. Other embodiments may divide all three elements into three different packages. As described herein, the MEMS chip 12E can be a shared MEMS die (e.g., the MEMS chip 12 with a microphone and a motion detector mounted on the PCB substrate 22 configured as a package substrate). Such a configuration with two sensors on the same die and a machine learning engine (e.g., the ML engine 7) integrated onto an ASIC chip (e.g., the ASIC chip 16) provides for a device with an improved compact form factor compared to a device with each component configured in separate discrete chips (e.g., two separate MEMS sensors, a separate ASIC, and a separate ML IC).

Figure 2:
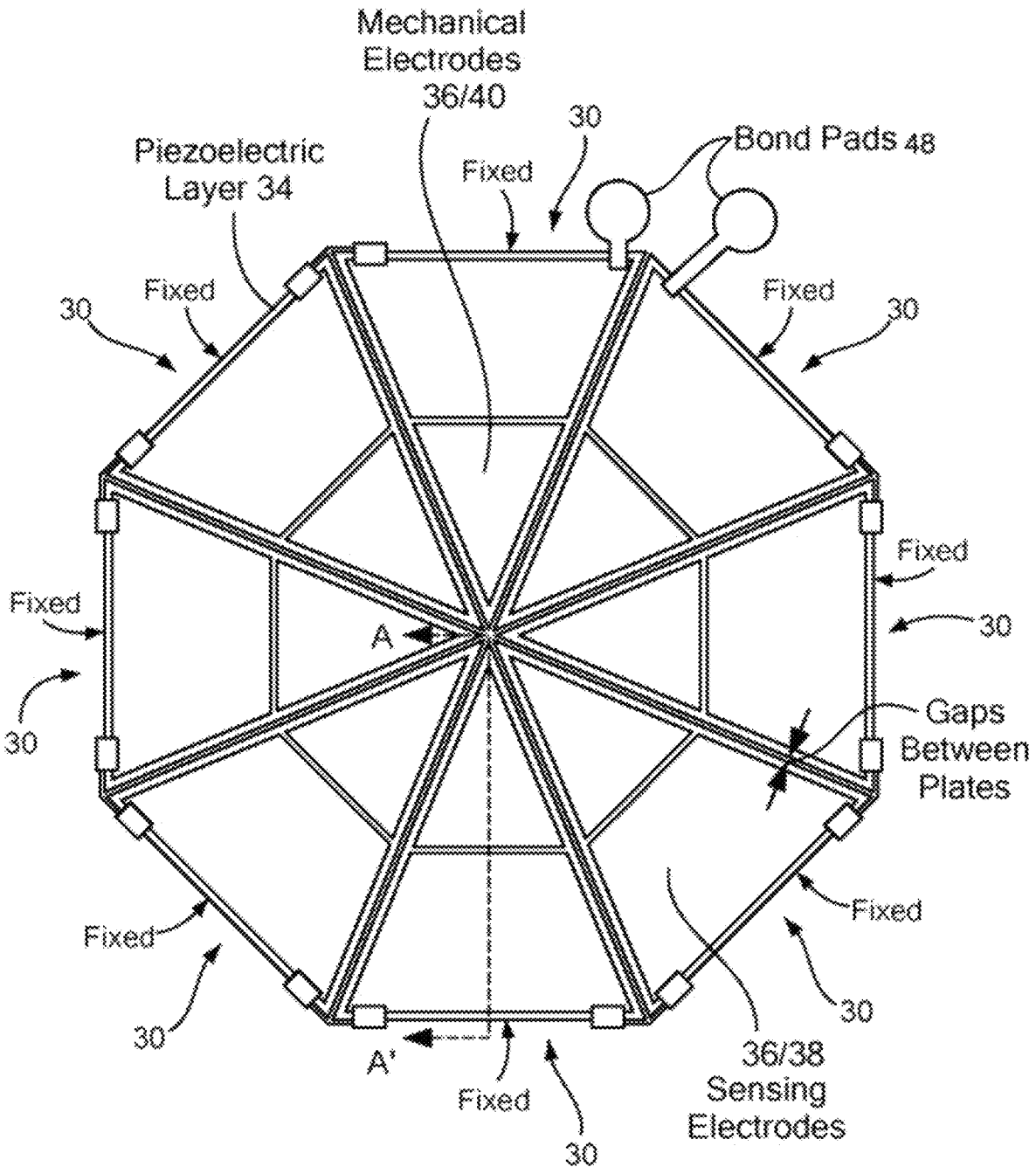
FIG. 2 illustrates a plan view of a piezoelectric MEMS transducer that may be used in accordance with aspects described herein.

FIG. 2 illustrates a plan view of a piezoelectric MEMS transducer that may be used in accordance with aspects described herein. FIG. 2 schematically shows a plan view of a piezoelectric MEMS acoustic transducer of a MEMS chip (e.g., the MEMS chip 12) using eight MEMS cantilevers (e.g., also known as "sense arms", "sense members", "beams", or "cantilevered beams") formed as piezoelectric triangular cantilevers 30. These members together form an octagonal MEMS transducer that can be used to implement a microphone (e.g., with an associated acoustic port) or a motion sensor (e.g., without an associated acoustic port). In the aspects described above, one implementation of the transducer of FIG. 2 can implement the transducer 5, and a second implementation of the transducer of FIG. 2 can implement the transducer 6. In other implementations, different transducer designs can be used for acoustic or mechanical signal detection.

In FIG. 2, each cantilever 30 has a piezoelectric structure formed in a piezoelectric layer 34, with the structure of each of the eight cantilevers 30 having an associated fixed end and an associated central end. The central end of each cantilever 30 in FIG. 2 meet near a center, with edges of each cantilever 30 separated from adjacent cantilever by baps between the cantilevers 30, as illustrated. During operation, the fixed ends remain stationary, and pressure from acoustic signals (e.g., from the acoustic port 24) incident on the cantilevers 30 causes a pressure differential, which causes the cantilevers 30 to deflect in and out (e.g., via a slight rotation around the fixed end). The deflection causes an electrical signal from the sensing electrodes 36/38 which creates the electrical signal that can be amplified by an analog front end and passed to processing circuitry as an audio signal. The mechanical electrodes 36/40 provide mechanical structure in the central end of each cantilever 30 of the.

Each cantilever 30 is positioned with sides adjacent to sides of another of the cantilevered beams separated by the gap between the cantilevers. The position of the eight cantilevers 30 with the gaps creates a symmetrical polygon shape bounded by the fixed bases around the outside of the symmetrical polygon (e.g., an octagon, with one exterior side for each of the cantilever 30). In other aspects, other shapes can be used. In other implementations, MEMS acoustic transducers can include cantilevered beams with different beam shapes for the same transducer, so long as the fixed exterior edges attached to the substrate form an enclosed transducer that separates air on one side (e.g., a pocket side) from air on another side (e.g., an acoustic port side similar to the acoustic port 24) using the cantilevered beams (e.g., the cantilevers 30) and gaps between the beams. The separation allows the pressure difference between the sides of the MEMS transducer to apply force to the beams and generate a signal that can be communicated to an analog front end and then to additional processing circuitry via the bond pads 48. Similarly, an electrical signal provided from transmit circuitry (e.g., such as Tx circuitry 52 of FIG. 1C) can cause the cantilevers 30 to deflect, generating an acoustic signal.

As illustrated in FIG. 2, the cantilevers 30 have an associated length, determined by the line segment from the tip of the central end that is perpendicular to the fixed extreme end of the fixed end. The line segment extends from the fixed end at the substrate to the tip of the central end. As described above, when sound vibrations are present at a surface of the deflection beams, the cantilevered beams will move due to the pressure (e.g., z direction movement in and out of the x-y plane illustrated in FIG. 2. The movement in and out of this plane is referred to herein as vertical deflection. The deflection at the fixed end will be less than the deflection at the central end, with the amount of deflection increasing along the distance of the line segment away from the substrate toward the tip of the central end. The electrodes that generate the electrical signals at the bond pads 48 in response to the acoustic vibrations on the cantilevers 30 can add rigidity to the cantilever 30, and so in some implementations, placement of the sensing electrodes 36/38 can be limited to a space approximately two-thirds of the line segment distance from the fixed attachment to the substrate at the fixed end towards the tip of the central end (e.g., limited to a fixed end). In some implementations, an electrode layer can cover a surface or x-y plane cross section of the entire illustrated fixed end of each of the cantilevered beams. In other implementations, smaller electrode shapes can be used in a portion of the fixed end of each of the cantilevers 30. In some aspects, the central end of each of the cantilevered beams does not include electrode layers. In some aspects, the electrode layers do not extend to the tip of the central end (e.g., the free movement end) of each cantilever 30 to avoid sensing free end movement in the deflection end (e.g., where the signal which is proportional to the stress in the cantilever) is lower.

Figure 3:
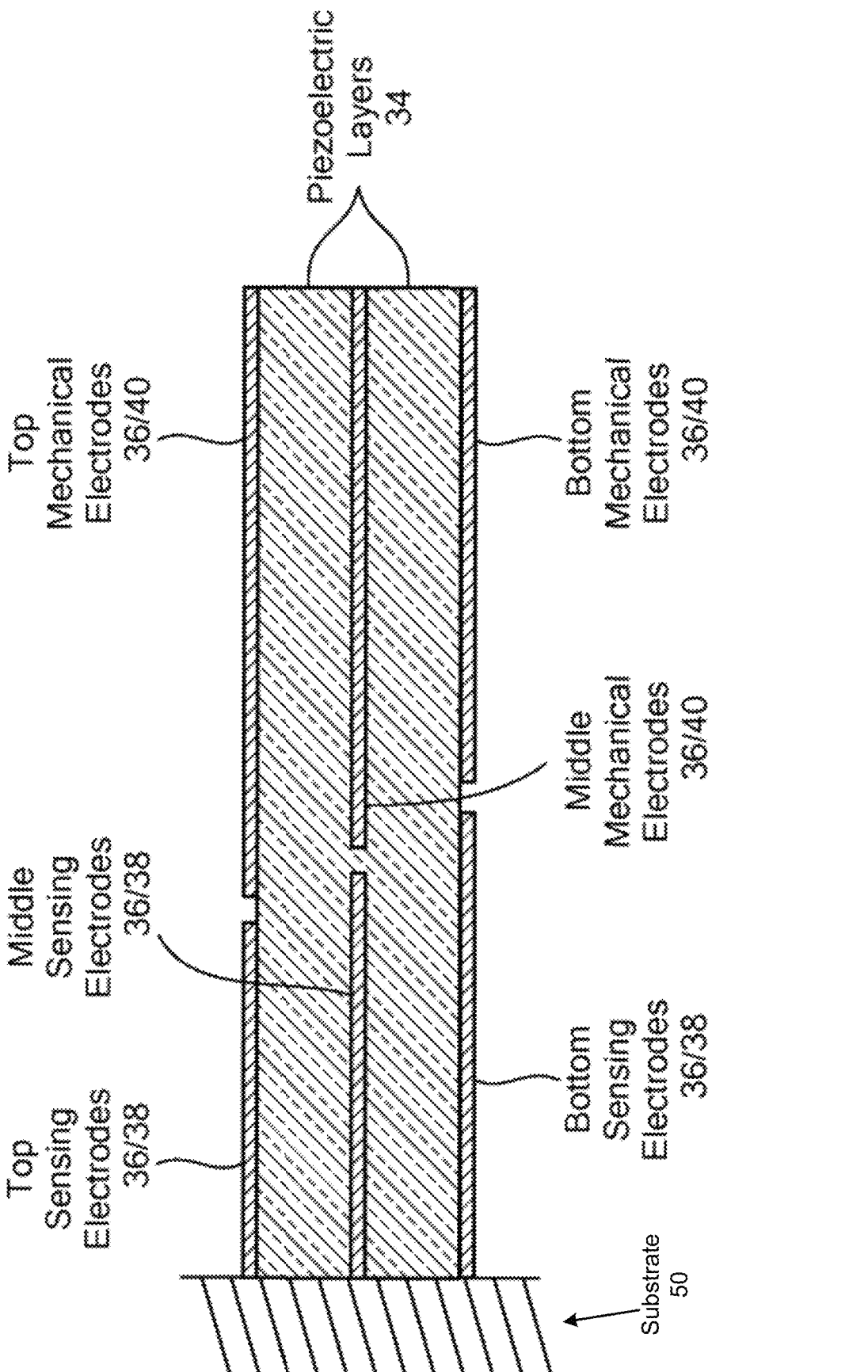
FIG. 3 illustrates a cross-sectional view of one portion of a piezoelectric MEMS beam that can be used in accordance with aspects described herein.

FIG. 3 illustrates a cross-sectional view of one portion of the MEMS microphone of FIG. 2 accordance with aspects described herein. FIG. 3 shows an example cross-sectional view of one of those cantilevers 30. Other aspects of a piezoelectric MEMS acoustic transducer may use more or fewer cantilevers 30. Accordingly, as with other features, discussion of eight cantilevers 30 is for illustrative purposes only. These triangular cantilevers 30 are fixed to a substrate 50 (e.g., a silicon substrate) at their respective bases and are configured to freely move in response to incoming/incident sound pressure (i.e., an acoustic wave). The intersection of the substrate 50 and the piezoelectric layers (e.g., as well as the electrodes at the substrate 50) are the fixed end of the cantilever(s) 30. Triangular cantilevers 30 can provide a benefit over rectangular cantilevers as the triangular cantilevers can be more simply configured to form a gap controlling geometry separating an acoustic port (e.g., the acoustic port 24) on one side of the cantilevers of the piezoelectric MEMS acoustic transducer from an air pocket on the other side of the cantilevers. Specifically, when the cantilevers 30 bend up or down due to either sound pressure or residual stress, the gaps between adjacent cantilevers 30 typically remain relatively small and uniform in the example symmetrical shapes with fixed ends using the triangular cantilevers 30.

The electrodes 36 are generally identified by reference number 36. However, the electrodes used to sense signal are referred to as "sensing electrodes" and are identified by reference number 38. These electrodes are electrically connected in series to achieve the desired capacitance and sensitivity values. In addition to the sensing electrodes 38, the rest of the cantilever 30 also may be covered by metal to maintain certain mechanical strength of the structure. However, these "mechanical electrodes 40" do not contribute to the electrical signal of the microphone output. As discussed above, some aspects can include cantilevers 30 without mechanical electrodes 40.

As described above, as a cantilever 30 bends or flexes around the fixed end, the sensing electrodes 36/38 generate an electrical signal. The electrical signal from an upward flex (e.g., relative to the illustrated positioning in FIG. 3, will be inverted compared with the signal of a downward flex. In some implementations, the signal from each cantilever 30 of a piezoelectric MEMS acoustic transducer can be connected to the same signal path so that the electrical signals from each cantilever 30 are combined (e.g., a shared bond pads 48). In other aspects, each cantilever 30 may have a separate signal path, allowing the signal from each cantilever 30 to be processed separately. In some aspects, groups of cantilevers 30 can be connected in different combinations. In some aspects, switching circuitry or groups of switches can be used to reconfigure the connections between multiple cantilevers 30 to provide different characteristics for different operating modes, such as transmit and receive modes.

In one aspect, adjacent cantilevers 30 can be connected to separate electrical paths, such that every other cantilever 30 has a shared path. The electrical connections in such a configuration can be flipped to create a differential signal. Such an aspect can operate such that when an acoustic signal incident on a piezoelectric MEMS acoustic transducer causes all the cantilevers 30 to flex upward, half of the cantilevers 30 create a positive signal, and half the cantilevers 30 create a negative signal. The two separate signals can then be connected to opposite inverting and non-inverting ends of an amplifier of an analog front end. Similarly, when the same acoustic vibration causes the cantilevers 30 to flex downward, the signals of the two groups will flip polarity, providing for a differential electrical signal from the piezoelectric MEMS acoustic transducer.

Alternatively, rather than alternating cantilevers 30 within a single piezoelectric MEMS transducer to create a differential signal, identical MEMS transducers can be placed across a shared acoustic port (e.g., the acoustic port 24), with the connections to the amplifier of an analog front-end reversed and coupled to different inverting and non-inverting inputs of a differential amplifier of the analog front-end to create the differential signal using multiple piezoelectric MEMS transducers.

The cantilever 30 can be fabricated by one or multiple layers of piezoelectric material sandwiched by top and bottom metal electrodes 36. FIG. 3 schematically shows an example of this structure. The piezoelectric layers 34 can be made by piezoelectric materials used in MEMS devices, such as one or more of aluminum nitride (AlN), aluminum scandium nitride (AlScN), zinc oxide (ZnO), and lead zirconate titanate (PZT). The electrodes 36 can be made by metal materials used in MEMS devices, such as one or more of molybdenum (Mo), platinum (Pi), nickel (Ni) and aluminum (Al). Alternatively, the electrodes 36 can be formed from a non-metal, such as doped polysilicon. These electrodes 36 can cover only a portion of the cantilever 30, e.g., from the base to about one third of the cantilever 30, as these areas generate electrical energy more efficiently within the piezoelectric layer 34 than the areas near the central end (e.g., the free movement end) of each cantilever 30. Specifically, high stress concentration in these areas near the base induced by the incoming sound pressure is converted into electrical signal by direct piezoelectric effect.

Figure 4:
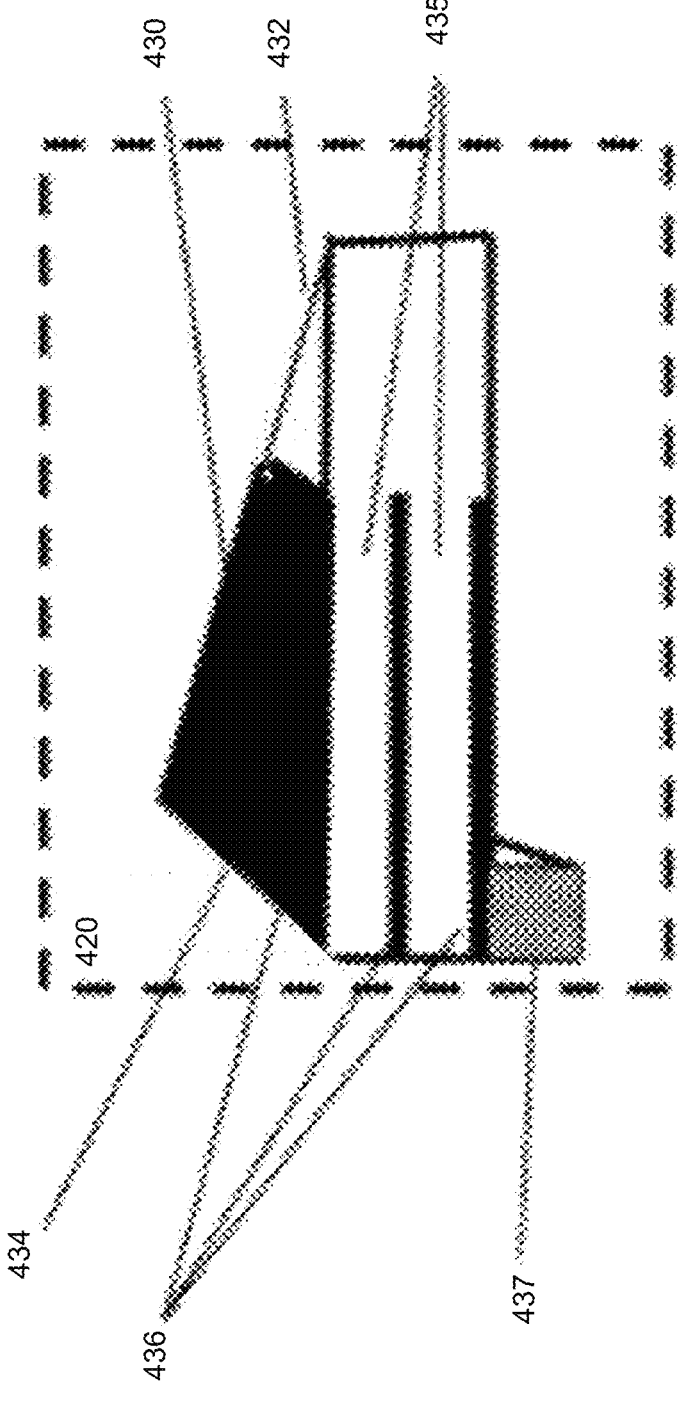
FIG. 4 illustrates an isometric view of piezoelectric MEMS beam that can be used in accordance with aspects described herein.

FIG. 4 is a perspective view of a portion 420 of a piezoelectric transducer in accordance with embodiments described herein. FIG. 4 illustrates a single cantilevered beam that can be part of a larger acoustic transducer as described herein. The cantilevered beam in the portion 420 is mounted on a substrate 437. In various implementations, the illustrated substrate 437 surface that is coupled to the cantilevered beam can be a top surface, a bottom surface, or any other surface that allows the beam to be cantilevered over an acoustic port to allow sound waves to make contact with the beam and displace the beam based on the pressure difference on opposite sides of the cantilevered beam. The cantilevered beam in the portion 420 has three electrode layers 436 that separate portions of the piezoelectric material that make up a first piezoelectric structure. The cantilevered beam has a first end 434 and a second end 432. A top surface visible in the perspective of FIG. 4 has the portion of the top surface two thirds of the way from the first end covered by one of the electrode layers 436. A first side 435 is facing the perspective of FIG. 4, and a second side 430 (not visible) faces away from the perspective of the FIG. 4. The first end 434 is coupled to the substrate 437, and the second end 432 is cantilevered away from the substrate and the first end. The first side and the second side 430 can each be separated from adjacent cantilevered beams having identical structure to the cantilevered beam of FIG. 4. A plurality of such beams can be configured to enclose a symmetrical polygonal shape, where each corresponding piezoelectric structure has a same triangular shape in a shared piezoelectric layer (e.g., combining to form piezoelectric acoustic transducers such as the transducer of FIG. 2). Each of the cantilevered beams of such a transducer comprises cantilevered beams such as the beam of FIG. 4 separated from adjacent beams by a gaps between the sides. In such a configuration the first cantilevered beam is positioned adjacent to the second cantilevered beam separated by a gap between the first side of the first piezoelectric structure and the first side of the second piezoelectric structure, with a corner of the first end of the first cantilevered beam coupled to the substrate separated from a corner of the first end of the second cantilevered beam coupled to the substrate by an initial gap. The enclosed membrane configuration with a central portion of the membrane being where the tips of the cantilevered beams meet can particularly be used for acoustic transducers where pressure variations across the membrane (e.g., and each beam of the membrane) over time can impact low frequency performance for transduction of acoustic signals from an acoustic port. For motion detection transducers, other beam shapes without an enclosed membrane structure (e.g., such as the enclosed structure illustrated in FIG. 2) can be used with limited or no impacts on performance. Such shapes can for example, include beams with rectangular top profiles (e.g., instead of the triangular top profile of FIG. 4.

Figure 5:
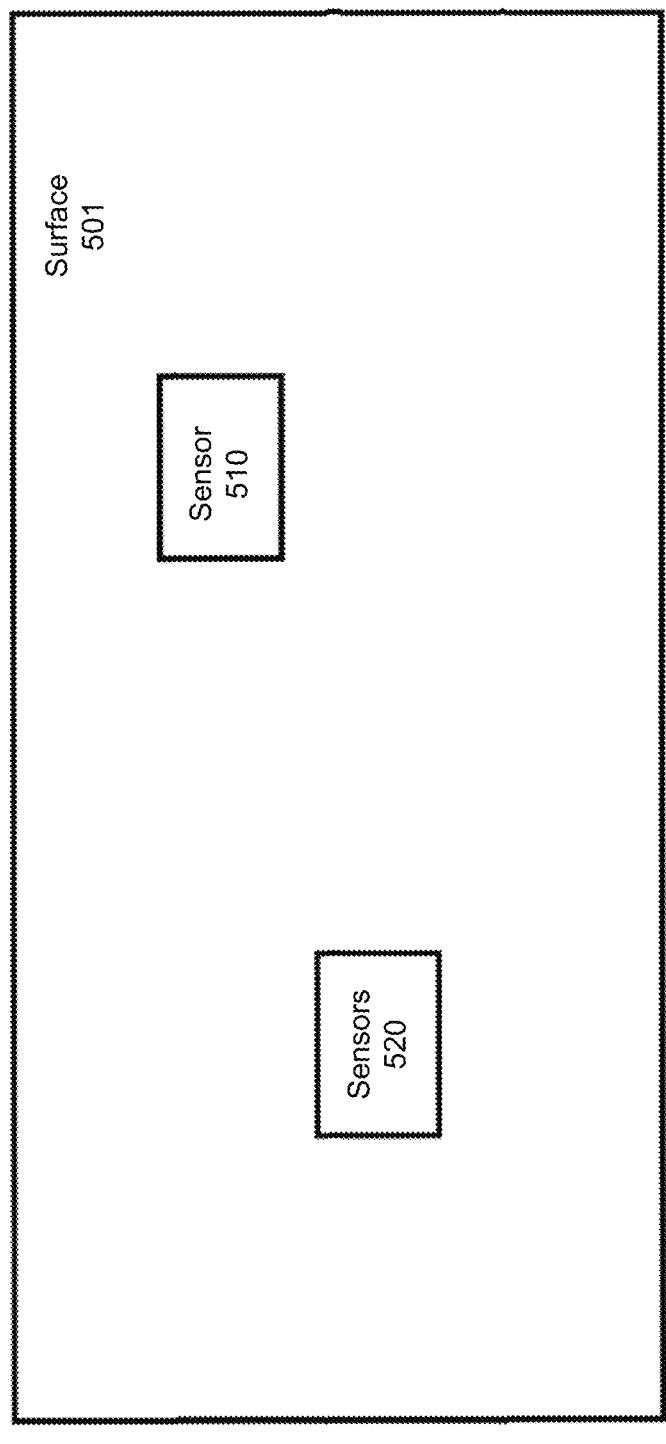
FIG. 5 illustrates aspects of a system including a piezoelectric MEMS transducer in accordance with aspects described herein.

FIG. 5 illustrates aspects of a system including a piezoelectric MEMS transducer in accordance with aspects described herein. FIG. 5 schematically shows a surface 501 with a plurality of sensors configured in accordance with illustrative embodiments. By way of example, the surface 501 may be the panel of a car, such as a car door or fender. As shown, the surface 501 has sensor 510 and sensor 520 mounted to it. In some aspects, the surface 501 having sensors 510, 520 mounted on the surface 501 can be an interior surface to protect the sensors. In other aspects, the sensors can be mounted on externally facing surfaces of an object to improve response times and quality of vibration signals received at sensors, with externally facing sensors configured to be replaced following damaging contacts, and systems using multiple sensors to identify when a collision may damage externally facing sensors or when non-damage contact or collisions occur. In other aspects, the sensors can be in any position on a surface of an object where vibrations are transmitted to the sensors. In some aspects, a single sensor can be used, or more than two sensors can be used. The sensors 510, 520 can be any of the sensors of FIGS. 1A-E, 2, 3, etc. illustrated above, or any similar sensors.

The sensors 510, 520 can include internal controls or closely connected controls (e.g., managed by a controller such as the controller 58 to allow operation in a lower power mode until vibrations having a threshold energy value are detected. When the vibrational energy detected at one or more of the plurality of sensors exceeds the threshold energy value, the controller can shift to an operating mode in a configuration to detect a contact with the surface 501. The sensors can then generate output data for classification circuitry that can be used to determine whether a type of contact is associated with one or more actions to be taken by control circuitry (e.g., the control circuitry 8 or a processor 2210). The classification circuitry, for example, can differentiate among types of contact and/or make other determinations related to the contact. Such determinations can relate to a severity or magnitude of a contact (e.g., including no-contact incidents associated with acoustic vibrations) with an object or the surface 501 of the object (e.g., a hard or soft contact, or a no-contact acoustic signal) and whether the contact damaged the surface 501 or another surface of the object (e.g., such as a scratch or dent on a car panel).

As indicated above, the each of the plurality of sensors 510, 520, and additional sensors can include multiple transducers to generate data used by classification circuitry to make such determinations. In some aspects, each of the plurality of sensors includes a first piezoelectric MEMS transducer and a second piezoelectric MEMS transducer (e.g., similar to any transducer described above such as the transducer of FIG. 2 or a transducer with a piezoelectric beam as described in FIG. 3 or 4 or any similar piezoelectric beam for electromechanical signal transduction). The first piezoelectric microelectromechanical systems (MEMS) transducer has a first output, where the first piezoelectric MEMS transducer is mechanically coupled to a surface of an object having the surface 501 and/or additional surfaces, and where the first piezoelectric MEMS transducer is configured to generate a first analog signal at the first output when the first analog signal is transduced by the first piezoelectric MEMS transducer from vibrations propagating through the object. Similarly, the second piezoelectric MEMS transducer has a second output, where the second piezoelectric MEMS transducer is configured to generate a second analog signal at the second output when the second analog signal is transduced by the second piezoelectric MEMS transducer from acoustic vibrations incident on the surface of the object. Classification circuitry coupled to the output of first piezoelectric MEMS transducer and the output of the second piezoelectric MEMS transducer operates to process data from the first analog signal and data from the second analog signal (e.g., as modified from the analog signals by an ADC, a DAC, a controller, etc.). The classification circuitry can operate using various thresholds or categorization mechanisms to generate an output categorizing combinations of the first analog signal and the second analog signal received during one or more time frames.

As illustrated in FIG. 5 the sensor 510 and the sensor 520 are each positioned in different locations. The sensor 510 is positioned at a first position on the surface 501 of the object and the sensor 520 is positioned at a second position on the surface of the object at a predetermined distance from the first position. Sensors 510, 520 and any additional sensors present on an object may cooperate to determine a location and/or a direction the direction of contact. For example, if a key is dragged across a car door, the sensors may be configured to recognize the contact, duration, velocity, location, magnitude, and/or direction of the key/door contact. In this manner, various embodiments may be considered to have formed a touch surface, analogous to a touch screen, which has that functionality. As noted above, however, some embodiments may have no more than a single sensor on a surface. Such an embodiment therefore may not provide the functionality of the embodiments with two or more sensors on a single surface. In some aspects, the classification circuitry is configured to detect a position of an impact on the surface of the object based on a time delay or a magnitude difference between vibrations detected by different sensors such as the sensors 510 and the sensor 520 based on the known positions of the sensors 510, 520.

Figure 6A:
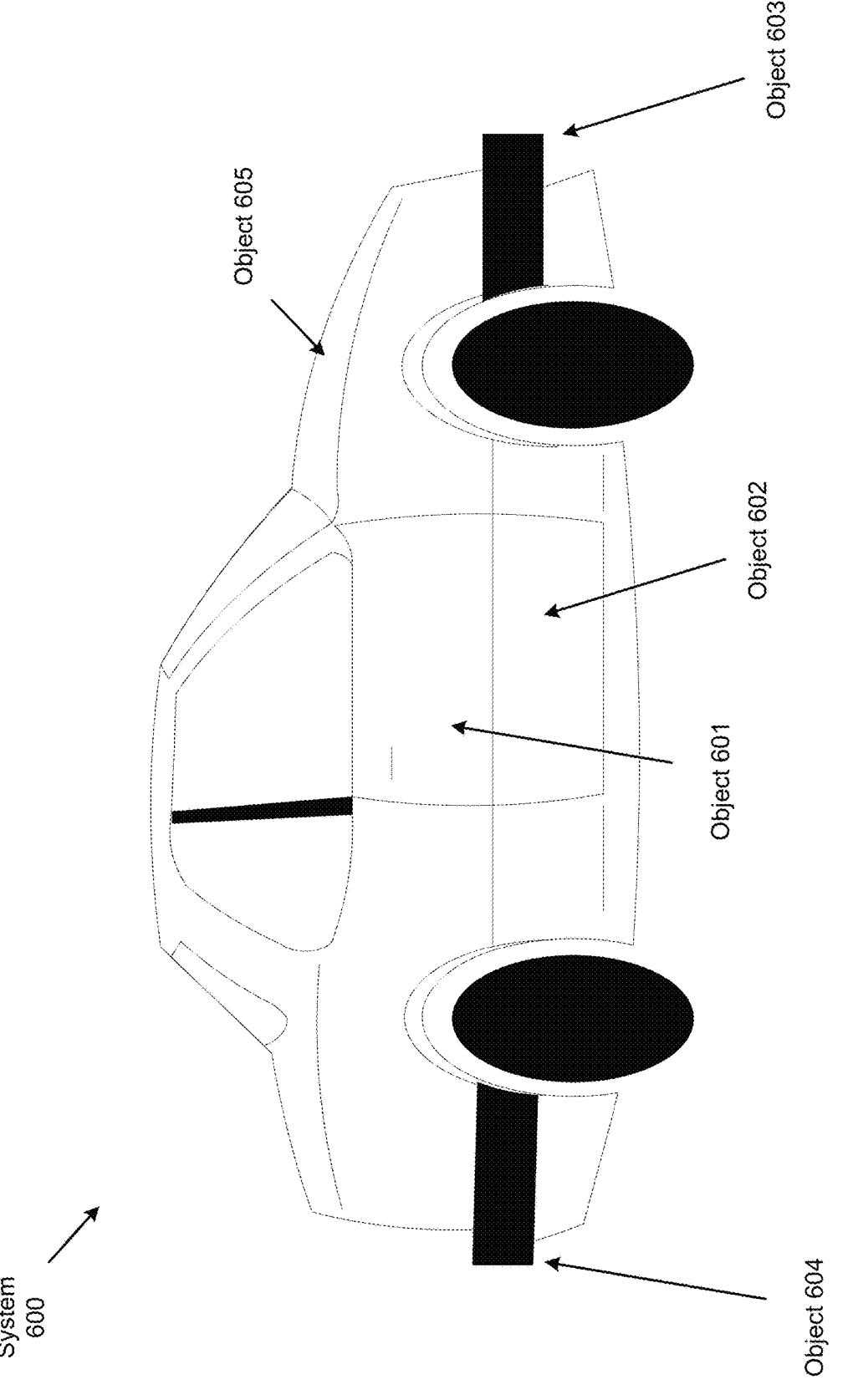
FIG. 6A illustrates aspects of a system including a piezoelectric MEMS transducer in accordance with aspects described herein.

FIG. 6A illustrates aspects of a system 600 including a piezoelectric MEMS transducer in accordance with aspects described herein. The system 600 is a car including a plurality of objects that make up the car. FIG. 6A illustrates a plurality of different objects 601, 602, 603, 604, and 605 that partially make the car of the system 600. The object 601 is an upper car door panel, the object 602 is a lower car door panel, the object 603 and the object 604 are ach bumpers, and the object 605 is a hood panel. Each of the objects 601 through 605 can be solid panels or objects that have consistent mechanical characteristics related to the transmission of mechanical or acoustic vibrations through the object. For any of the objects 601 through 605, a collision or impact on an outward facing surface generates both acoustic and mechanical vibrations on an interior surface of the object where sensors can be mounted, such as the surface 501 of FIG. 5.

Additionally, while multiple sensors, such as sensors 510, 520 in a single panel on a surface 501 can have similar signals due to the sensors being mounted on a same surface of a panel, sensors mounted in different objects such as the object 601 and the object 602 can also provide data to classification circuitry that can be used in classifying data. For example, sensors such as the sensor 10D of FIG. 1D can have high sensitivity and can detect, for example, vibrations from the closing of another car door near the object 602 where no physical contact occurs with the object 602. Similarly, if sensors in the object 602 and the object 601 detect similar acoustic vibrations, but much stronger mechanical or motion vibrations are detected by sensors in the object 601, data from transducer signals can be used by classification circuitry to analyze a possible impact on an exterior surface of the object 601. If the object 602 has multiple sensors, the sensors can assist in providing an estimated location of an impact on the object 601, or on another object not containing a sensor, such as a glass window above the door panel of the object 601. Similarly, sensors in the bumper objects 604 and 603 can provide data to assist in classification of an impact on either bumper.

A testing mode of a system such as the system of FIG. 1A can be used with the system 600 to generate machine learning data that can be used by a classification system to identify patterns of data to associate with control system alerts (e.g., automatically generated alerts managed by the control circuitry 8) and patterns of signals to differentiate from important classifiers. For example, in a training mode, sensors of the system 600 (e.g., attached to surfaces of the objects 601 through 606) can record data. The data can be matched to known events or past context types associated with training data, which can be used to train machine learning circuitry (e.g., the machine learning engine 7). Such data and matched known events can, for example, be bumper collisions, car doors hitting a panel or other object of the system 600 and creating a paint scratch, rain incident on the system 600, or a key scratch. After training of the classification circuitry (e.g., the machine learning engine 7), an operating mode can be used to detect signals that match the known events from the training. Control circuitry can then be configured to take actions when known events associated with actions occur. For example, when a data matching an adjacent car door hitting an object of the system 600 occurs, a camera can be activated to capture images of the object and any damage or paint scratch occurs or to confirm a non-damage classification, and to capture details of the adjacent car that caused the impact or an area surrounding the impact. Similarly, data matching a key scratch can be used to initiate video capture and/or do send a wireless communication signal to a mobile device associated with the system 600. Data associated with a balloon popping, by contrast, can be identified as a non-contact event or an event with no associated action to be initiated by a system.

In a system such as the system 600 of FIG. 6A, each sensor can provide data to a central system or computing device similar to the computing device of FIG. 11. Such a central computing device can accept the data as generated from transducer analog signals (e.g., using ADC, DAC, and controller circuitry in a sensor package), process aggregated sensor data to determine if a contact occurred, and to classify the contact and perform any control system actions dictated for a given contact type.

Training data generated using the system 600 can be provided with copies of the system 600 so that similar systems have access to a memory storing known similar information. For example, an automotive manufacturer may have the training data and provide access to that data and include a system for generating and updating training data from users. The data can be produced using a representative sample of the specific sensor itself (e.g., a sample of the sensor system, which includes the motion sensor and microphone). Other embodiments may use the sensor being trained to produce known contacts and recording the response of the system. In either case, those responses are stored and used by classification circuitry and/or an associated machine learning engine. As discussed below, those responses produce a plurality of motion data hallmarks (sometimes referred to herein as "motion data" or "representative data characteristics") that are correlated to specific contact or event types (e.g., as detailed further below in FIGS. 7, 8, and 9).

Additionally, while automotive applications are discussed, various embodiments may apply to other applications. For example, the surface 501 may be a surface of an object such as an element of a robots, a storage containers, walls of buildings, hulls of ships, airplane panels, etc. Any such system can include one or more sensors in accordance with aspects described herein. The sensor or sensors in any such system can include a package containing a motion sensor configured to detect motion, a microphone configured to detect acoustics, and a machine learning engine configured to use the data from the microphone and motion detector to determine information about the contact. The package has a base to which all three of these components are mounted. As such, the motion sensor should detect motion of the surface to which it is secured. Alternative embodiments, however, may use two or more packages to form the single sensor (e.g., on a printed circuit board). For example, the motion sensor and microphone may be in a first package while the machine learning engine may be in a second package. Other embodiments may divide all three elements into different packages.

In some aspects, the sensors can be configured as low power wake-up, high bandwidth, and/or low noise floor sensors. A low noise floor of piezoelectric MEMS transducers allows collection of significant amounts of data, but risks false alerts automatically being generated at excessive rates without contact signal thresholds and classification circuitry to limit excess signaling that can occur if user alerts or notifications are generate for all sensor signals above a noise floor. In some aspects, piezoelectric MEMS transducers of sensors (e.g., the sensors 510, 520) have a noise floor of approximately 100 micrograms (ug) per square root of vibration frequency (sqrt (Hz)) (ug/sqrt (Hz)). Other sensors can have a noise floor of approximately 0.5 ug/sqrt (Hz) at 1 kHz, 50 ug/sqrt (Hz) to 5 ug/sqrt (Hz) at 1 kHz. In some aspects, different transducers for acoustic and mechanical vibration sensing can have different characteristics. (e.g., a motion sensor may have a noise floor of between 100 ug/sqrt (Hz) and 0.05 ug/sqrt (Hz) at device resonance and/or 5 ug/sqrt (Hz) to 0.05 ug/sqrt (Hz) at resonance with an acoustic sensor having a different noise floor). In addition, in some aspects a sensor can have a detection bandwidth for vibrations between 1 Kilohertz and 8 Kilohertz. In other examples, other frequency ranges can be used, with less data for a ML algorithm as bandwidth is reduced, and more ML processing resources needed for additional ML data as bandwidth is increased. In some aspects, a sensors can be configured to operate with an overall sensor power usage of 20 Microwatts or less during a low-power pre-wake up mode. Different implementation environments can use different sensor designs in accordance with aspects described herein. Here, the noise floor has units of acceleration given in standard gravitational units (g), where one g is 1× the earth's gravitational acceleration (1 g=~9.8 m/s2). The difference with prior transducers is that prior systems may have been around 300 millionths of a g per square root of a cycle (ug/sqrt (Hz)) at 1 kHz and examples described herein can operate at about 13 ug/sqrt (Hz). Within a narrow band around resonance, our noise floor is below 1 ug/sqrt (Hz).

As illustrated, objects including MEMS sensors can be car components. In some aspects, sensors can be placed in portions of an object, such that a single panel can have MEMS sensors in components, such as separate sensors in upper right part of the door, lower right part of the door, upper left part of the door, lower left part of the door, center of the door, or in portions of a panel defined by relative positioning and directionality of sensors included in the panel. As described below with respect to FIG. 6B, in some aspects, directional MEMS sensors can be used, and relative positioning and directional orientation can both be used for configuring placement of sensors (e.g., to have directional sensing of 360 degrees, so the location of the area that is a section represents a sector depending on the number of sensors in addition to the placement of various MEMS sensors. Similarly, in some aspects, three dimensional spaces in an object volume (e.g., a space in-between the car door and a second object or a contact location) can be represented by zones, different fields of view or sectors, (e.g., for positional location of sounds that occur remotely from a system, such as a distant car door slamming in a position remote from the car of FIG. 6A.)

Further, while different aspects are described in the context of different packaging configurations, it will be apparent that a wide variety of integrated packaging of multiple or single transducers and supporting circuitry can be used in different applications. For example, while some aspects above show motion detectors, acoustic detection microphone, and a machine learning engine in a single die integrated package, other aspects can operate with separate dies and packages for each of these objects.

Figure 6B:
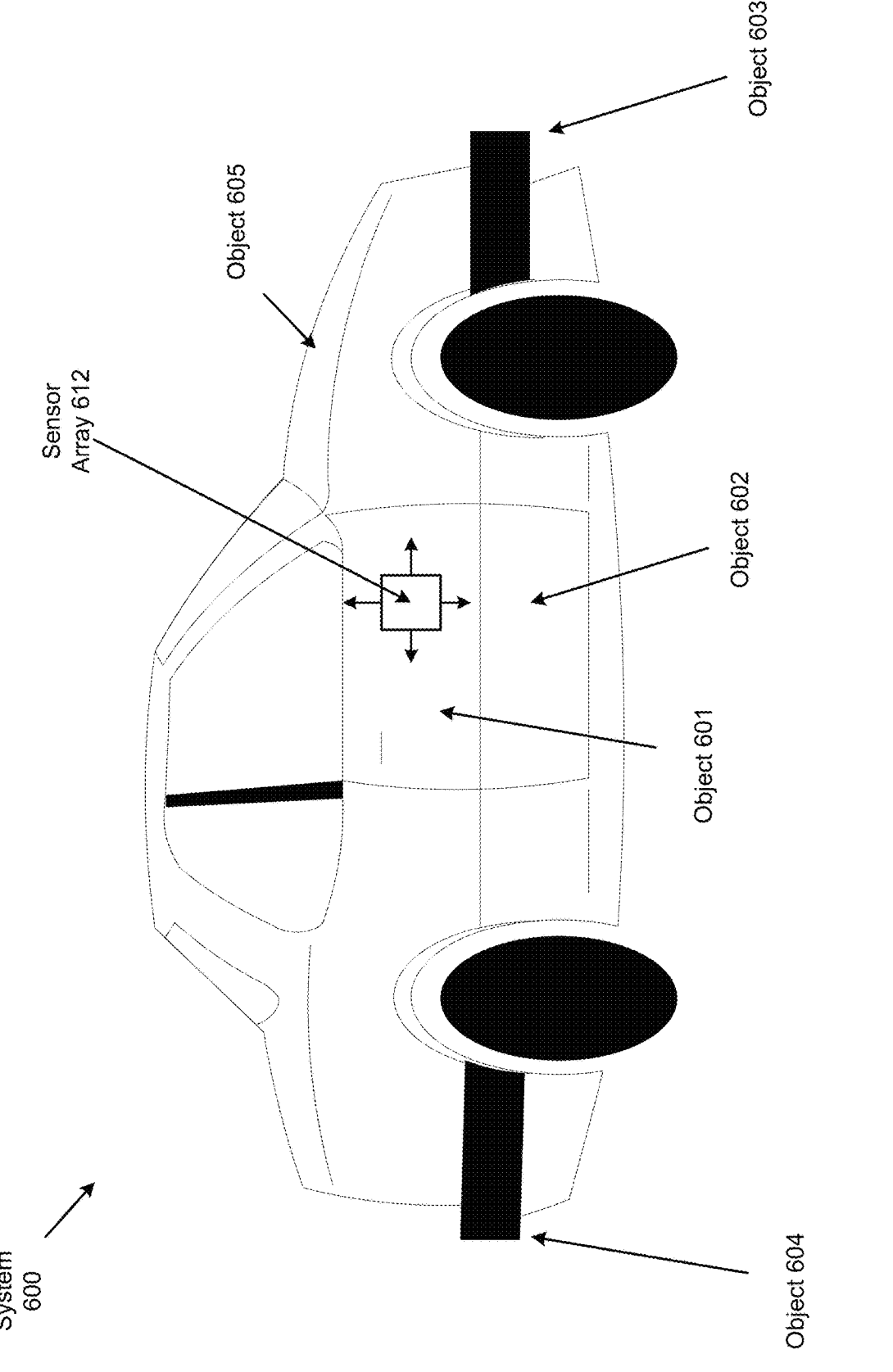
FIG. 6B illustrates aspects of a system including one or more arrays of piezoelectric MEMS transducers in accordance with aspects described herein.

FIG. 6B illustrates aspects of a system including one or more arrays of piezoelectric MEMS transducers in accordance with aspects described herein. FIG. 6B illustrates the automobile system of FIG. 6A, with a sensor array of MEMS detectors (e.g., which can include pairs of motion and acoustic sensors). As described above, MEMS sensors can be configured with a directionality, due to the orientation of the cantilevered beams, the position of an acoustic port (e.g., the acoustic port 24), or other configurations. FIG. 6B illustrates an array 612 of sensors (e.g. shown with an up/down/left/right set of directions). The array 612 allows for localized detection of a contact. Multiple such arrays 612 can allow directional identification of a contact location from directional data in the arrays 612. In some aspects such directionality can be an alternative to, or in addition to, position determined from delays in signals received at sensors with known relative positions (e.g., with a combined system approximating a contact location from both directional data and delay-time circles associated with a time a signal from a same contact is received at different sensors). A controller or DSP or something in the processor can combine two sensor (e.g., microphone) signals from two or more microphone sensors are configured to detect different directions of arrival from audio sources, (e.g., through audio beamforming). Having two or more microphones located on different axis or different sections of a MEMS structure like in FIG. 2, allows for detection different directions of arrival from one or more audio sources. Based on coordination in a controller integrated into one or more processors of the plurality of microphone signals the detection of directions can span the different areas or sectors mapped to different parts of a surface of the first object (e.g., a door.)

As noted above, the machine learning engine determines the type of motion. Accordingly, illustrative embodiments train the machine learning engine to provide that functionality. To that end, FIGS. 7, 8, and 9 illustrate operations that can be used to generate either training data or operating data. Training data is matched with a known event to generate machine learning system associations between data patterns and events, and operating data is provided by sensors to classification circuitry during operation to allow the classification circuitry to indicate if the operating data is associated with a pattern identified by the machine learning engine during training. shows one process of training. Those skilled in the art may use other techniques for training the machine learning engine. This methods therefore should be considered examples simplified from longer processes that may be used to train the machine learning engine. Accordingly, the illustrated methods of FIGS. 7, 8, and 9 can be practices with additional, repeated, or intervening steps. Those skilled in the art therefore can modify the process as appropriate.

FIG. 7 illustrates a method associated with piezoelectric MEMS contact detection systems in devices in accordance with aspects described herein. FIG. 7 illustrates an example method 700 for operation of a transducer system (e.g., a system in accordance with any aspect described above). In some aspects, the method 700 is implemented by a transducer system, such as a system integrated with a device within a computing system or device (e.g., a computing device 1100) as described below. In some aspects, the method 700 is implemented as computer readable instructions in a storage medium that, when executed by processing circuitry of a device, cause the device to perform the operations of the method 700 described in the blocks below. The method 700 illustrates one example aspect in accordance with the details provided herein. It will be apparent that other methods, including methods with intervening or repeated operations, are possible in accordance with the aspects described herein.

The method 700 includes block 702, which describes storing, in a memory of a device, data from a first analog signal generated by a first piezoelectric microelectromechanical systems (MEMS) transducer having a first output, where the first piezoelectric MEMS transducer is mechanically coupled to a first surface of an object, and where the first piezoelectric MEMS transducer is configured to generate the first analog signal at the first output when the first analog signal is transduced by the first piezoelectric MEMS transducer from vibrations propagating through the object.

The method 700 additionally includes block 704, which describes storing, in the memory of the device, data from a second piezoelectric MEMS transducer having a second output, where the second piezoelectric MEMS transducer is configured to generate the second analog signal at the second output when the second analog signal is transduced by the second piezoelectric MEMS transducer from acoustic vibrations incident on the first surface of the object.

The method 700 additionally includes block 706, which describes processing, using classification circuitry coupled to the output of first piezoelectric MEMS transducer and the output second piezoelectric MEMS transducer, the data from the first analog signal and the data from the second analog signal to categorize combinations of the first analog signal and the second analog signal received during one or more time frames.

Additional, repeated, and intervening operations can be performed in addition to the operation of the method 700 to implement contact detection in accordance with any details provided herein.

Figure 8A:
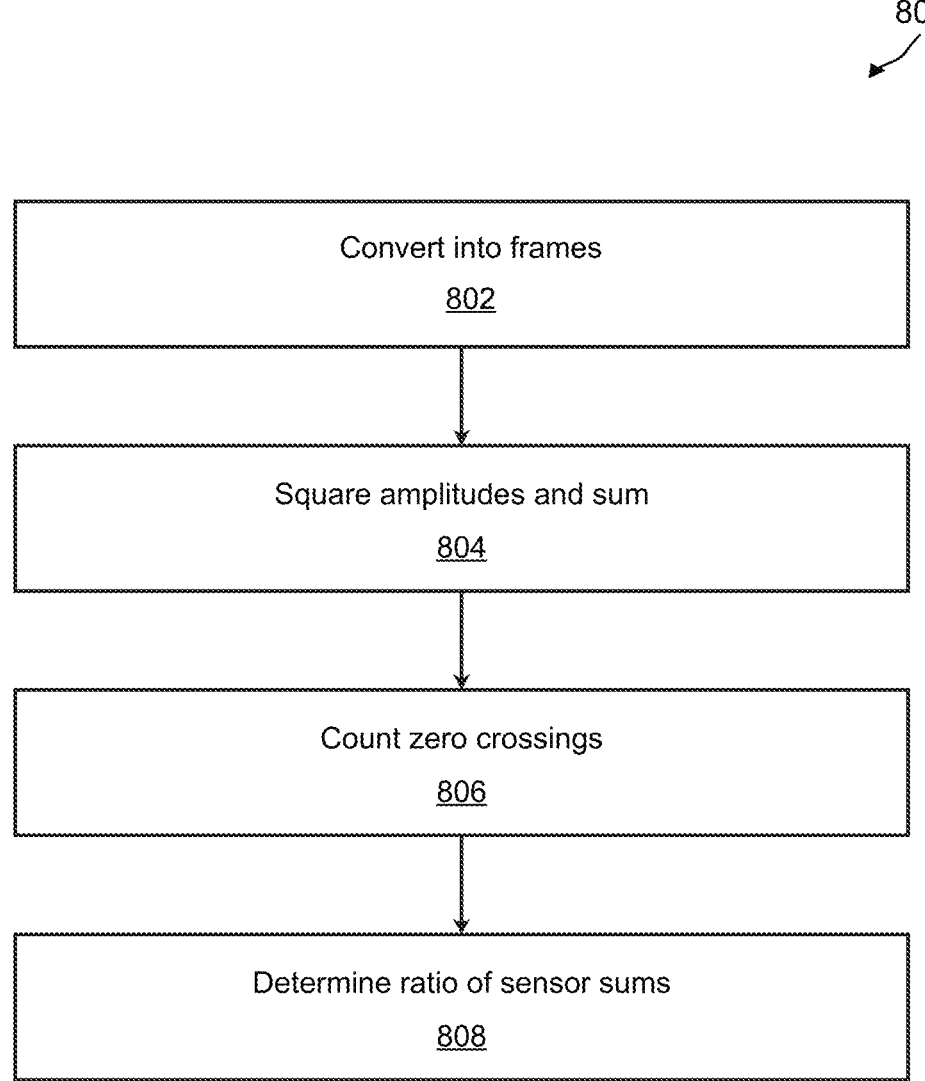
FIG. 8A illustrates a method associated with contact detection and classification using MEMS transducers in accordance with aspects described herein.
Figure 9:
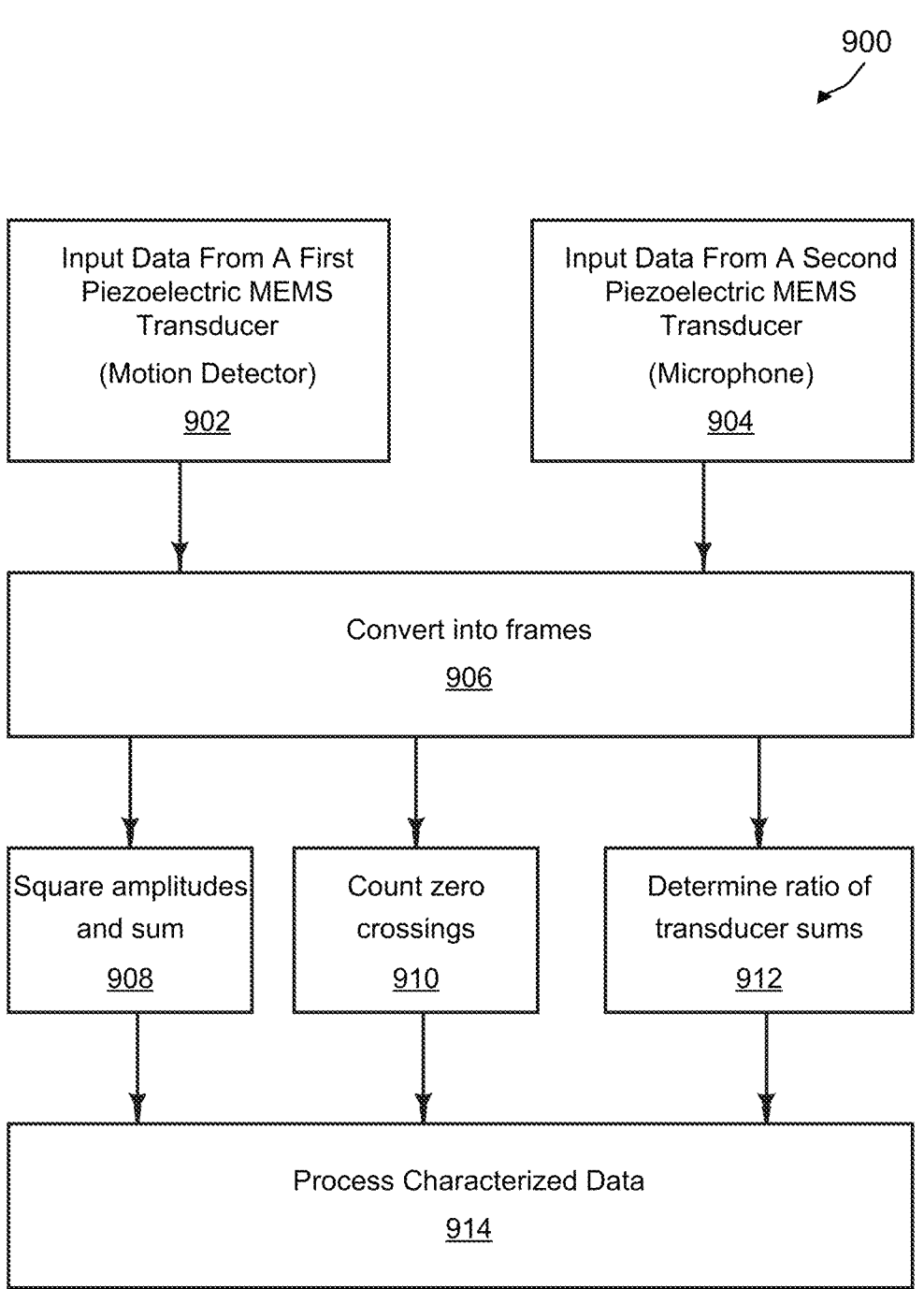
FIG. 9 illustrates a method associated with contact detection and classification using MEMS transducers in accordance with aspects described herein.

FIG. 8A illustrates another example method 800 in accordance with some aspects. The method 800 describes an alternative method for operation of a contact system in accordance with aspects described herein.

The method 800 includes block 802, which involves conversion of contact information into a plurality of frames for analysis. The size of the frames can be a function of the data and timing. In some aspects, each frame is twenty milliseconds (ms). The contact information for each frame may be in the form of a waveform that may or may not have one or more zero-crossings. Each frame then is processed by operations of the blocks 804, 806, and 808 to produce motion data hallmarks (e.g., characteristic data for each frame).

The method 800 includes block 804, where processing circuitry squares the amplitude(s) of the waveform of the frame to ensure the data has no negative values. These amplitudes may be in digital form, although in some aspects, analog mixing can be used to square analog signals from piezoelectric MEMS transducers of a sensor. After squaring the amplitudes, the block 804 further involves summing all the squared amplitudes produce a single amplitude value. A corresponding analog step can integrate the squared signal to generate the single analog value. The block 804 involves performing the same steps for each signal of each piezoelectric MEMS transducer of a sensor. In some aspects, such operations can be performed serially for data from a first piezoelectric MEMS sensor and a second piezoelectric MEMS sensor. In other aspects, operations of the block 804 are performed in parallel for signals from different transducers. In an application with two transducers (e.g., a microphone and a motion detector), the block 804 produces two data values. One single amplitude value is generated for each transducer (e.g., the microphone and the motion sensor.)

In a corresponding manner, block 806 involve processing circuitry calculating a number of zero-crossings for signals from each piezoelectric MEMS transducer. As with block 804, this step also produces two data values one zero-crossing number for each piezoelectric MEMS transducer. The zero crossing value reflects a primary frequency content of energy detected by a given transducer. If the frequency of the frame signal is higher, then there be a correspondingly higher number of zero crossings (e.g., within a detection bandwidth of a given transducer).

The block 808 then involves operations to determine a ratio of the number of sums of squared amplitudes (e.g., values from the block 804) for different transducers. In an implementation with a microphone (e.g., an acoustic transducer) and a motion sensor, the block 808 produces a ratio of signals associated with acoustic and mechanical vibrations. Such a ratio can allow a characterization system to distinguish between loud noise or high amplitude acoustic vibrations (e.g., which may not be in an audible frequency range) not associated with an object contact, and high amplitude vibrations (e.g., which may or may not be in an audible frequency range) associated with a contact (e.g., a collision). In aspects with more than two transducer signals, the system design can determine which ratios are most relevant to classifying an incident or contact associated with matching (e.g., same time period) data signals.

The method 800 results in five data points of data which characterize transducer data about the nature and scope of the specific contact associated with the frame. If a known training classifier is associated with the data, additional operations train the machine learning engine. During device operation (e.g., not a training mode), such data can be processed by a machine learning engine to classify any match with trained incidents or contact types. For example, a system can be trained to identify a specific number of contact types (e.g., 8, 16, 32, etc.). In some examples, contacts not matching a trained data pattern can be processed by control circuitry according to additional rules, such as an amplitude or energy threshold.

A trained sensor can match the trained contact types to the data that consists of the five illustrated data points per frame, and perform additional operations according to rules in control systems.

Figure 8B:
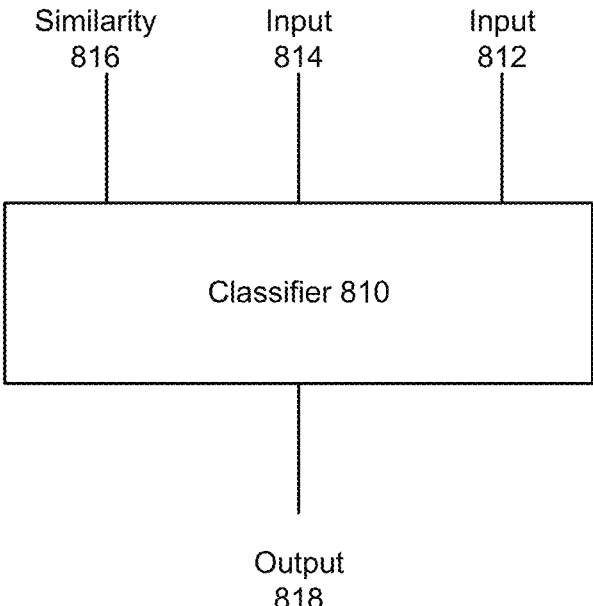
FIG. 8B illustrates aspects of contact detection and classification using MEMS transducers in accordance with aspects described herein.

FIG. 8B illustrates a generalized classifier 810. In some aspects, the classifier 810 can be used to implement the method 800 of FIG. 8A. In other aspects, other implementations or methods can be implemented using the classifier 810. The classifier 810 has an input 812 and an input 814. In some aspects, the input 812 can be a motion sensor input configured to accept analog motion sensor data from a MEMS sensor as described above, or digital data processed from a MEMS sensor (e.g., using a DSP and/or ADC as described above in FIG. 1A). In such aspects, the input 814 can be an audio sensor input configured to accept an analog signal or digital data generated from a MEMS acoustic sensor (e.g., the MEMS sensor of FIG. 2, etc.). Similarity 816 input can be used to provide settings, an operating mode, or other control input for the classifier 810. For example, the similarity 816 input can be used, in some aspects, for managing training data inputs or providing a classification for training data provided at the inputs 812, 814 during a training mode. During an operating mode (e.g., as opposed to a training mode or a low power sleep mode), the classifier 810 can receive data via the inputs 812, 814 and any additional data via similarity 816, and provide a contact classification value at the output 818 (e.g., a noise contact, a key scrape contact, a minor car collision contact, a major car collision contact, etc.) The output 818 can then be coupled to additional control circuitry as described herein to process the contact classification value to automatically initiate further actions based on the output value (e.g., an automated emergency services call in response to a major car collision contact, activation of a camera and a initiating an alarm in response to a key scrape contact, etc.) The classifier 810 is shown with two data inputs 812, 814. In other aspects, any number of data inputs can be implemented in a classifier.

Such inputs can be associated with multiple sensors, such as in a car or other device having any number of sensors or combinations of sensors (e.g., pairs of motion and audio sensors). For example, there may be a linear array of microphones such as those of FIG. 2 to perform audio beamforming and in combination with motion sensors and output by the classifier, the contact type may help detect if the location of the sound source is external to the car (e.g., audible), or also made contact with the door (e.g., scratch, bump, soft contact, hard contact, etc.). That is, the location is on the door or not on the door, and further may be differentiated by loudness and/or level of contact on the door. In addition, for each microphone and motion sensor pair, may result in one classification type. There may be multiple classifiers, one classifier per motion sensor and microphone pair. The output of the multiple classifiers may be combined. For example, if both classifiers indicate a contact type that provides a higher confidence in the contact type result. If both classifiers do not indicate the same contact type, a separate classification would have to be repeated until the contact types matched. This may happen, for example, because there is not enough memory or buffer to store a history of past frames or contact types.

In addition, or alternatively, several frames of motion sensor data and microphone data may be used and the combined contact type overall multiple frames, e.g., 5-10 frames of data (e.g., 50 to 100 ms) may be used to determine the contact type. As an example, frame 1 for classifier 1 the determination is a contact type 1, and classifier 2 the contact type is type 2, but then for the next four frames, frame 2-frame 5, both classifier outputs from classifier 1 and classifier 2 are the same, there will be a higher confidence of the contact type result. This may occur if additional buffer memory is increased from prior generations that only contemplated taking the classification output for one frame. That is, there may be enough memory or buffer to store a history of past frames or contact types. For example, if there was only one classifier with a microphone/motion sensor pair, there would be one contact type. Or if there were two classifiers both outputs had to be the same for the final contact type to be determined.

Similarly, a classifier can include multiple outputs, such as a classification output, a directionality output (e.g., with directionality identified from delays between similar signals received at different sensors with known positions, and the speed of the vibrations used to determine a position or directionality of the contact), or other such outputs (e.g., different alerts or contact outputs for different positions on a device associated with different inputs). In other aspects, rather than a single classifier used for an arbitrary number of inputs and outputs, combinations of classifiers 810 can be combined in a single system within one device, with multiple classifiers 810 providing inputs to control circuitry that can be used to generate data and/or automated alerts or actions in response to combinations of classifier outputs 818.

Figure 8C:
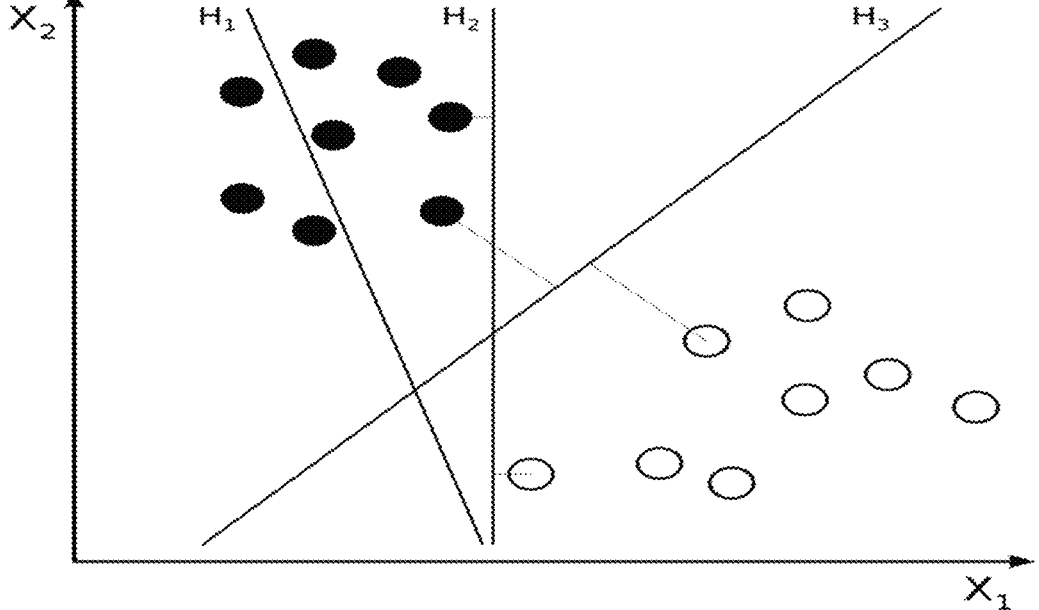
FIG. 8C illustrates aspects of contact detection and classification using MEMS transducers in accordance with aspects described herein.

FIG. 8C then illustrates aspects of operation of the classifier 810 in accordance with some implementations. In FIG. 8C, the x-axis X1 can represent the data from the input 812, and the y-axis can represent the data from the input 814. Lines H1, H2, and H3 can represent classification thresholds or similarity 816 inputs used to identify different classification groupings. The various data points can be data combinations from the sensors in a given time period, and the output 818 can provide data on where groupings of data fall within the classification thresholds or a classification output associated with data groupings within the classification thresholds as indicated. In some aspects, the classifier 810 can take a motion signal at the input 812 and a microphone signal at 814, and generate a classification signal at the output 818 based on the classification grouping generated by analysis of the data compared with the H1, H2, and H3 classification thresholds.

The illustrated H1, H2, and H3 lines shown in 2D are just lines, but if the signals at the inputs 812, 814 are multidimensional or if additional inputs are added, the classification thresholds can hyperplanes of the higher dimensional space (e.g., the number of microphones could be a dimension or the number of microphone/motion sensor pairs could be a dimension if X1 in an alternate embodiment became some representation of the combination of the microphone and motion sensor, which in some aspects, can be indicated by a similarity value provided at the similarity 816 input.

In some aspects, a higher dimensional space could be 8 dimensional, or 16 dimensional if only the microphone and motion sensor signals were input into the classifier 810, or 24 dimensional if 8 additional similarity values were put into the classifier 810 at the similarity 816 input. In some aspects, for example, cantilevered beams of the MEMS transducer illustrated in FIG. 2 can provide multiple signals, with additional separate signals for motion and acoustic sensors provided to the classifier 810 in parallel. A joint intersection of the outputs indicated at the output 818 or additional outputs in an implementation with multiple outputs, can be used by logic circuitry to indicate a the contact type.

As described herein, in some aspects, the machine learning engine (e.g., the machine learning engine 7 of FIG. 1A) can be a support vector machine or support vector network. In machine learning, support vector machines (SVMs) are supervised learning models with associated learning algorithms that analyze data for classification and regression analysis. SVMs are a robust prediction method, being based on statistical learning frameworks or VC theory. Given a set of training examples, each marked as belonging to one of two categories, an SVM training algorithm builds a model that assigns new examples to one category or the other, making it a non-probabilistic binary linear classifier (e.g., methods such as Platt scaling exist to use SVM in a probabilistic classification setting). SVM maps training examples to points in space so as to maximize the width of the gap between the two categories. New examples are then mapped into that same space and predicted to belong to a category based on which side of the gap they fall.

In addition to performing linear classification, SVMs can efficiently perform a non-linear classification using what is called the kernel trick, implicitly mapping their inputs into high-dimensional feature spaces. When data are unlabeled, supervised learning is not possible, and an unsupervised learning approach is required, which attempts to find natural clustering of the data to groups, and then map new data to these formed groups. The support vector clustering algorithm, applies the statistics of support vectors, developed in the support vector machines algorithm, to categorize unlabeled data.

In some aspects of a SVM, a data point is viewed as a p-dimensional vector (a list of p numbers), and operations are performed to identify separate points groups with a $(p-1)$-dimensional hyperplane (e.g., a linear classifier).

There are many hyperplanes that might classify the data. One reasonable choice as a selected hyperplane (e.g., lines or planes H1, H2, H3, etc.) is a hyperplane that represents a largest separation, or margin, between two classes.

More formally, a support vector machine constructs a hyperplane or set of hyperplanes in a high or infinite-dimensional space, which can be used for classification, regression, or other tasks like outliers detection. In some aspects, group or classification separation is achieved by the hyperplane that has the largest distance to the nearest data point of any class (e.g., a functional margin), since in general the larger the margin, the lower the generalization error of the classifier.

In some aspects, classification groups with errors above a certain threshold can be assigned certain automated responses (e.g., a call or communication with emergency services) while groupings with errors or classification separation below a certain threshold can generate user messages or initiation of additional sensors (e.g., video cameras), with messages requesting further analysis from a user to confirm whether a certain contact type has occurred based on the sensor data and additional video or alert data.

FIG. 9 illustrates another example method 900 in accordance with some aspects. The method 900 of FIG. 9 illustrates operations similar to the operations of FIG. 8A, with the operations for generating data from analog piezoelectric MEMS transducer signals performed in parallel.

Method 900 involves blocks 902 and 904 receiving parallel streams of input data from different piezoelectric MEMS transducer. In the example of the block 902, the data is from a motion detector transducer, and in the example of the block 904, the data is from a microphone. As described above, in some aspects, data streams as describe in the blocks 902 and 904 are only generated with a threshold detection occurs to wake sensors of a system from a low power mode. In other aspects, an "always on" operation can be used to gather transducer input data when the consumed power is low in comparison to the available power or a value in detecting initial vibration data.

Additionally, the method 900 illustrates collection of two parallel data streams from two transducers in the blocks 902 and 904. In other aspects, any number of data streams can be used. For example, in some aspects such as in the system 600 of FIG. 6A, each object can have two transducers with data processed independently and then further analyzed after characterization of the two signals from each object (e.g., with the method 900 repeated for transducer data for each object of the system 600). In other aspects, sensors from each object can be jointly characterized (e.g., with input data similar to the blocks 902 and 904 jointly characterized in a method similar to the method 900).

The method 900 involves block 906, where data from the blocks 902 and 904 are converted into frame data. Such conversion can involve a clock timing with a start and an end time period identified for time frames, and each data stream from the block 902 and the block 904 segmented into data frames matching data collected for each corresponding time period of a time frame. In various aspects, a time period used for data frames can be matched to expected vibration frequency and time periods that generate accurate characterization data for the events to be characterized by the classification circuitry. For aspects involving car panels, 20 ms may be used. In other aspects, such as ship hulls or airplane panels with larger panel objects or where different vibrational frequencies may be present and key to contact characterization, different time frames can be used.

Blocks 908, 910, and 912 involve parallel processing of data in the same manner described above in corresponding block 804, 806, and 808 (e.g., with block 804 corresponding to 908, 806 corresponding to 910, and 808 corresponding to 912). The characterized data can then either be stored and associated with a set of actions and a contact type during training (e.g., a collision, key scratch, etc.) or matched with training data in an operating mode to identify a contact by matching operating data with previously stored training data.

Block 914 then involves processing the data from the earlier blocks, either to format the blocks for a classifier or other machine learning engine, or processing by the machine learning engine.

FIG. 10A-D illustrate aspects of contact detection and classification using MEMS transducers in accordance with aspects described herein. The illustrated systems of FIGS. 10A-10D can, for example, be used to implement the method 900 or any similar method described herein. The system of FIG. 10A, for example, includes two sensors, shown as motion sensor 1002, and acoustic sensor 1004. A similarity measurer 1006 can process the data signals and generate standardized data that can be used by a contact type classifier 1008 to generate a contact type output indicating information (e.g., location, type, severity, etc.) for a contact expected given the data from the sensors 1002, 1004. The combination of steps square amplitudes and sum of block 804, count zero crossings operations of block 806, and determine ratio of sensor sums operation of block 808 in FIG. 8A may also be represented generally as a similarity measure or, and may be incorporated as part of an alternative to other embodiments described herein. The combination of blocks 802, 804 and 806 of FIG. 8A may be incorporated as part of the similarity measurer 1006 shown in FIG. 10A. The combination of steps square amplitudes of block 908, count zero crossings of block 910, and determine ratio of transducer sums of block 912 in FIG. 9 may also be represented generally as a similarity measure or, and may be incorporated as part of an alternative to other embodiments described herein. The combination of blocks 908, 910 and 912 of FIG. 9 may be incorporated as part of the similarity measurer 1006 shown in FIG. 10A. In some aspects described herein, similar operations which normalize or standardize signals from MEMS sensors can be processed using circuitry that performs similarity operations which are not the exact operations described in FIGS. 8 and 9. Such operations can be operations to improve the performance, accuracy, and/or standard operation of classification or machine learning engine circuitry.

Figure 10A:
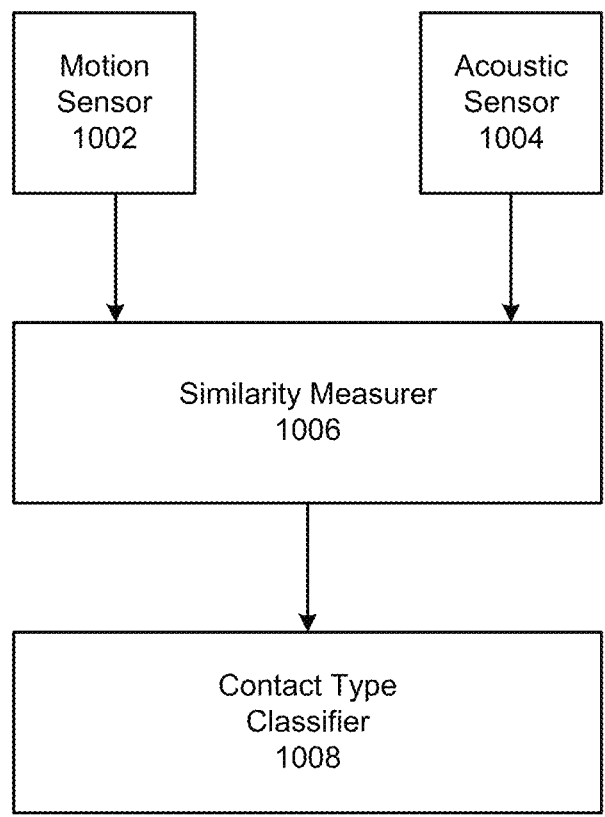
FIG. 10A illustrates aspects of contact detection and classification using MEMS transducers in accordance with aspects described herein.
Figure 10B:
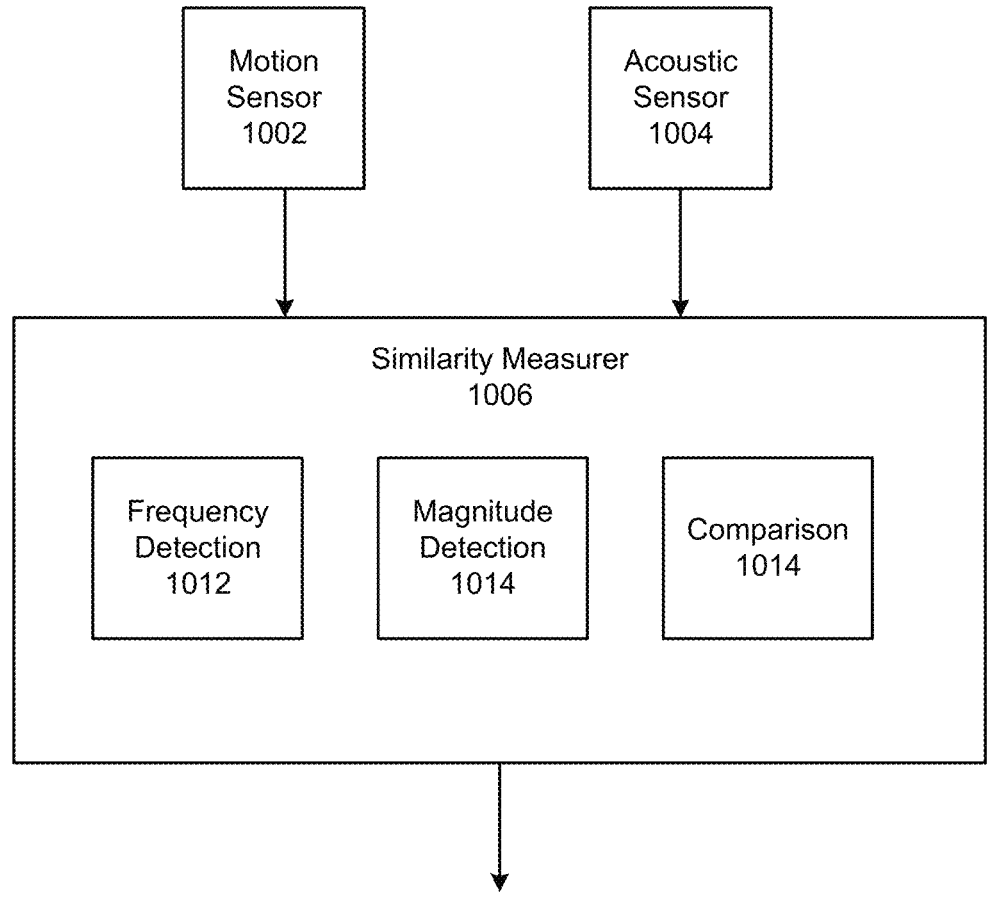
FIG. 10B illustrates aspects of contact detection and classification using MEMS transducers in accordance with aspects described herein.

FIG. 10B illustrates an example of the system of FIG. 10A that can be matched to the method 900. The similarity measurer 1006 of FIG. 10B includes frequency detection 1012 that can perform frequency detection operations to quantify frequency characteristics of a signal, such as the operations of block 806 or block 910. Magnitude detection can perform operations to quantify amplitude characteristics of signals, such as the operations of block 804 or block 908. Comparison 1014 can perform operations such as those of block 808 or block 912.

Figure 10C:
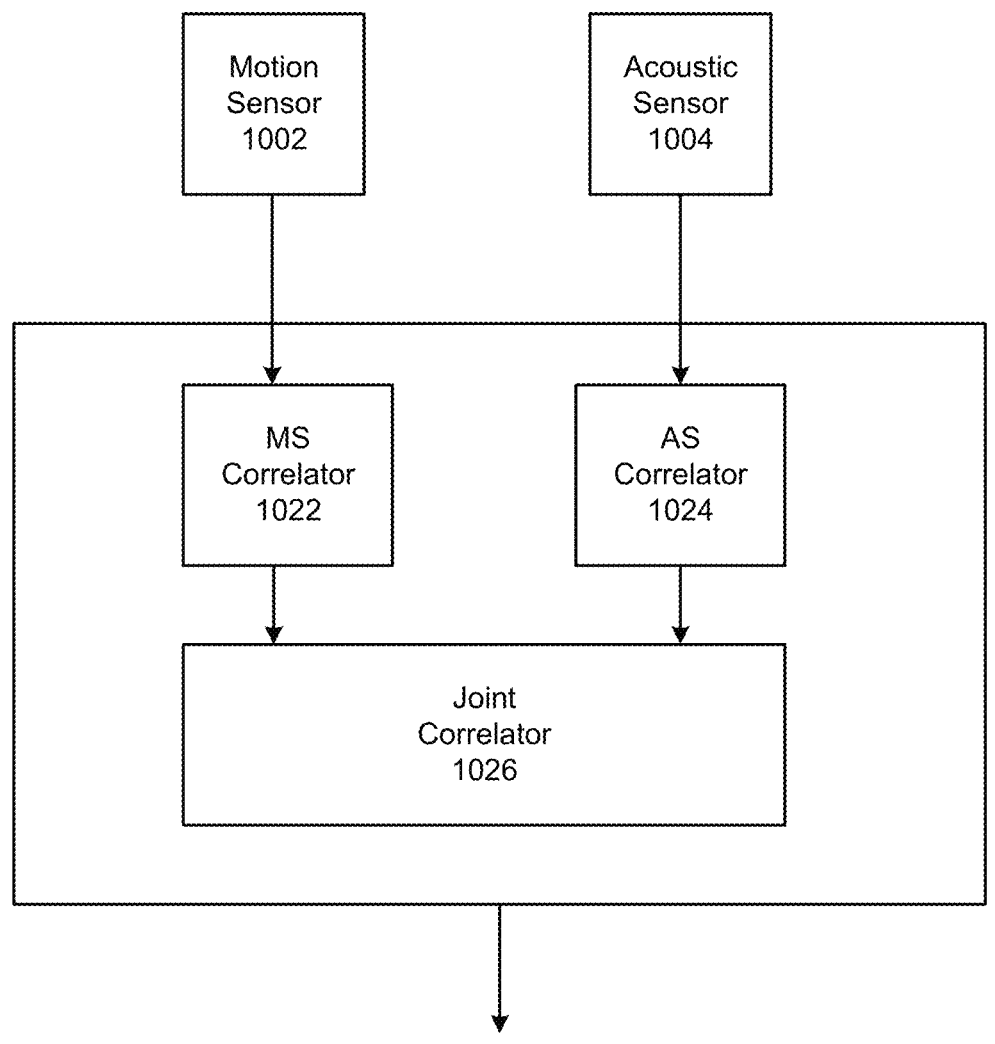
FIG. 10C illustrates aspects of contact detection and classification using MEMS transducers in accordance with aspects described herein.
Figure 10D:
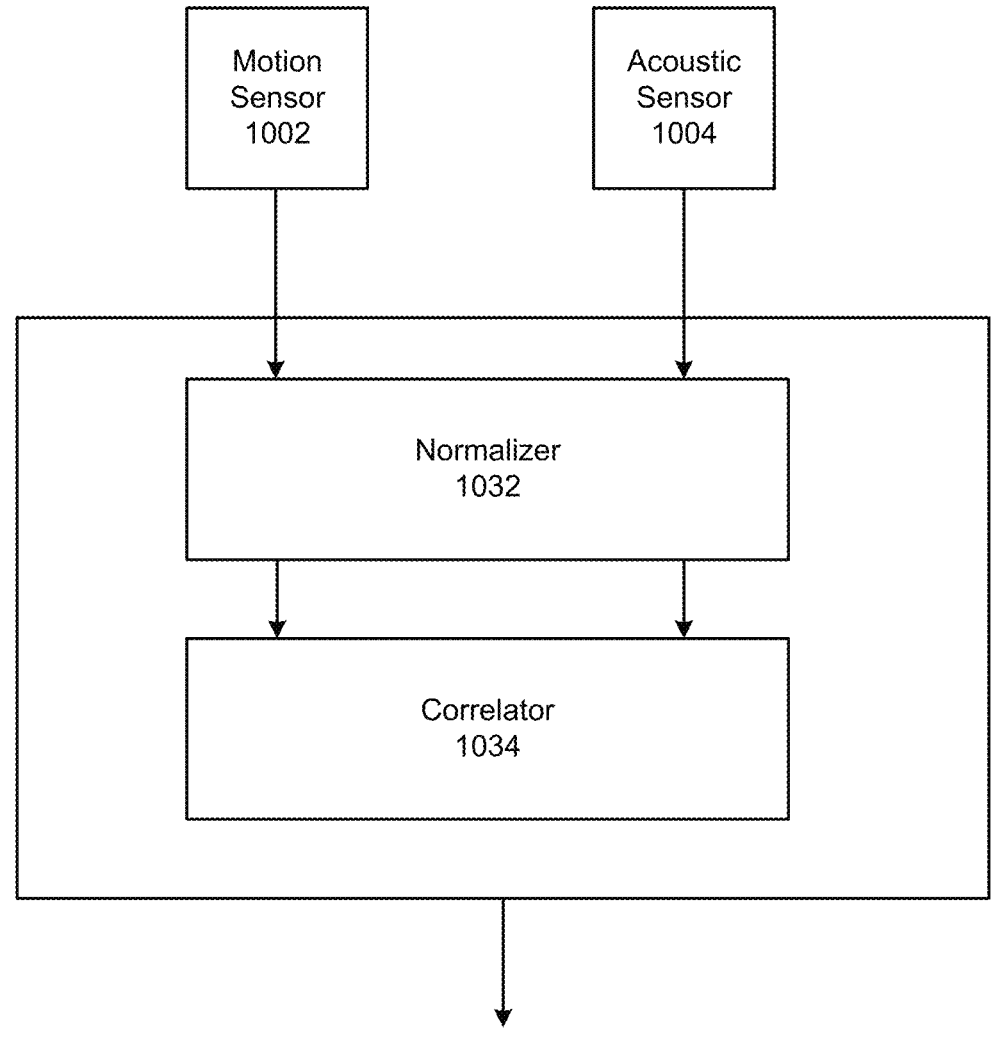
FIG. 10D illustrates aspects of contact detection and classification using MEMS transducers in accordance with aspects described herein.

FIGS. 10C and 10D illustrate additional examples of systems for processing sensor data. As illustrated, FIG. 10C includes the sensors 1002, 1004, with a correlation block 1022 for the motion sensor 1002, a correlation block 1024 for the acoustic sensor 1004, and a joint correlator 1026 for the sensor combination. In such an aspects, independent similarity operations can be used in addition to joint similarity operations to process sensor data and provide inputs to a classifier. FIG. 10D illustrates a normalizer 1032 for both sensors 1002, 1004, and a correlator 1034 that uses an output of the normalizer 1032. In other aspects, any number of data operations can be used. Such systems can support correlation operations between sensor data, autocorrelation operations for a data stream, absolute value calculations, rectification operations, and other such operations.

Figure 12:
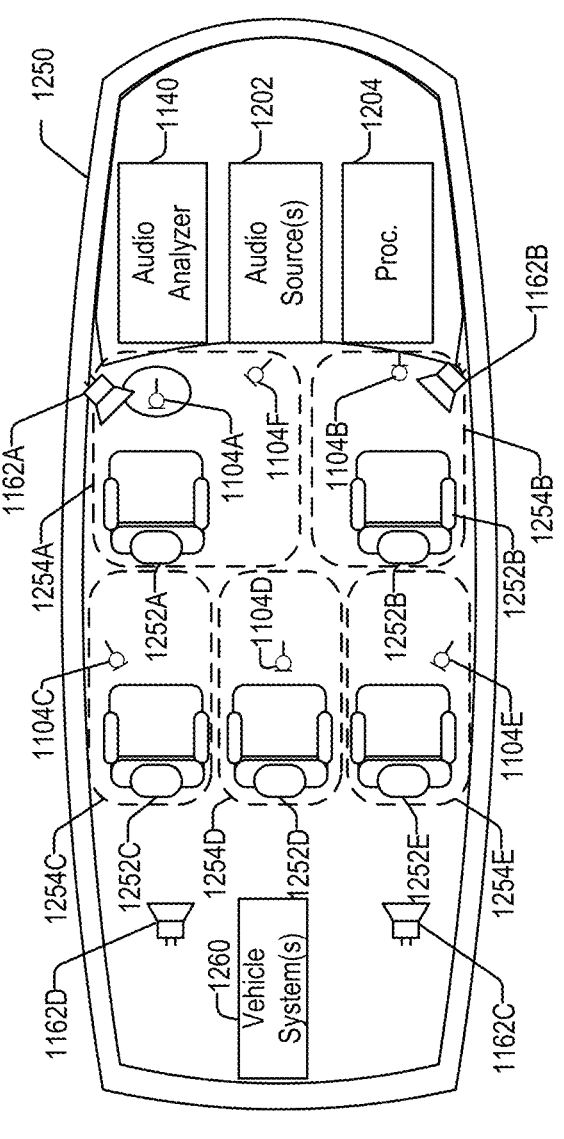
FIG. 12 illustrates aspects of a system supporting contact detection and classification using MEMS transducers in accordance with aspects described herein.

FIGS. 11 and 12 illustrate aspects of a system supporting contact detection and classification using MEMS transducers in accordance with aspects described herein. FIG. 11 illustrates an audio analyzer 1140 that includes wake detector 1126 in addition to classification application(s) 1156. As described herein, in some aspects, sensors can operate in a lower power mode consuming as little as 20 milliwatts (mW), with preprocessing used to wake sensors to perform higher power operations. Sensors such as audio sensors, can be sensitive enough to detect both minor collision signals as well as to detect audio voice inputs, such as "wake words" or wake signals used to activate a voice command system. In some aspects, audio sensors used in combination with motion sensors can be used for both collision detection and voice inputs from a user. In other aspects, voice input and audio sensors for collision detection are implemented as separate systems with separate sensors.

The device 1100 of FIG. 11 can be included in any number of different devices with any number of sensor sources 1202 (e.g., motion and audio MEMS sensors as described herein). Such sensor sources 1202 and microphone(s) 1104 (e.g., microphones 1104A-F) can be integrated with a system having audio transducers 1162A-D (e.g., speakers) which can provide audio output information identifying a collision or contact type for a system user (e.g., informing a driver of a collision type, location, severity, etc. using an output speaker system).

FIG. 12 is a diagram of a first example of a vehicle 1250 operable to selectively filter audio data for speech processing, in accordance with some examples of the present disclosure. In FIG. 12, the device 1100 or portions thereof are integrated within the vehicle 1250, which in the example of FIG. 12 is illustrated as an automobile including a plurality of seats 1252A-1252E. Although the vehicle 1250 is illustrated as an automobile in FIG. 12, in other implementations, the vehicle 1250 is a bus, a train, an aircraft, a watercraft, or another type of vehicle configured to transport one or more passengers (which may optionally include a vehicle operator).

The vehicle 1250 includes the audio analyzer 1140 and one or more sensor sources 1202. The audio analyzer 1140 and the sensor source(s) 1202 (e.g., motion and/or audio MEMS sensors) via analog signal processing 1204. The vehicle 1250 of FIG. 12 also includes one or more vehicle systems 1260, some or all of which may be coupled to the audio analyzer 1140 to enable the voice assistant classification application(s) 1156 to control various operations of the vehicle system(s) 1260.

In FIG. 12, the vehicle 1250 includes a plurality of microphones 1104A-104F. For example, in FIG. 12, each microphone 1104 is positioned near a respective one of the seats 1252A-1252E. In the example of FIG. 12, the positioning of the microphones 1104 relative to the seats 1252 enables the audio analyzer 1140 to distinguish among audio zones 1254 of the vehicle 1250. In FIG. 12, there is a one-to-one relationship between the audio zones 1254 and the seats 1252. In some other implementations, one or more of the audio zones 1254 includes more than one seat 1252. To illustrate, the seats 1252C-1252E may be associated with a single "back seat" audio zone.

Although the vehicle 1250 of FIG. 12 is illustrated as including a plurality of microphones 1104A-104F arranged to detect sound within the vehicle 1250 and optionally to enable the audio analyzer 1140 to distinguish which audio zone 1254 includes a source of the sound, in other implementations, the vehicle 1250 includes only a single microphone 1104. In still other implementations, the vehicle 1250 includes multiple microphones 1104 and the audio analyzer 1140 does not distinguish among the audio zones 1254.

In FIG. 12, the audio analyzer 1140 includes the audio preprocessor 1118, the first stage speech processor 1124, and the second stage speech processor 1154, each of which operate as described to any of FIGS. 11-5. In the particular example illustrated in FIG. 12, the audio preprocessor 1118 includes the speech input filter(s) 1120, which are configurable to operate as speaker-specific speech input filters to selectively filter audio data for speech processing.

The audio preprocessor 1118 in FIG. 12 also includes an echo cancelation and noise suppression (ECNS) unit 1206 and an adaptive interference canceller (AIC) 1208. The ECNS unit 1206 and the AIC 1208 are operable to filter audio data from the microphone(s) 1104 independently of the speech input filter(s) 1120. For example, the ECNS unit 1206, the AIC 1208, or both, may perform non-speaker-specific audio filtering operations. To illustrate, the ECNS unit 1206 is operable to perform echo cancellation operations, noise suppression operations (e.g., adaptive noise filtering), or both. The AIC 1208 is configured to distinguish among the audio zone 1254, and optionally, to limit the audio data provided to the first stage speech processor 1124, the second stage speech processor 1154, or both, to audio from a particular one or more of the audio zones 1254. To illustrate, based on configuration of the audio analyzer 1140, the AIC 1208 may only allow audio from a person in one of the front seats 1252A, 1252B to be provided to the wake detector 1126, to the voice assistant classification application(s) 1156, or both.

During operation, one or more of the microphone(s) 1104 may detect sounds within the vehicle 1250 and provide audio data representing the sounds to the audio analyzer 1140. When no voice assistant session is in progress, the ECNS unit 1206, the AIC 1208, or both, process the audio data to generate filtered audio data and provide the filtered audio data to the wake detector 1126. If the wake detector 1126 detects a wake signal (e.g., motion and/or audio signals from collision sensors above a threshold magnitude) in the filtered audio data, the wake detector 1126 systems to identify details associated with the wake signal (e.g., collision identification or identification of a person speaking. Additionally, the wake detector 1126 activates the second stage speech processor 1154 to initiate a voice assistant session. In some implementations, the wake detector 1126 may also provide information to the AIC 1208 to indicate which audio zone 1254 the threshold wake signal originated in, and the AIC 1208 may filter audio data provided to the speech input filter(s) 1120 based on the audio zone 1254 from which the threshold wake signal originated.

The speaker-specific speech input filter is used to filter the audio data and to provide the filtered audio data to the voice assistant classification application(s) 1156, as described herein. Based on content of speech represented in the filtered audio data, the voice assistant classification application(s) 1156 may control operation of the audio source(s) 1202, control operation of the vehicle system(s) 1260, or perform other operations, such as retrieve information from a remote data source.

A response (e.g., a voice assistant response) from the voice assistant classification application(s) 1156 may be played out to occupants of the vehicle 1250 via the audio transducer(s) 1162 indicating information associated with a user's voice input or associated with an output generated in response to classification of MEMS sensor data processed in accordance with aspects described herein. In the example illustrated in FIG. 12, the audio transducers 1162 are disposed near or in particular ones of the audio zones 1254, which enables the voice assistant classification application(s) 1156 to provide a response to a particular occupant (e.g., an occupant who initiated the voice assistant session) or to multiple occupants of the vehicle 1250.

Selective operation of the speech input filter(s) 1120 as speaker-specific speech input filters enables more accurate speech recognition by the voice assistant classification application(s) 1156 since noise and irrelevant speech is removed from the audio data provided to the voice assistant classification application(s) 1156. Additionally, the selective operation of the speech input filter(s) 1120 as speaker-specific speech input filters limits the ability of other occupants in the vehicle 1250 to barge into a voice assistant session. For example, if a driver of the vehicle 1250 initiates a voice assistant session to request driving directions, the voice assistant session can be associated with only the driver (or as described above with one or more other persons) such that other occupants of the vehicle 1250 are not able to interrupt the voice assistant session.

Figure 13:
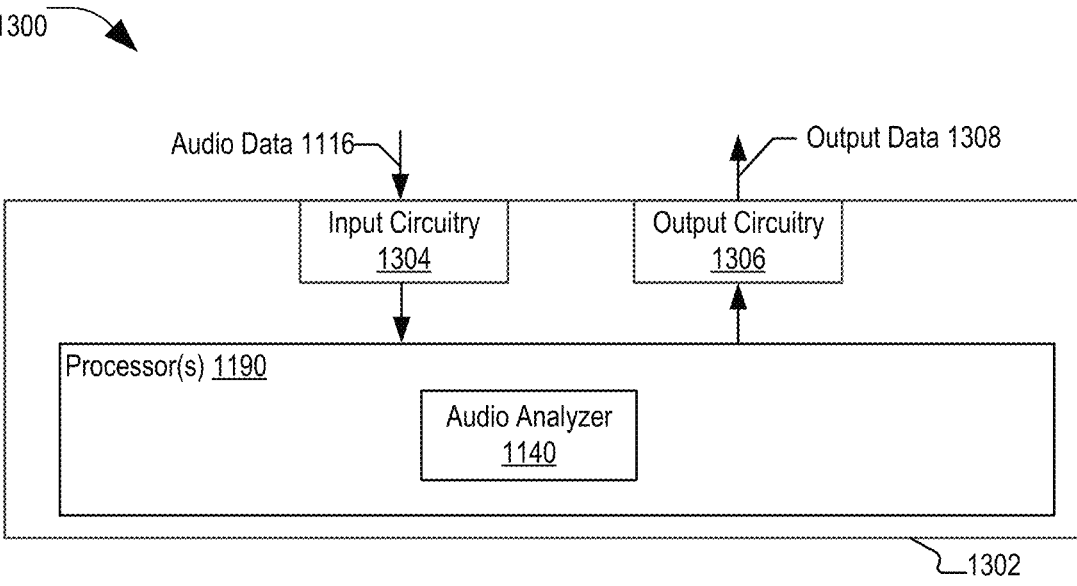
FIG. 13 illustrates aspects of a system supporting contact detection and classification using MEMS transducers in accordance with aspects described herein.

FIG. 13 depicts an implementation 1300 of the device 1100 as an integrated circuit 1302 that includes the one or more processor(s) 1190, which include one or more components of the audio analyzer 1140. The integrated circuit 1302 also includes input circuitry 1304, such as one or more bus interfaces, to enable audio data to be received for processing. The integrated circuit 1302 also includes output circuitry 1306, such as a bus interface, to enable sending of output data 1308 from the integrated circuit 1302. For example, the output data 1308 may include a voice assistant response. As another example, the output data 1308 may include commands to other devices (such as media players, vehicle systems, smart home devices, etc.) or queries (such as information retrieval queries sent to remote devices).

Figure 14:
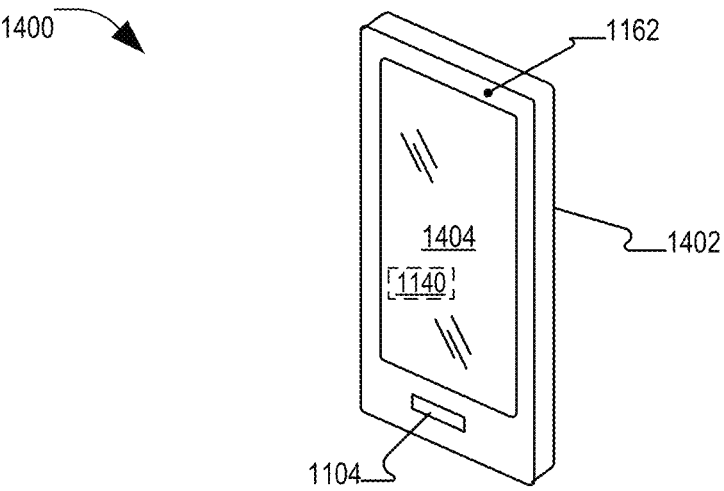
FIG. 14 illustrates aspects of a system supporting contact detection and classification using MEMS transducers in accordance with aspects described herein.
Figure 15:
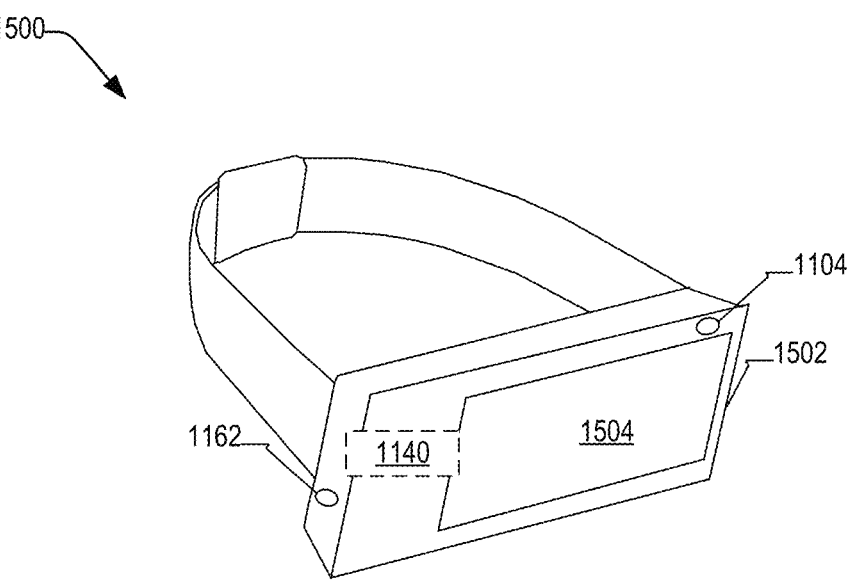
FIG. 15 illustrates aspects of a system supporting contact detection and classification using MEMS transducers in accordance with aspects described herein.
Figure 16:
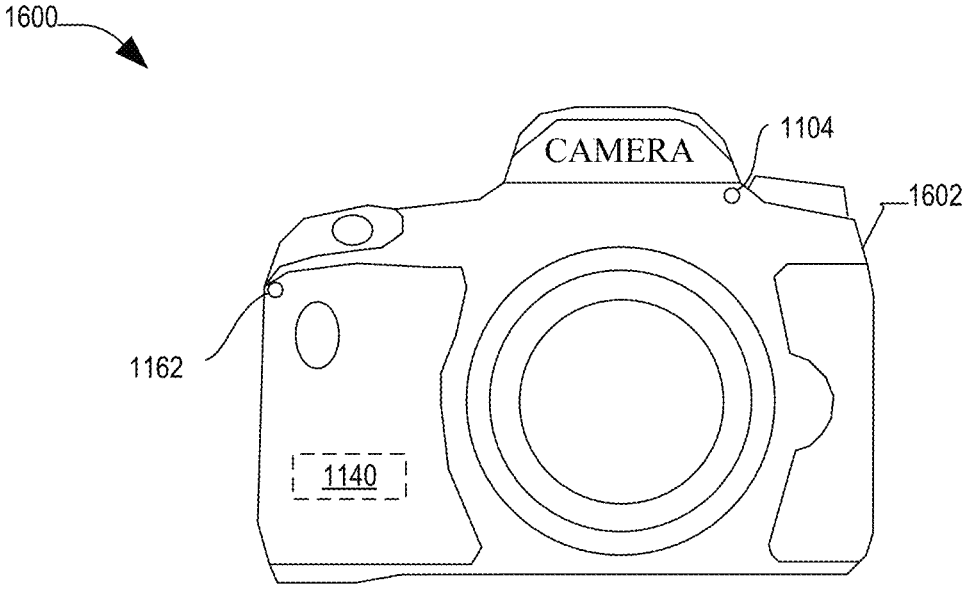
FIG. 16 illustrates aspects of a system supporting contact detection and classification using MEMS transducers in accordance with aspects described herein.
Figure 17:
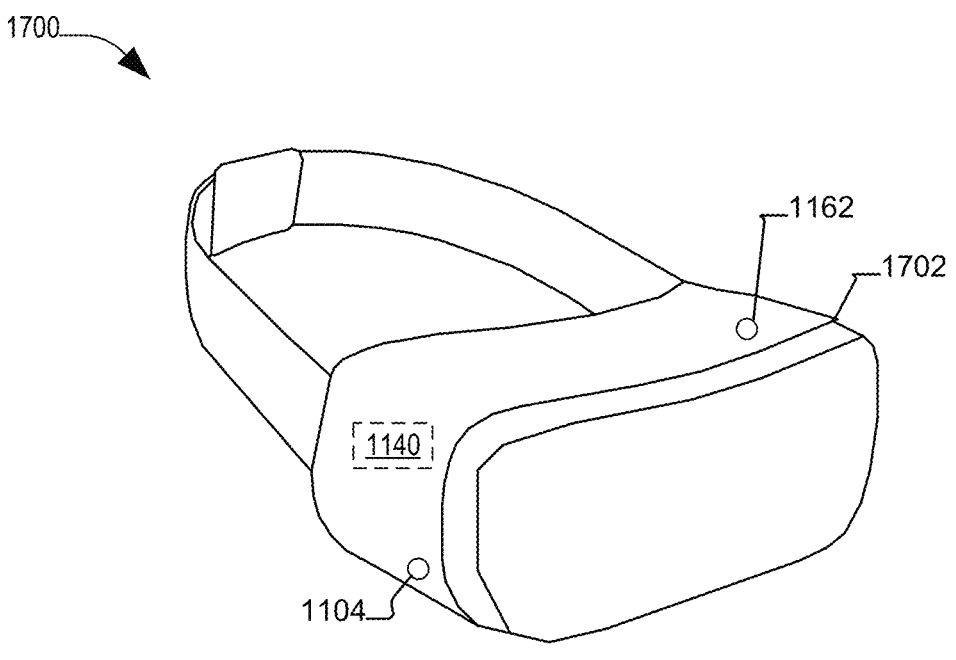
FIG. 17 illustrates aspects of a system supporting contact detection and classification using MEMS transducers in accordance with aspects described herein.
Figure 18:
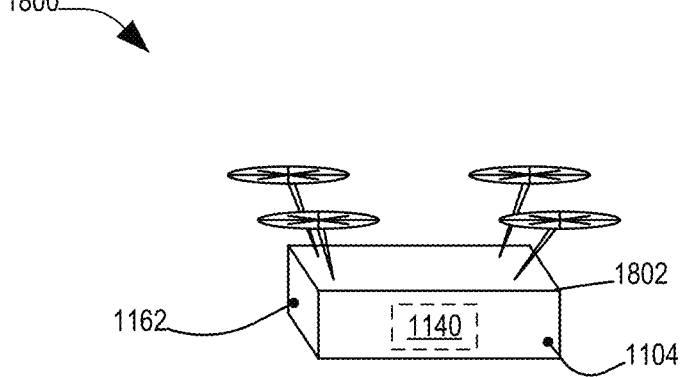
FIG. 18 illustrates aspects of a system supporting contact detection and classification using MEMS transducers in accordance with aspects described herein.

The integrated circuit 1302 enables implementation of selectively filtering audio data for speech processing as a component in a system that includes microphones, such as a mobile phone or tablet as depicted in FIG. 14, a wearable electronic device as depicted in FIG. 15, a camera as depicted in FIG. 16, an extended reality (e.g., a virtual reality, mixed reality, or augmented reality) headset as depicted in FIG. 17, or a vehicle as depicted in FIG. 12 or FIG. 18.

FIG. 14 depicts an implementation 1400 in which the device 1100 includes a mobile device 1402, such as a phone or tablet, as illustrative, non-limiting examples. In a particular implementation, the integrated circuit 1302 is integrated within the mobile device 1402. In FIG. 14, the mobile device 1402 includes the microphone(s) 1104, the audio transducer(s) 1162, and a display screen 1404. Components of the processor(s) 1190, including the audio analyzer 1140, are integrated in the mobile device 1402 and are illustrated using dashed lines to indicate internal components that are not generally visible to a user of the mobile device 1402.

In a particular example, the audio analyzer 1140 may selectively enable speaker-specific speech input filtering in a manner that improves the accuracy of speech recognition by the voice assistant classification application(s) 1156 and limits the ability of other persons to interrupt a voice assistant session. During a voice assistant session, a response from a voice assistant application may be provided as output to a user via the audio transducer(s) 1162, via the display screen 1404, or both.

FIG. 15 depicts an implementation 1500 in which the device 1100 includes a wearable electronic device 1502, illustrated as a "smart watch." In a particular implementation, the integrated circuit 1302 is integrated within the wearable electronic device 1502. In FIG. 15, the wearable electronic device 1502 includes the microphone(s) 1104, the audio transducer(s) 1162, and a display screen 1504.

Components of the processor(s) 1190, including the audio analyzer 1140, are integrated in the wearable electronic device 1502. In a particular example, the audio analyzer 1140 of FIG. 15 operates to selectively enable speaker-specific speech input filtering in a manner that improves the accuracy of speech recognition by the voice assistant classification application(s) 1156 and limits the ability of other persons to interrupt a voice assistant session. During a voice assistant session, a response from a voice assistant application may be provided as output to a user via the audio transducer(s) 1162, via haptic feedback to the user, via the display screen 1504, or any combination thereof.

As one example of operation of the wearable electronic device 1502, during a voice assistant session, a person who initiates the voice assistant session may provide speech requesting that messages (e.g., text message, email, etc.) sent to the person be displayed via the display screen 1504 of the wearable electronic device 1502. In this example, other persons in the vicinity of the wearable electronic device 1502 may speak a threshold wake signal associated with the audio analyzer 1140 without interrupting the voice assistant session because audio data is filtered during the voice assistant session to de-emphasize a portion of the audio data that does not correspond to speech of the person who initiated the voice assistant session.

FIG. 16 depicts an implementation 1600 in which the device 1100 includes a portable electronic device that corresponds to a camera device 1602. In a particular implementation, the integrated circuit 1302 is integrated within the camera device 1602. In FIG. 16, the camera device 1602 includes the microphone(s) 1104 and the audio transducer(s) 1162. The camera device 1602 may also include a display screen on a side not illustrated in FIG. 16.

Components of the processor(s) 1190, including the audio analyzer 1140, are integrated in the camera device 1602. In a particular example, the audio analyzer 1140 of FIG. 16 operates to selectively enable speaker-specific speech input filtering in a manner that improves the accuracy of speech recognition by the voice assistant classification application(s) 1156 and limits the ability of other persons to interrupt a voice assistant session. During a voice assistant session, a response from a voice assistant application may be provided as output to a user via the audio transducer(s) 1162, via the display screen, or both.

As one example of operation of the camera device 1602, during a voice assistant session, a person who initiates the voice assistant session may provide speech requesting that the camera device 1602 capture an image. In this example, other persons in the vicinity of the camera device 1602 may speak a threshold wake signal associated with the audio analyzer 1140 without interrupting the voice assistant session because audio data is filtered during the voice assistant session to de-emphasize a portion of the audio data that does not correspond to speech of the person who initiated the voice assistant session.

FIG. 17 depicts an implementation 1700 in which the device 1100 includes a portable electronic device that corresponds to an extended reality (e.g., a virtual reality, mixed reality, or augmented reality) headset 1702. In a particular implementation, the integrated circuit 1302 is integrated within the headset 1702. In FIG. 17, the headset 1702 includes the microphone(s) 1104 and the audio transducer(s) 1162. Additionally, a visual interface device is positioned in front of the user's eyes to enable display of augmented reality, mixed reality, or virtual reality images or scenes to the user while the headset 1702 is worn.

Components of the processor(s) 1190, including the audio analyzer 1140, are integrated in the headset 1702. In a particular example, the audio analyzer 1140 of FIG. 17 operates to selectively enable speaker-specific speech input filtering in a manner that improves the accuracy of speech recognition by the voice assistant classification application(s) 1156 and limits the ability of other persons to interrupt a voice assistant session. During a voice assistant session, a response from a voice assistant application may be provided as output to a user via the audio transducer(s) 1162, via the visual interface device, or both.

As one example of operation of the headset 1702, during a voice assistant session, a person who initiates the voice assistant session may provide speech requesting that particular media be displayed on the visual interface device of the headset 1702. In this example, other persons in the vicinity of the headset 1702 may speak a threshold wake signal associated with the audio analyzer 1140 without interrupting the voice assistant session because audio data is filtered during the voice assistant session to de-emphasize a portion of the audio data that does not correspond to speech of the person who initiated the voice assistant session.

FIG. 18 depicts an implementation 1800 in which the device 1100 corresponds to, or is integrated within, a vehicle 1802, illustrated as a manned or unmanned aerial device (e.g., a package delivery drone). In a particular implementation, the integrated circuit 1302 is integrated within the vehicle 1802. In FIG. 18, the vehicle 1802 also includes the microphone(s) 1104 and the audio transducer(s) 1162.

Components of the processor(s) 1190, including the audio analyzer 1140, are integrated in the vehicle 1802. In a particular example, the audio analyzer 1140 of FIG. 18 operates to selectively enable speaker-specific speech input filtering in a manner that improves the accuracy of speech recognition by the voice assistant classification application(s) 1156 and limits the ability of other persons to interrupt a voice assistant session. During a voice assistant session, a response from a voice assistant application may be provided as output to a user via the audio transducer(s) 1162.

As one example of operation of the vehicle 1802, during a voice assistant session, a person who initiates the voice assistant session may provide speech requesting that the vehicle 1802 deliver a package to a specified location. In this example, other persons in the vicinity of the vehicle 1802 may speak a threshold wake signal associated with the audio analyzer 1140 without interrupting the voice assistant session because audio data is filtered during the voice assistant session to de-emphasize a portion of the audio data that does not correspond to speech of the person who initiated the voice assistant session. As a result, the other persons are unable to redirect the vehicle 1802 to a different delivery location.

Figure 19:
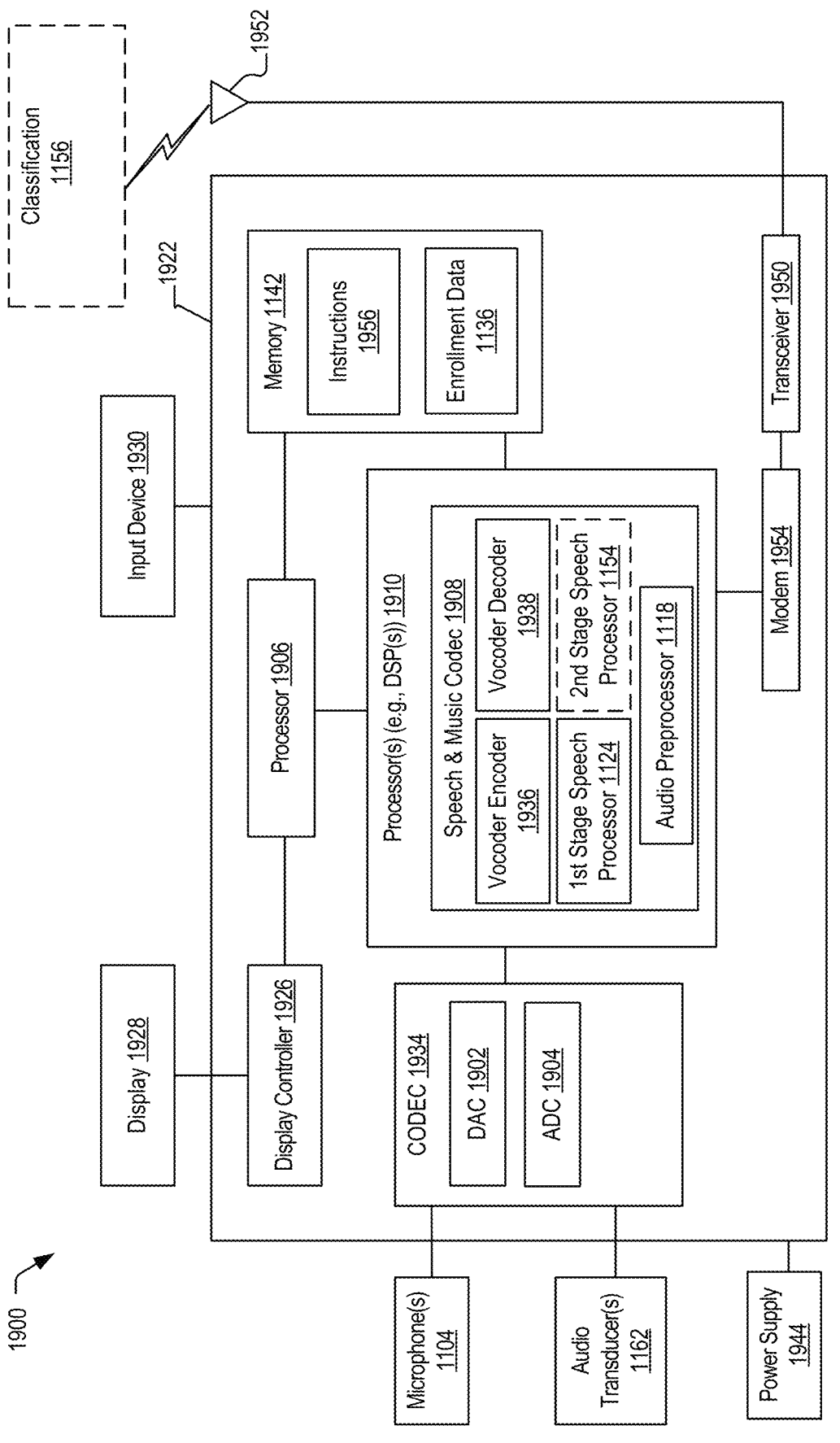
FIG. 19 illustrates aspects of a system supporting contact detection and classification using MEMS transducers in accordance with aspects described herein.

FIG. 19 illustrates aspects of a system supporting contact detection and classification using MEMS transducers in accordance with aspects described herein. Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to the device 1100. In an illustrative implementation, the device 1900 may perform operations for collision detection in accordance with any aspects described herein.

In a particular implementation, the device 1900 includes a processor 1906 (e.g., a central processing unit (CPU)). The device 1900 may include one or more additional processors 1910 (e.g., one or more DSPs). In a particular aspect, the processor(s) 1190 of FIG. 11 corresponds to the processor 1906, the processors 1910, or a combination thereof. The processor(s) 1910 may include a speech and music coder-decoder (CODEC) 1908 that includes a voice coder ("vocoder") encoder 1936 and a vocoder decoder 1938. In the example illustrated in FIG. 19, the processor(s) 1910 also include the audio preprocessor 1118, the first stage speech processor 1124, and optionally, the second stage speech processor 1154.

The device 1900 may include a memory 1142 and a CODEC 1934. In particular implementations, the analog signal processing 1204 of FIGS. 11 can, in some aspects, be implemented at least partially as to the CODEC 1934 of FIG. 19. The memory 1142 may include instructions 1956 that are executable by the one or more additional processors 1910 (or the processor 1906) to implement the functionality described with reference to the audio preprocessor 1118, the first stage speech processor 1124, the second stage speech processor 1154, or a combination thereof. In the example illustrated in FIG. 19, the memory 1142 also includes the enrollment data 1136.

The device 1900 may include a display 1928 coupled to a display controller 1926. The audio transducer(s) 1162, the microphone(s) 1104, or both, may be coupled to the CODEC 1934. The CODEC 1934 may include a digital-to-analog converter (DAC) 1902, an analog-to-digital converter (ADC) 1904, or both. In a particular implementation, the CODEC 1934 may receive analog signals from the microphone(s) 1104, convert the analog signals to digital signals (e.g. the audio data 1116 of FIG. 11) using the analog-to-digital converter 1904, and provide the digital signals to the speech and music codec 1908. The speech and music codec 1908 may process the digital signals, and the digital signals may further be processed by the audio preprocessor 1118, the first stage speech processor 1124, the second stage speech processor 1154, or a combination thereof. In a particular implementation, the speech and music codec 1908 may provide digital signals to the CODEC 1934. The CODEC 1934 may convert the digital signals to analog signals using the digital-to-analog converter 1902 and may provide the analog signals to the audio transducer(s) 1162.

In a particular implementation, the device 1900 may be included in a system-in-package or system-on-chip device 1922. In a particular implementation, the memory 1142, the processor 1906, the processors 1910, the display controller 1926, the CODEC 1934, and a modem 1954 are included in the system-in-package or system-on-chip device 1922. In a particular implementation, an input device 1930 and a power supply 1944 are coupled to the system-in-package or the system-on-chip device 1922. Moreover, in a particular implementation, as illustrated in FIG. 19, the display 1928, the input device 1930, the audio transducer(s) 1162, the microphone(s) 1104, an antenna 1952, and the power supply 1944 are external to the system-in-package or the system-on-chip device 1922. In a particular implementation, each of the display 1928, the input device 1930, the audio transducer(s) 1162, the microphone(s) 1104, the antenna 1952, and the power supply 1944 may be coupled to a component of the system-in-package or the system-on-chip device 1922, such as an interface or a controller.

In some implementations, the device 1900 include the modem 1954 coupled, via a transducer 1950, to the antenna 1952. In some such implementations, the modem 1954 may be configured to send data associated with the utterance from the first person (e.g., at least a portion of the audio data 1116 of FIG. 11) to a remote classification assistance server which can be used in a cloud or server based implementation of the classification application(s) 1156. In such implementations, the voice assistant classification application(s) 1156 execute at the classification assistance server. In such implementations, the second stage speech processor 1154 can be omitted from the device 1900; however, speaker-specific speech input filtering can be performed at the device 1900 based on threshold wake signal detection at the device 1900.

The device 1900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining, based on detection of a threshold wake signal in an utterance from a first person, first speech signature data associated with the first person. For example, the means for obtaining the first speech signature data can correspond to the device 1100, the processor(s) 1190, the audio analyzer 1140, the audio preprocessor 1118, the speech input filter(s) 1120, the first stage speech processor 1124, the processor 1906, the processor(s) 1910, one or more other circuits or components configured to obtain the speech signature data, sensor threshold data, or any combination thereof.

The apparatus also includes means for selectively enabling a speaker-specific speech input filter that is based on the first speech signature data. For example, the means for selectively enabling the speaker-specific speech input filter can correspond to the device 1100, the processor(s) 1190, the audio analyzer 1140, the audio preprocessor 1118, the speech input filter(s) 1120, the first stage speech processor 1124, the processor 1906, the processor(s) 1910, one or more other circuits or components configured to selectively enable a speaker-specific speech input filter, or any combination thereof.

In some implementations, a non-transitory computer-readable medium (e.g., a computer-readable storage device, such as the memory 1142) includes instructions (e.g., the instructions 1956) that, when executed by one or more processors (e.g., the one or more processors 1190, the one or more processors 1910, or the processor 1906), cause the one or more processors to, based on detection of a threshold wake signal in an utterance from a first person, obtain first speech signature data associated with the first person, and selectively enable a speaker-specific speech input filter that is based on the first speech signature data.

FIG. 20 is a functional block diagram of a wireless communication apparatus configured for contact detection in accordance with aspects described herein. The apparatus 2000 comprises means 2002 for means for generating a first analog signal transduced from vibrations propagating through an object having a first surface. The means 2002 can, for example, be the transducer 6 or a MEMS motion detector formed from the cantilevered beam of FIG. 3 or any other such MEMS sensor described herein.

The apparatus 2000 comprises means 2004 for generating a second analog signal transduced from acoustic signals incident on the first surface of the object. The means 2004 can, for example, be the transducer 5 or a MEMS motion detector formed from the cantilevered beam of FIG. 3 or any other such MEMS sensor described herein.

The apparatus 2000 comprises means 2006 for processing data from the first analog signal and data from the second analog signal to classify combinations of the first analog signal and the second analog signal received during one or more time frames. The means 2006 can include ML engine 7, or any other ML engine circuitry, such as circuitry for a neural network, a decision tree, and/or a support vector machine, In some aspects, the means 2006 can additionally include processing circuitry such as the ASIC chip 16, the control circuitry 8, the ADC 54, the DSP 56, the controller 58, or any other such circuitry used to generate and process data from the first and second analog signals generated by the means 2002 and the means 2004.

Figure 21:
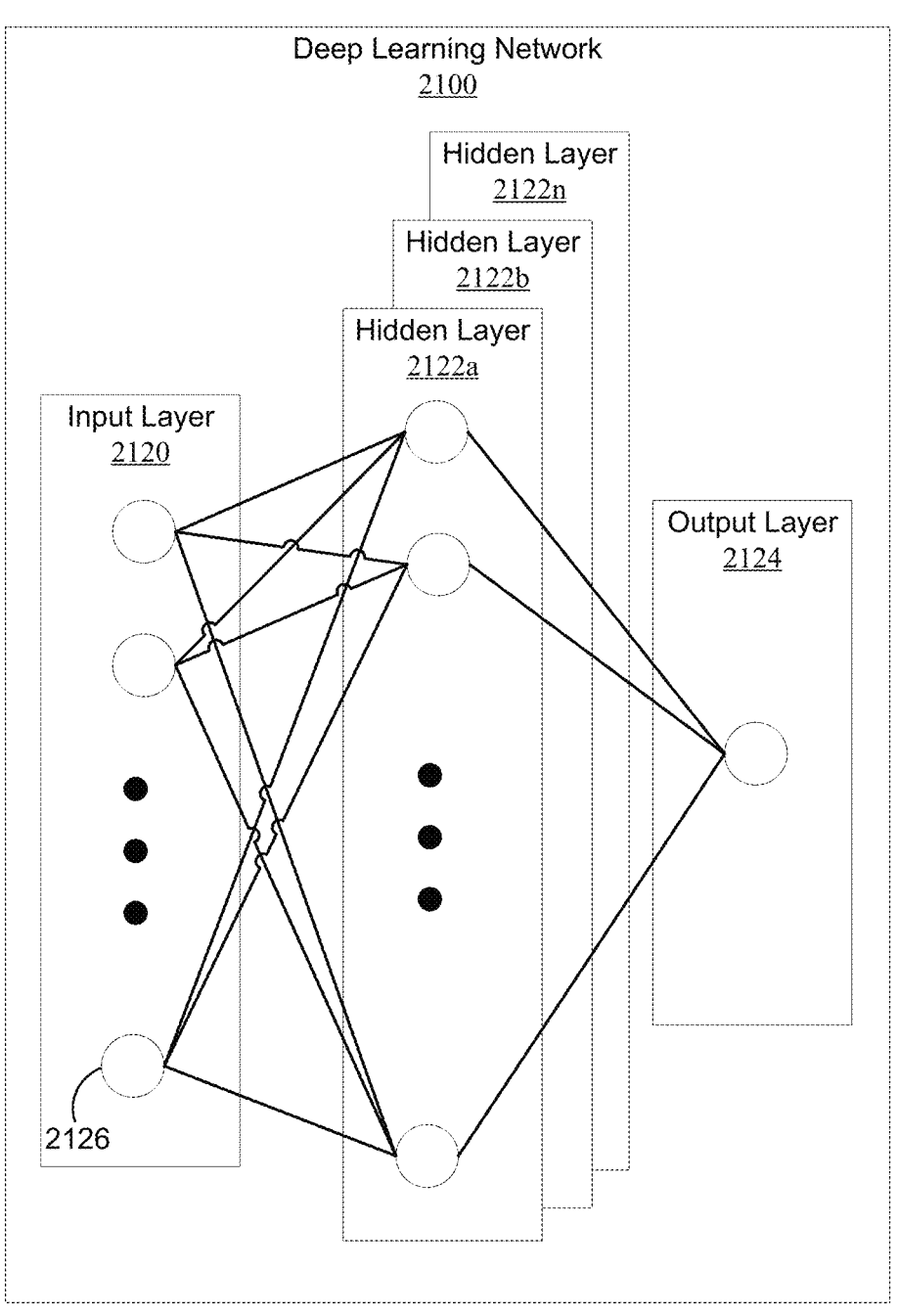
FIG. 21 illustrates aspects of a machine learning engine in accordance with some aspects described herein.

As described herein, various aspects may be implemented using a deep network, such as a neural network or multiple neural networks. FIG. 21 is an illustrative example of a deep learning neural network 2100 that can be used by a contact classification as described. An input layer 2120 includes input data, which can be data generated from audio and motion sensors described above. As detailed in FIGS. 10A-D, for example, such input to a classifier implemented as a neural network 2100 can include sensor data converted from analog to digital data and processed in a variety of ways. The neural network 2100 includes multiple hidden layers 2122a, 2122b, through 2122n. The hidden layers 2122a, 2122b, through 2122n include "n" number of hidden layers, where "n" is an integer greater than or equal to one. The number of hidden layers can be made to include as many layers as needed for the given application. The neural network 2100 further includes an output layer 2124 that provides an output resulting from the processing performed by the hidden layers 2122a, 2122b, through 2122n. In one illustrative example, the output layer 2124 can provide a classification for a contact or vibration type based on sensor data processed and used as an input to the neural network 2100. The classification can include a class identifying details associated with the input data (e.g., a sound input, a minor contact, a severe collision, etc.)

The neural network 2100 is a multi-layer neural network of interconnected nodes. Each node can represent a piece of information. Information associated with the nodes is shared among the different layers and each layer retains information as information is processed. In some cases, the neural network 2100 can include a feed-forward network, in which case there are no feedback connections where outputs of the network are fed back into itself. In some cases, the neural network 2100 can include a recurrent neural network, which can have loops that allow information to be carried across nodes while reading in input.

Information can be exchanged between nodes through node-to-node interconnections between the various layers. Nodes of the input layer 2120 can activate a set of nodes in the first hidden layer 2122a. For example, as shown, each of the input nodes of the input layer 2120 is connected to each of the nodes of the first hidden layer 2122a. The nodes of the hidden layers 2122a, 2122b, through 2122n can transform the information of each input node by applying activation functions to the information. The information derived from the transformation can then be passed to and can activate the nodes of the next hidden layer 2122b, which can perform their own designated functions. Example functions include convolutional, up-sampling, data transformation, and/or any other suitable functions. The output of the hidden layer 2122b can then activate nodes of the next hidden layer, and so on. The output of the last hidden layer 2122n can activate one or more nodes of the output layer 2124, at which an output is provided. In some cases, while nodes (e.g., node 2126) in the neural network 2100 are shown as having multiple output lines, a node has a single output and all lines shown as being output from a node represent the same output value.

In some cases, each node or interconnection between nodes can have a weight that is a set of parameters derived from the training of the neural network 2100. Once the neural network 2100 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 2100 to be adaptive to inputs and able to learn as more and more data is processed.

The neural network 2100 is pre-trained to process the features from the data in the input layer 2120 using the different hidden layers 2122a, 2122b, through 2122n in order to provide the output through the output layer 2124. In an example in which the neural network 2100 is used to identify collision or audio types from MEMS sensor inputs, the neural network 2100 can be trained using training data that includes both images and labels. For instance, training data can be input into the network, with training having a classification label indicating the class (e.g., collision or sensor pattern type) associated with the training data.

In some cases, the neural network 2100 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 2100 is trained well enough so that the weights of the layers are accurately tuned.

The neural network 2100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for down sampling), and fully connected layers. The neural network 2100 can include any other deep network other than a CNN, such as an autoencoder, a deep belief nets (DBNs), a Recurrent Neural Networks (RNNs), among others.

An example CNN can receive input data (e.g., digital data processed as normalized and/or processed using similarity measures, or processed using any operations described herein). The input data can include an array of numbers representing data received from MEMS sensors, with each number in the array associated with characteristics of sensor data received during a time frame. In some aspects, data from multiple time frames can be processed sequentially or in parallel as part of CNN classification.

In some aspects, training of one or more of the machine learning systems or neural networks described herein (e.g., the machine learning (ML) engine 7 of FIG. 1A, ASIC chip 16E of FIG. 1E, among various other machine learning networks described herein with respect to FIG. 1A to FIG. 21) can be performed using online training (e.g., in some case on-device training), offline training, and/or various combinations of online and offline training. In some cases, online may refer to time periods during which the input data (e.g., data from a microphone, audio data, and/or other input data described herein) is processed, for instance for detecting vibrations associated with an object surface implemented by the systems and techniques described herein (e.g., by the piezoelectric microelectromechanical systems (MEMS) vibration sensing devices described herein). In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/component of the vehicle, or other device) can perform online (or on-device) training of the pre-trained model to further adapt or tune the parameters of the model.

Figure 22:
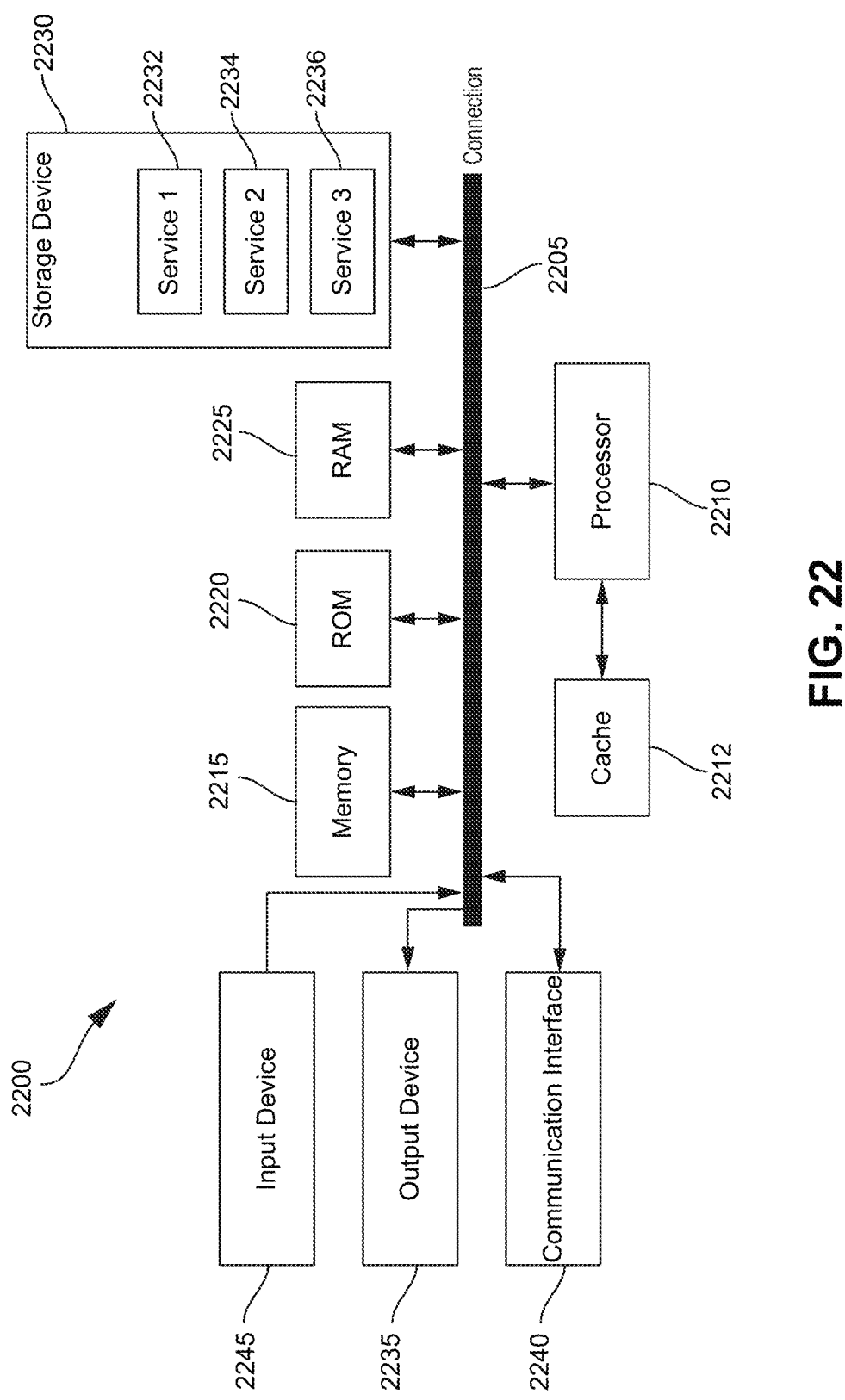
FIG. 22 is a block diagram of a computing device that can be used with implementations of a piezoelectric MEMS contact detection and classification system in accordance with aspects described herein.

FIG. 22 is a diagram illustrating an example of a system for implementing certain aspects of the present technology. In particular, FIG. 22 illustrates an example of computing system 2200 which can include a piezoelectric MEMS sensor system (e.g., at least one piezoelectric MEMS acoustic sensor or microphone and at least one piezoelectric MEMS transducer system including a piezoelectric MEMS acoustic transducer in a feedback transduction configuration as described above) in accordance with aspects described herein. The acoustic transducer (e.g., the piezoelectric MEMS acoustic transducer and an associated MEMS transducer system.) can be integrated, for example, with any computing device making up internal computing system, a remote computing system, a camera, or any component thereof in which the components of the system are in communication with each other using connection 2205. Connection 2205 may be a physical connection using a bus, or a direct connection into processor 2210, such as in a chipset architecture. Connection 2205 may also be a virtual connection, networked connection, or logical connection.

Example system 2200 includes at least one processing unit (CPU or processor) 2210 and connection 2205 that communicatively couples various system components including system memory 2215, such as read-only memory (ROM) 2220 and random access memory (RAM) 2225 to processor 2210. Computing system 2200 may include a cache 2212 of high-speed memory connected directly with, in close proximity to, or integrated as part of processor 2210.

Processor 2210 may include any general purpose processor and a hardware service or software service, such as services 2232, 2234, and 2236 stored in storage device 2230, configured to control processor 2210 as well as a special-purpose processor where software instructions are incorporated into the actual processor design. Processor 2210 may essentially be a completely self-contained computing system, containing multiple cores or processors, a bus, memory controller, cache, etc. A multi-core processor may be symmetric or asymmetric.

To enable user interaction, computing system 2200 includes an input device 2245, which may represent any number of input mechanisms, such as a microphone for speech or audio detection (e.g., piezoelectric MEMS transducer or a MEMS transducer system in accordance with aspects described above, etc.) along with other input devices 2245 such as a touch-sensitive screen for gesture or graphical input, keyboard, mouse, motion input, speech, etc. Computing system 2200 may also include output device 2235, which may be one or more of a number of output mechanisms. In some instances, multimodal systems may enable a user to provide multiple types of input/output to communicate with computing system 2200.

Computing system 2200 may include communications interface 2240, which may generally govern and manage the user input and system output. The communication interface may perform or facilitate receipt and/or transmission wired or wireless communications using wired and/or wireless transducers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2240 may also include one or more Global Navigation Satellite System (GNSS) receivers or transducers that are used to determine a location of the computing system 2200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2230 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/or a combination thereof.

The storage device 2230 may include software services, servers, services, etc., that when the code that defines such software is executed by the processor 2210, it causes the system to perform a function. In some embodiments, a hardware service that performs a particular function may include the software component stored in a computer-readable medium in connection with the necessary hardware components, such as processor 2210, connection 2205, output device 2235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

A number of implementations have been described. Nevertheless, it will be understood that various modifications may be made without departing from the spirit and scope of the disclosure. Other embodiments are within the scope of the claims.

Illustrative aspects of the disclosure include:

Aspect 1. A system comprising: a motion sensor; a microphone; a machine learning engine; and at least one package containing the motion sensor, the microphone and the machine learning engine, the at least one package having a base to secure the motion sensor and microphone to a surface, the machine learning engine configured to be trained to differentiate different types of contact on the surface.

Aspect 2. The system of Aspect 1 wherein the base has solder pads that connect the package to a printed circuit board that is in a housing, the housing being coupled with the surface.

Aspect 3. An apparatus comprising a motion sensor; a microphone; a machine learning engine; and at least one package containing the motion sensor, the microphone and the machine learning engine, the at least one package having a base to secure the motion sensor and microphone to a surface, trained to differentiate different types of contact on the surface.

Aspect 4. The apparatus of Aspect 3, wherein the base has solder pads that connect the package to a printed circuit board that is in a housing, the housing being coupled with the surface.

Aspect 5. The apparatus of any of Aspects 3 to 4, wherein the motion sensor, microphone and machine learning engine are in a single package.

Aspect 6. The apparatus of any of Aspects 3 to 5, wherein the motion sensor and microphone are in a first package and the machine learning engine is within a second package and electrically coupled with the first package.

Aspect 7. The apparatus of any of Aspects 3 to 6, wherein the motion sensor and microphone are on a first die and the machine learning engine is on a second die, the first and second dies being within the same package.

Aspect 8. The apparatus of any of Aspects 3 to 7, wherein the motion sensor, microphone, and machine learning engine are formed on a single die.

Aspect 9. The apparatus of any of Aspects 3 to 8, wherein the microphone comprises a piezoelectric MEMS microphone.

Aspect 10. The apparatus of any of Aspects 3 to 9, wherein the motion detector comprises an accelerometer or a piezoelectric MEMS microphone with its aperture occluded.

Aspect 11. The apparatus of any of Aspects 3 to 10, wherein the motion sensor has a bandwidth of between 3 Kilohertz and 8 Kilohertz.

Aspect 12. The apparatus of any of Aspects 3 to 11, wherein the motion sensor has a noise floor of between 100 ug/sqrt (Hz) and 0.5 ug/sqrt (Hz) at 1 kHz, 50 ug/sqrt (Hz) to 5 ug/sqrt (Hz) at 1 kHz.

Aspect 13. The apparatus of any of Aspects 3 to 12, wherein the motion sensor has a noise floor of between 100 ug/sqrt (Hz) and 0.05 ug/sqrt (Hz) at device resonance, 5 ug/sqrt (Hz) to 0.05 ug/sqrt (Hz) at resonance.

Aspect 14. The apparatus of any of Aspects 3 to 13, wherein different types of contact comprise no contact, touch, damage, and/or hard touch.

Aspect 15. The apparatus of any of Aspects 3 to 14, wherein a second motion sensor and second microphone within a second set of packages, the second set of packages configured to be coupled with the surface, the system further being configured to determine the location and/or direction of contact on the surface.

Aspect 16. The apparatus of any of Aspects 3 to 15, wherein the surface acts as a touch surface/sensor.

Aspect 17. A system comprising: a first piezoelectric microelectromechanical systems (MEMS) transducer having a first output, wherein the first piezoelectric MEMS transducer is mechanically coupled to a surface of an object, and wherein the first piezoelectric MEMS transducer is configured to generate a first analog signal at the first output when the first analog signal is transduced by the first piezoelectric MEMS transducer from vibrations propagating through the object; a second piezoelectric MEMS transducer having a second output, wherein the second piezoelectric MEMS transducer is configured to generate a second analog signal at the second output when the second analog signal is transduced by the second piezoelectric MEMS transducer from acoustic vibrations at a location of the object; and classification circuitry coupled to the output of first piezoelectric MEMS transducer and the output of the second piezoelectric MEMS transducer, wherein the classification circuitry is configured to process data from the first analog signal and data from the second analog signal, and to categorize combinations of the first analog signal and the second analog signal received during one or more time frames.

Aspect 18. The system of Aspect 17, wherein the first piezoelectric MEMS transducer has a noise floor defining a noise at a given frequency related to a signal output in gravitational units (g), and wherein the noise floor is between 100 millionths of the gravitation unit (ug) per square root of frequency in Hertz (ug/sqrt (Hz)) and 0.5 ug/sqrt (Hz).

Aspect 19. The system of any of Aspects 17 to 18, wherein the first piezoelectric MEMS transducer has a transduction bandwidth to detect the vibrations propagating through the object at frequencies between 1 kilohertz (kHz) and 8 kHz.

Aspect 20. The system of any of Aspects 17 to 19, wherein the data from the first analog signal comprises: frequency data for the vibrations propagating through the object; and magnitude data for the vibrations propagating through the object, where the magnitude data is associated with a severity of a contact with the object.

Aspect 21. The system of any of Aspects 17 to 20, wherein the one or more time frames comprise a plurality of 20 millisecond (ms) frames.

Aspect 22. The system of any of Aspects 17 to 21, further comprising a first sensor package, wherein the first sensor package comprises a substrate base and a lid, wherein the first piezoelectric MEMS transducer, the second piezoelectric MEMS transducer, and an application specific integrated circuit (ASIC) are mounted to the substrate base.

Aspect 23. The system of Aspect 22, wherein the ASIC comprises an analog-to-digital converter (ADC), a digital signal processor (DSP), and a controller; wherein the output of the first piezoelectric MEMS transducer is coupled to an input of the ADC via a wire bond; wherein an output of the ADC is coupled to an input of the controller via the digital signal processor; and wherein an output of the controller is coupled to the classification circuitry.

Aspect 24. The system of any of Aspects 21 to 23 further comprising: a second sensor package comprising a third MEMS transducer and a fourth MEMS transducer; wherein the first sensor package is positioned at a first position on the surface of the object; and wherein the second sensor package is positioned at a second position on the surface of the object at a predetermined distance from the first position.

Aspect 25. The system of Aspect 24, wherein the classification circuitry is further configured to detect a position of an impact on the surface of the object based on a time delay or a magnitude difference between vibrations detected at the first sensor package and vibrations detected at the second sensor package.

Aspect 26. The system of any of Aspects 24 to 25 wherein the classification circuitry is coupled to the output of the first piezoelectric MEMS transducer and the output of the second piezoelectric MEMS transducer via an application specific integrated circuit (ASIC), wherein the ASIC is configured to generate the data from the first analog signal and the second analog signal by: converting the first analog signal into a first plurality of data frames associated with the one or more time frames; converting the second analog signal into a second plurality of data frames associated with the one or more time frames; calculating a sum of a square of amplitude values for each data frame of the first plurality of data frames to generate an amplitude value for the first piezoelectric MEMS transducer for each of the one or more time frames; calculating a sum of a square of amplitude values for each data frame of the second plurality of data frames to generate and an amplitude value for the second piezoelectric MEMS transducer for each of the one or more time frames; and calculating a number of zero crossing for each data frame of the first plurality of data frames to generate a zero crossing value for the first piezoelectric MEMS transducer for each of the one or more time frames; calculating a number of zero crossing for each data frame of the second plurality of data frames to generate a zero crossing value for the second piezoelectric MEMS transducer for each of the one or more time frames; and calculating a ratio value for each of the one or more time frames, wherein the ratio value is a ratio between: the sum of the square of the amplitude for each data frame of the first plurality of data frames; and the sum of the square of the amplitude for each data frame of the second plurality of data frames.

Aspect 27. The system of any of Aspects 17 to 26, wherein the classification circuitry is further configured to receive the data from the first analog signal and the data from the second analog signal as training data in a training mode, and to match the data from the first analog signal and the data from the second analog signal to a provided training classification value.

Aspect 28. The system of any of Aspects 17 to 27, wherein the object is a bumper, and wherein the surface is an externally facing surface of the bumper.

Aspect 29. The system of any of Aspects 27 to 28, wherein the provided training classification value is a collision classification value.

Aspect 30. The system of any of Aspects 17 to 29 further comprising control circuitry coupled to the classification circuitry, wherein the control circuitry is configured to automatically generate an alert in response to receiving a collision classification output from the classification circuitry during an operating mode.

Aspect 31. The system of any of Aspects 27 to 28, wherein the provided training classification value is a door close value, and wherein control circuitry coupled to the classification circuitry is configured to generate a record of a timing of the door close value during an operating mode.

Aspect 32. The system of any of Aspects 27 to 28, wherein the provided training classification value is a key scratch value, and wherein control circuitry coupled to the classification circuitry is configured to initiate a video recording of an area surrounding the surface in response to the key scratch value during an operating mode.

Aspect 33. The system of any of Aspects 17 to 32, wherein the object is an element of a robotic arm, a wall of a storage container, a wall of a building, a hull panel of a ship, or a hull panel of an airplane.

Aspect 34. The system of any of Aspects 17 to 33, wherein the classification circuitry comprises one or more of decision tree circuitry, a support vector machine, or a neural network.

Aspect 35. A method comprising: storing, in a memory of a device, data from a first analog signal generated by a first piezoelectric microelectromechanical systems (MEMS) transducer having a first output, wherein the first piezoelectric MEMS transducer is mechanically coupled to a first surface of an object, and wherein the first piezoelectric MEMS transducer is configured to generate the first analog signal at the first output when the first analog signal is transduced by the first piezoelectric MEMS transducer from vibrations propagating through the object; storing, in the memory of the device, data from a second piezoelectric MEMS transducer having a second output, wherein the second piezoelectric MEMS transducer is configured to generate the second analog signal at the second output when the second analog signal is transduced by the second piezoelectric MEMS transducer from acoustic vibrations incident on the first surface of the object; and processing, using classification circuitry coupled to the output of first piezoelectric MEMS transducer and the output second piezoelectric MEMS transducer, the data from the first analog signal and the data from the second analog signal to categorize combinations of the first analog signal and the second analog signal received during one or more time frames.

Aspect 36. The method of Aspect 35, further comprising: processing the first analog signal and the second analog signal using a digital signal processor (DSP) and an analog to digital converter (ADC) to generate the data from the first analog signal and the data from the second analog signal as digital data.

Aspect 37. A system comprising: means for generating a first analog signal transduced from vibrations propagating through an object having a first surface; means for generating a second analog signal transduced from acoustic signals incident on the first surface of the object; and means for processing data from the first analog signal and data from the second analog signal to classify combinations of the first analog signal and the second analog signal received during one or more time frames.

Aspect 38. The system of Aspect 37, wherein the means for generating the first analog signal has a noise floor defining a noise at a given frequency related to a signal output in gravitational units (g), and wherein the noise floor is between 100 millionths of the gravitation unit (ug) per square root of frequency in Hertz (ug/sqrt (Hz)) and 0.5 ug/sqrt (Hz).

Aspect 39. A system comprising: a motion sensor; a microphone; a machine learning engine; and at least one package containing the motion sensor, the microphone and the machine learning engine, the at least one package having a base to secure the motion sensor and microphone to a surface, the machine learning engine configured to be trained to differentiate different types of contact on the surface.

Aspect 40. The system of Aspect 39, wherein the base has solder pads that connect the at least one package to a printed circuit board that is in a housing, the housing being coupled with the surface.

Aspect 41. The system of any of Aspects 39 to 40, wherein the motion sensor, the microphone and the machine learning engine are in a single package.

Aspect 42. The system of any of Aspects 39 to 40, wherein the motion sensor and the microphone are on a first die and the machine learning engine is on a second die, the first and second dies being within the single package.

Aspect 43. The system of any of Aspects 39 to 40, wherein the motion sensor and the microphone are in a first package and the machine learning engine is within a second package and electrically coupled with the first package.

Aspect 44. The system of any of Aspects 39 to 41, wherein the motion sensor, the microphone, and the machine learning engine are formed on a single die.

Aspect 45. The system of any of Aspects 39 to 44, wherein the microphone comprises a piezoelectric MEMS microphone.

Aspect 46. The system of any of Aspects 39 to 45, wherein the motion sensor comprises an accelerometer or a piezoelectric MEMS microphone with an occluded aperture.

Aspect 47. A device comprising: a memory configured to store an audio signal and a motion signal; one or more processors configured to: obtain the audio signal, wherein the audio signal is generated based on detection of sound by a microphone; obtain the motion signal, wherein the motion signal is generated based on detection of motion by a motion sensor mounted on a surface of an object; perform a similarity measure based on the audio signal and the motion signal; and determine a context of a contact type of the surface of the object based on the similarity measure.

Aspect 48. The device of Aspect 1, wherein the one or more processors are configured to perform the similarity measure based on a first comparison between a representation of the audio signal and a representation of the motion signal.

Aspect 49. The device of Aspect 2, wherein the first comparison is a difference of the representation of the audio signal and the representation of the motion signal.

Aspect 50. The device of Aspect 2, wherein the first comparison is a ratio of the representation of the audio signal and the representation of the motion signal.

Aspect 51. The device of Aspect 2, wherein the representation of the audio signal is a first correlation and the representation of the motion signal is a second correlation.

Aspect 52. The device of Aspect 2, wherein the representation of the audio signal is based on a rectification of the audio signal as obtained by the one or more processors.

Aspect 53. The device of Aspect 2, wherein the first comparison between the representation of the audio signal and the representation of the motion signal is based on: a second comparison of the representation of the audio signal to an audio threshold; and a third comparison of the representation of the motion signal to a motion threshold.

Aspect 54. The device of Aspect 2, wherein to determine the context of the contact type of the surface of the object includes classifying the contact type based on a combination of the representation of the audio signal and the representation of the motion signal.

Aspect 55. The device of Aspect 54, wherein to determine the context of the contact type of the surface of the object includes classifying the contact type based on a magnitude of contact.

Aspect 56. The device of Aspect 55, wherein the context of the contact type of the surface of the object includes at least one of: a scratch, a dent, touch, a non-contact touch, damage, hard touch.

Aspect 57. The device of Aspect 56, wherein to determine the context of the contact type of the surface of the object includes comparison of a machine learning engine output to past context types of contacts determined by a machine learning engine.

Aspect 58. The device of Aspect 57, wherein the machine learning engine is one of: a decision tree, support vector machine, or neural network.

Aspect 59. A device comprising: a memory configured to store an audio signal and a motion signal; and one or more processors configured to: obtain the audio signal based on detection of sound by a microphone; obtain the motion signal based on detection of motion by a motion sensor mounted on a surface of an object; quantify frequency characteristics of the audio signal and the motion signal; quantify amplitude characteristics of the audio signal and the motion signal; perform one or more comparisons of the audio signal and the motion signal to generate comparison data; and classify a contact type associated with a contact on the surface of the object based on the comparison data.

Aspect 60. The device of Aspect 59, further comprising storing relative position information for the microphone and the motion sensor in the memory, wherein the one or more comparisons of the audio signal and the motion signal use the relative position information to generate the comparison data.

Aspect 61. The device of Aspect 60, wherein the memory is further configured to store a plurality of audio signals from a plurality of microphones including the microphone; wherein the relative position information further comprises relative positions for the plurality of microphones; and wherein the comparison data is further generated using the plurality of audio signals and the relative position information for the plurality of microphones.

Aspect 62. The device of Aspect 61, wherein the one or more processors are configured to implement a machine learning engine trained to select the contact type from a plurality of contact types using the comparison data.

Aspect 63. A device comprising: a memory configured to store an audio signal and a motion signal; and one or more processors configured to: obtain the audio signal based on detection of sound by a microphone; obtain the motion signal based on detection of motion by a motion sensor mounted on a surface of an object; generate digital correlation data for the audio signal; generate digital correlation data for the motion signal; generate joint correlation data for the audio signal and the motion signal; select a classification based on the joint correlation data.

Aspect 64. The device of Aspect 63, wherein the classification is further based on a magnitude of the audio signal and a magnitude of the motion signal.

Aspect 65. The device of Aspect 63, wherein the classification is selected from a first classification set including at a scratch classification, a dent classification, a touch classification, and a non-contact classification.

Aspect 66. The device of Aspect 65, wherein the classification includes a first value from the first classification set and a second value from a second classification set, the second classification set including a damage classification and a non-damage classification.

Aspect 67. A method comprising operations to: store an audio signal and a motion signal; obtain the audio signal, wherein the audio signal is generated based on detection of sound by a microphone; obtain the motion signal, wherein the motion signal is generated based on detection of motion by a motion sensor mounted on a surface of an object; perform a similarity measure based on the audio signal and the motion signal; and determine a context of a contact type of the surface of the object based on the similarity measure.

Aspect 68. The method of Aspect 67, wherein the one or more processors are configured to perform the similarity measure based on a first comparison between a representation of the audio signal and a representation of the motion signal.

Aspect 69. The method of Aspect 68, wherein the first comparison is a difference of the representation of the audio signal and the representation of the motion signal.

Aspect 70. The method of Aspect 68, wherein the first comparison is a ratio of the representation of the audio signal and the representation of the motion signal.

Aspect 71. The method of Aspect 68, wherein the representation of the audio signal is a first correlation and the representation of the motion signal is a second correlation.

Aspect 72. The method of Aspect 68, wherein the representation of the audio signal is based on a rectification of the audio signal as obtained by the one or more processors.

Aspect 73. The method of Aspect 68, wherein the first comparison between the representation of the audio signal and the representation of the motion signal is based on: a second comparison of the representation of the audio signal to an audio threshold; and a third comparison of the representation of the motion signal to a motion threshold.

Aspect 74. The method of Aspect 68, wherein to determine the context of the contact type of the surface of the object includes classifying the contact type based on a combination of the representation of the audio signal and the representation of the motion signal.

Aspect 75. The method of Aspect 74, wherein to determine the context of the contact type of the surface of the object includes classifying the contact type based on a magnitude of contact.

Aspect 76. The method of Aspect 75, wherein the context of the contact type of the surface of the object includes at least one of: a scratch, a dent, touch, a non-contact touch, damage, hard touch.

Aspect 77. The method of Aspect 68, wherein to determine the context of the contact type of the surface of the object includes comparison of a machine learning engine output to past context types of contacts determined by a machine learning engine.

Aspect 78. The method of Aspect 77, wherein the machine learning engine is one of: a decision tree, support vector machine, or neural network.

Aspect 79. A method comprising operations to: store an audio signal and a motion signal obtain the audio signal based on detection of sound by a microphone; obtain the motion signal based on detection of motion by a motion sensor mounted on a surface of an object; quantify frequency characteristics of the audio signal and the motion signal; quantify amplitude characteristics of the audio signal and the motion signal; perform one or more comparisons of the audio signal and the motion signal to generate comparison data; and classify a contact type associated with a contact on the surface of the object based on the comparison data.

Aspect 80. The method of Aspect 79, further comprising storing relative position information for the microphone and the motion sensor in the memory, wherein the one or more comparisons of the audio signal and the motion signal use the relative position information to generate the comparison data.

Aspect 81. The method of Aspect 80, wherein the memory is further configured to store a plurality of audio signals from a plurality of microphones including the microphone; wherein the relative position information further comprises relative positions for the plurality of microphones; and wherein the comparison data is further generated using the plurality of audio signals and the relative position information for the plurality of microphones.

Aspect 82. The method of Aspect 79, wherein the one or more processors are configured to implement a machine learning engine trained to select the contact type from a plurality of contact types using the comparison data.

Aspect 83. A method comprising operations to: store an audio signal and a motion signal; obtain the audio signal based on detection of sound by a microphone; obtain the motion signal based on detection of motion by a motion sensor mounted on a surface of an object; generate digital correlation data for the audio signal; generate digital correlation data for the motion signal; generate joint correlation data for the audio signal and the motion signal; select a classification based on the joint correlation data.

Aspect 84. The method of Aspect 83, wherein the classification is further based on a magnitude of the audio signal and a magnitude of the motion signal.

Aspect 85. The method of Aspect 83, wherein the classification is selected from a first classification set including at a scratch classification, a dent classification, a touch classification, and a non-contact classification.

Aspect 86. The method of Aspect 85, wherein the classification includes a first value from the first classification set and a second value from a second classification set, the second classification set including a damage classification and a non-damage classification.

Aspect 84. A microelectromechanical (MEMS) transducer, comprising means for providing an output signal in accordance with any aspect above.

Aspect 85. A method for operating any MEMS transducer described herein.

Aspect 86. A storage medium comprising instructions that, when executed by one or more processors of a system, causes the system to perform any operations described herein.

Additional aspects are illustrated as the clauses listed below.

Clause 1. A device comprising: a memory configured to store an audio signal and a motion signal; and one or more processors configured to: obtain the audio signal based on detection of sound by two or more microphones; obtain the motion signal based on detection of motion by two or more motion sensor mounted on a surface of a first object; perform one or more comparisons of the audio signal and the motion signal to generate comparison data; determine a context of a contact type of the surface of the first object based on the comparison data; and determine a location of a second object within a threshold distance to the first object based on the context determined by the one or more processors.

Clause 2. The device of clause 1, wherein a plurality of cantilevered beams are configured as a membrane enclosing a sensor area.

Clause 3. The device of any of clauses 1-2 wherein the first object is a car door.

Clause 4. The device of any of clauses 1-3, wherein the second object is a person, a key, or a balloon.

Clause 5. The device of any of clauses 1-4, wherein the contact type includes an area associated with the first object.

Clause 6. The device of clause 5, wherein the first object is a door, and wherein the area associated with the first object is one of: an upper right part of the door, a lower right part of the door, an upper left part of the door, a lower left part of the door, or center of the door.

Clause 7. A device comprising: a memory configured to store an audio signal and a motion signal; and one or more processors configured to: obtain the audio signal based on detection of sound by a microphone; obtain the motion signal based on detection of motion by a motion sensor mounted on a surface of an object; normalize the audio signal and the motion signal to generate a normalized audio signal and a normalized motion signal; generate correlation data from the normalized audio signal and the normalized motion signal; and determine a contact classification using the correlation data.

Clause 8. The device of clause 7, wherein the one or more processors are configured as classification circuitry to determine the contact classification using the correlation data.

Clause 9. The device of clause 8, wherein the classification circuitry is further configured to receive audio signal and the motion signal as training data in a training mode, and to match the training data to a provided training classification value.

Clause 10. The device of clause 9, wherein the object is automobile surface, wherein the surface is an externally facing surface of the automobile surface, and wherein the provided training classification value is a set of collision classification values having known force and damage type characteristics.

Clause 11. A device comprising: a memory; a first piezoelectric microelectromechanical systems (MEMS) transducer having a first output, wherein the first piezoelectric MEMS transducer is mechanically coupled to a surface of an object, and wherein the first piezoelectric MEMS transducer is configured to generate a first analog signal at the first output when the first analog signal is transduced by the first piezoelectric MEMS transducer from vibrations propagating through the object; a second piezoelectric MEMS transducer having a second output, wherein the second piezoelectric MEMS transducer is configured to generate a second analog signal at the second output when the second analog signal is transduced by the second piezoelectric MEMS transducer from acoustic vibrations at a location of the object; and classification circuitry coupled to the memory, the output of first piezoelectric MEMS transducer, and the output of the second piezoelectric MEMS transducer, wherein the classification circuitry is configured to process data from the first analog signal and data from the second analog signal, and to categorize combinations of the first analog signal and the second analog signal received during one or more time frames.

Clause 12. The device of clause 11, further comprising storing categorization data from the classification circuitry in the memory.

Clause 13. The device of any of clauses 11-12, wherein the first piezoelectric MEMS transducer has a noise floor defining a noise at a given frequency related to a signal output in gravitational units (g), and wherein the noise floor is between 100 millionths of the gravitation unit (ug) per square root of frequency in Hertz (ug/sqrt (Hz)) and 0.5 ug/sqrt (Hz).

Clause 14. The device of clause 13, wherein the first piezoelectric MEMS transducer has a transduction bandwidth to detect the vibrations propagating through the object at frequencies between 0.5 kilohertz (kHz) and 15 kHz.

Clause 15. The device of any of clauses 11-14, wherein the data from the first analog signal comprises: frequency data for the vibrations propagating through the object; and magnitude data for the vibrations propagating through the object, where the magnitude data is associated with a severity of a contact with the object.

Clause 16. The device of any of clauses 11-15, wherein the one or more time frames are captured at a rate greater than 60 frames per second.

Clause 17. The device of any of clauses 11-16, further comprising a first sensor package, wherein the first sensor package comprises a substrate base and a lid, wherein the first piezoelectric MEMS transducer, the second piezoelectric MEMS transducer, and an application specific integrated circuit (ASIC) are mounted to the substrate base.

Clause 18. The device of clause 17, wherein the ASIC comprises an analog-to-digital converter (ADC), a digital signal processor (DSP), and a controller, wherein an output of the ADC is coupled to an input of the controller via the digital signal processor.

Clause 19. The device of clause 18 further comprising: a second sensor package comprising a third MEMS transducer and a fourth MEMS transducer; wherein the first sensor package is positioned at a first position on the surface of the object; and wherein the second sensor package is positioned at a second position on the surface of the object at a predetermined distance from the first position.

Clause 20. The device of clause 19, wherein the classification circuitry is further configured to detect a position of an impact on the surface of the object based on a time delay or a magnitude difference between vibrations detected at the first sensor package and vibrations detected at the second sensor package in a same time frame. Clause 1. A device comprising: a memory configured to store an audio signal and a motion signal; and one or more processors configured to: obtain the audio signal based on detection of sound by two or more microphones; obtain the motion signal based on detection of motion by two or more motion sensor mounted on a surface of a first object; perform one or more comparisons of the audio signal and the motion signal to generate comparison data; determine a context of a contact type of the surface of the first object based on the comparison data; and determine a location of a second object within a threshold distance to the first object based on the context determined by the one or more processors.

Clause 21. A device comprising: a memory configured to store an audio signal and a motion signal; and one or more processors configured to: obtain the audio signal based on detection of sound by two or more microphones; obtain the motion signal based on detection of motion by two or more motion sensor mounted on a surface of a first object; perform one or more comparisons of the audio signal and the motion signal to generate comparison data; determine a context of a contact type of the surface of the first object based on the comparison data; and determine a location of a second object within a threshold distance to the first object based on the context determined by the one or more processors.

Clause 22. The device of clause 21, wherein a plurality of cantilevered beams are configured as a membrane enclosing a sensor area.

Clause 23. The device of any of clauses 21-22 wherein the first object is a car door.

Clause 24. The device of any of clauses 21-23, wherein the second object is a person, a key, or a balloon.

Clause 25. The device of any of clauses 21-24, wherein the contact type includes an area associated with the first object.

Clause 26. The device of clause 25, wherein the first object is a door, and wherein the area associated with the first object is one of: an upper right part of the door, a lower right part of the door, an upper left part of the door, a lower left part of the door, or center of the door.

Clause 27. A device comprising: a memory configured to store an audio signal and a motion signal; and one or more processors configured to: obtain the audio signal based on detection of sound by a microphone; obtain the motion signal based on detection of motion by a motion sensor mounted on a surface of an object; normalize the audio signal and the motion signal to generate a normalized audio signal and a normalized motion signal; generate correlation data from the normalized audio signal and the normalized motion signal; and determine a contact classification using the correlation data.

Clause 28. The device of clause 27, wherein the one or more processors are configured as classification circuitry to determine the contact classification using the correlation data.

Clause 29. The device of clause 28, wherein the classification circuitry is further configured to receive audio signal and the motion signal as training data in a training mode, and to match the training data to a provided training classification value.

Clause 30. The device of clause 29, wherein the object is automobile surface, wherein the surface is an externally facing surface of the automobile surface, and wherein the provided training classification value is a set of collision classification values having known force and damage type characteristics.

Clause 31. A device comprising: a memory; a first piezoelectric microelectromechanical systems (MEMS) transducer having a first output, wherein the first piezoelectric MEMS transducer is mechanically coupled to a surface of an object, and wherein the first piezoelectric MEMS transducer is configured to generate a first analog signal at the first output when the first analog signal is transduced by the first piezoelectric MEMS transducer from vibrations propagating through the object; a second piezoelectric MEMS transducer having a second output, wherein the second piezoelectric MEMS transducer is configured to generate a second analog signal at the second output when the second analog signal is transduced by the second piezoelectric MEMS transducer from acoustic vibrations at a location of the object; and classification circuitry coupled to the memory, the output of first piezoelectric MEMS transducer, and the output of the second piezoelectric MEMS transducer, wherein the classification circuitry is configured to process data from the first analog signal and data from the second analog signal, and to categorize combinations of the first analog signal and the second analog signal received during one or more time frames.

Clause 32. The device of clause 31, further comprising storing categorization data from the classification circuitry in the memory.

Clause 33. The device of any of clauses 31-32, wherein the first piezoelectric MEMS transducer has a noise floor defining a noise at a given frequency related to a signal output in gravitational units (g), and wherein the noise floor is between 100 millionths of the gravitation unit (ug) per square root of frequency in Hertz (ug/sqrt (Hz)) and 0.5 ug/sqrt (Hz).

Clause 34. The device of clause 33, wherein the first piezoelectric MEMS transducer has a transduction bandwidth to detect the vibrations propagating through the object at frequencies between 0.5 kilohertz (kHz) and 15 kHz.

Clause 35. The device of any of clauses 31-34, wherein the data from the first analog signal comprises: frequency data for the vibrations propagating through the object; and magnitude data for the vibrations propagating through the object, where the magnitude data is associated with a severity of a contact with the object.

Clause 36. The device of any of clauses 31-35, wherein the one or more time frames are captured at a rate greater than 60 frames per second.

Clause 37. The device of any of clauses 31-36, further comprising a first sensor package, wherein the first sensor package comprises a substrate base and a lid, wherein the first piezoelectric MEMS transducer, the second piezoelectric MEMS transducer, and an application specific integrated circuit (ASIC) are mounted to the substrate base.

Clause 38. The device of clause 37, wherein the ASIC comprises an analog-to-digital converter (ADC), a digital signal processor (DSP), and a controller, wherein an output of the ADC is coupled to an input of the controller via the digital signal processor.

Clause 39. The device of clause 38 further comprising: a second sensor package comprising a third MEMS transducer and a fourth MEMS transducer; wherein the first sensor package is positioned at a first position on the surface of the object; and wherein the second sensor package is positioned at a second position on the surface of the object at a predetermined distance from the first position.

Clause 40. The device of clause 39, wherein the classification circuitry is further configured to detect a position of an impact on the surface of the object based on a time delay or a magnitude difference between vibrations detected at the first sensor package and vibrations detected at the second sensor package in a same time frame.

Clause 41. A microelectromechanical (MEMS) transducer, comprising means for providing an output signal in accordance with any aspect above.

Clause 42. A method for operating any MEMS transducer described herein.

Clause 43. A storage medium comprising instructions that, when executed by one or more processors of a system, causes the system to perform any operations described herein.

What is claimed is:

1. A device comprising:
a memory configured to store an audio signal and a motion signal; and
one or more processors configured to:
obtain the audio signal based on detection of sound by two or more microphones;
obtain the motion signal based on detection of motion by two or more motion sensor mounted on a surface of a first object;
perform one or more comparisons of the audio signal and the motion signal to generate comparison data based on additive components of the audio signal and the motion signal;
determine a context of a contact type of the surface of the first object based on the comparison data; and
determine a location of a second object within a threshold distance to the first object based on the context determined by the one or more processors.

2. The device of claim 1, wherein a plurality of cantilevered beams are configured as a membrane enclosing a sensor area.

3. The device of claim 1 wherein the first object is a car door.

4. The device of claim 1, wherein the second object is a person, a key, or a balloon.

5. The device of claim 1, wherein the contact type includes an area associated with the first object.

6. The device of claim 5, wherein the first object is a door, and wherein the area associated with the first object is one of:

an upper right part of the door, a lower right part of the door, an upper left part of the door, a lower left part of the door, or center of the door.

7. A device comprising:
a memory configured to store an audio signal and a motion signal; and
one or more processors configured to:
  obtain the audio signal based on detection of sound by a microphone;
  obtain the motion signal based on detection of motion by a motion sensor mounted on a surface of an object;
  normalize the audio signal and the motion signal to generate a normalized audio signal and a normalized motion signal;
  generate correlation data from the normalized audio signal and the normalized motion signal;
  perform one or more comparisons of the normalized audio signal and the normalized motion signal based on additive components of the normalized audio signal and the normalized motion signal; and
  determine a contact classification using the correlation data.

8. The device of claim 7, wherein the one or more processors are configured as classification circuitry to determine the contact classification using the correlation data.

9. The device of claim 8, wherein the classification circuitry is further configured to receive audio signal and the motion signal as training data in a training mode, and to match the training data to a provided training classification value.

10. The device of claim 9, wherein the object is automobile surface, wherein the surface is an externally facing surface of the automobile surface, and wherein the provided training classification value is a set of collision classification values having known force and damage type characteristics.

11. A device comprising:
a memory configured to store transducer data;
a first piezoelectric microelectromechanical systems (MEMS) transducer having a first output, wherein the first piezoelectric MEMS transducer is mechanically coupled to a surface of an object, and wherein the first piezoelectric MEMS transducer is configured to generate a first analog signal at the first output when the first analog signal is transduced by the first piezoelectric MEMS transducer from vibrations propagating through the object;
a second piezoelectric MEMS transducer having a second output, wherein the second piezoelectric MEMS transducer is configured to generate a second analog signal at the second output when the second analog signal is transduced by the second piezoelectric MEMS transducer from acoustic vibrations at a location of the object;
comparison circuitry coupled to the memory, the first output of the first piezoelectric MEMS transducer, and the second output of the second piezoelectric MEMS transducer, wherein the comparison circuitry is configured to determine additive components corresponding to the first analog signal and the second analog signal, and perform one or more comparisons of the first analog signal and the second analog signal to generate comparison data based on the additive components; and
classification circuitry coupled to the memory, the first output of the first piezoelectric MEMS transducer, and the second output of the second piezoelectric MEMS transducer, wherein the classification circuitry is configured to process data from the first analog signal, data from the second analog signal, and the comparison data to categorize combinations of the first analog signal and the second analog signal received during one or more time frames.

12. The device of claim 11, wherein the memory is further configured to store categorization data from the classification circuitry in the memory.

13. The device of claim 11, wherein the first piezoelectric MEMS transducer has a noise floor defining a noise at a given frequency related to a signal output in gravitational units (g), and wherein the noise floor is between 100 millionths of a gravitation unit (ug) per square root of frequency in Hertz (ug/sqrt (Hz)) and 0.5 ug/sqrt (Hz).

14. The device of claim 13, wherein the first piezoelectric MEMS transducer has a transduction bandwidth to detect the vibrations propagating through the object at frequencies between 0.5 kilohertz (kHz) and 15 kHz.

15. The device of claim 11, wherein the data from the first analog signal comprises: frequency data for the vibrations propagating through the object; and magnitude data for the vibrations propagating through the object, where the magnitude data is associated with a severity of a contact with the object.

16. The device of claim 11, wherein the one or more time frames are captured at a rate greater than 60 frames per second.

17. The device of claim 11, further comprising a first sensor package, wherein the first sensor package comprises a substrate base and a lid, wherein the first piezoelectric MEMS transducer, the second piezoelectric MEMS transducer, and an application specific integrated circuit (ASIC) are mounted to the substrate base.

18. The device of claim 17, wherein the ASIC comprises an analog-to-digital converter (ADC), a digital signal processor (DSP), and a controller, wherein an output of the ADC is coupled to an input of the controller via the digital signal processor.

19. The device of claim 18 further comprising: a second sensor package comprising a third MEMS transducer and a fourth MEMS transducer; wherein the first sensor package is positioned at a first position on the surface of the object; and wherein the second sensor package is positioned at a second position on the surface of the object at a predetermined distance from the first position.

20. The device of claim 19, wherein the classification circuitry is further configured to detect a position of an impact on the surface of the object based on a time delay or a magnitude difference between vibrations detected at the first sensor package and vibrations detected at the second sensor package in a same time frame.

* * * * *